(12) United States Patent
He et al.

(10) Patent No.: US 11,720,216 B2
(45) Date of Patent: Aug. 8, 2023

(54) TOUCH CONTROL STRUCTURE, DISPLAY PANEL, DISPLAY APPARATUS, AND METHOD OF FABRICATING TOUCH CONTROL STRUCTURE

(71) Applicants: Chengdu BOE Optoelectronics Technology Co., Ltd., Sichuan (CN); BOE Technology Group Co., Ltd., Beijing (CN)

(72) Inventors: Fan He, Beijing (CN); Cong Fan, Beijing (CN); Kemeng Tong, Beijing (CN); Hongwei Ma, Beijing (CN); Xiangdan Dong, Beijing (CN)

(73) Assignees: Chengdu BOE Optoelectronics Technology Co., Ltd., Chengdu Sichuan (CN); BOE Technology Group Co., Ltd., Beijing (CN)

( * ) Notice: Subject to any disclaimer, the term of this patent is extended or adjusted under 35 U.S.C. 154(b) by 207 days.

(21) Appl. No.: 17/417,030

(22) PCT Filed: Oct. 30, 2020

(86) PCT No.: PCT/CN2020/125302
§ 371 (c)(1),
(2) Date: Jun. 21, 2021

(87) PCT Pub. No.: WO2022/047975
PCT Pub. Date: Mar. 10, 2022

(65) Prior Publication Data
US 2022/0365624 A1    Nov. 17, 2022

(30) Foreign Application Priority Data

Sep. 3, 2020    (WO) ................ PCT/CN2020/113191

(51) Int. Cl.
G06F 3/044 (2006.01)
G06F 3/041 (2006.01)

(52) U.S. Cl.
CPC .......... *G06F 3/0446* (2019.05); *G06F 3/0412* (2013.01); *G06F 3/0416* (2013.01);
(Continued)

(58) Field of Classification Search
None
See application file for complete search history.

(56) References Cited

U.S. PATENT DOCUMENTS

| 10,666,712 B1 | 5/2020 | Dandekar et al. |
| 2016/0028780 A1 | 1/2016 | Verzano |

(Continued)

FOREIGN PATENT DOCUMENTS

| CN | 104601665 A | 5/2015 |
| CN | 109151043 A | 1/2019 |

(Continued)

OTHER PUBLICATIONS

International Search Report & Written Opinion dated May 27, 2021, regarding PCT/CN2020/114186.

*Primary Examiner* — Nicholas J Lee
(74) *Attorney, Agent, or Firm* — Intellectual Valley Law, P.C.

(57) ABSTRACT

A touch control structure having a plurality of first mesh electrodes and a plurality of second mesh electrodes is provided. The touch control structure is limited in a touch control region and absent in a window region. A window-crossing row of the plurality of first mesh electrodes includes a first mesh block and a second mesh block respectively on a first side and a second side of the window region; a first conductive plate directly connected to multiple mesh lines of the first mesh block; a second conductive plate (Continued)

directly connected to multiple mesh lines of the second mesh block; and a first conductive bridge connecting the first conductive plate and the second conductive plate. The first conductive plate, the second conductive plate, and the first conductive bridge are respectively around a first portion, a second portion, and a third portion of a periphery of the window region.

19 Claims, 49 Drawing Sheets

(52) U.S. Cl.
CPC ............... *G06F 2203/04111* (2013.01); *G06F 2203/04112* (2013.01)

(56) References Cited

U.S. PATENT DOCUMENTS

| | | | |
|---|---|---|---|
| 2020/0064968 A1* | 2/2020 | Kim | .................. G06F 3/0448 |
| 2021/0036064 A1* | 2/2021 | Jang | .................. H10K 50/84 |

FOREIGN PATENT DOCUMENTS

| | | |
|---|---|---|
| CN | 109245295 A | 1/2019 |
| CN | 110138844 A | 8/2019 |
| CN | 110703617 A | 1/2020 |

\* cited by examiner

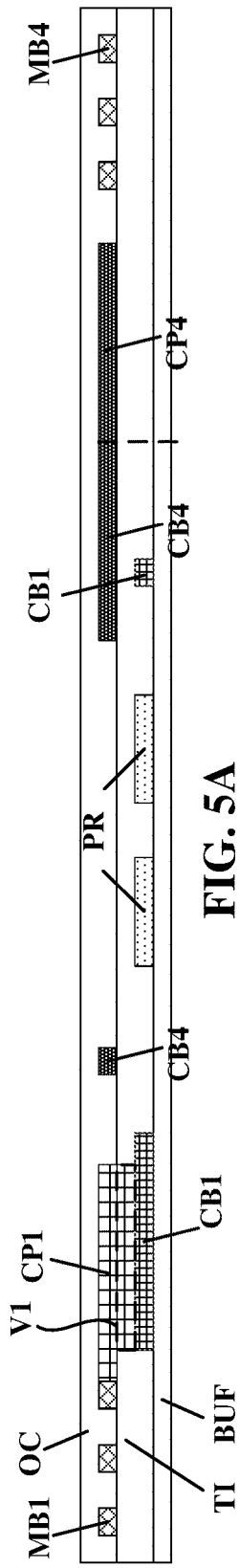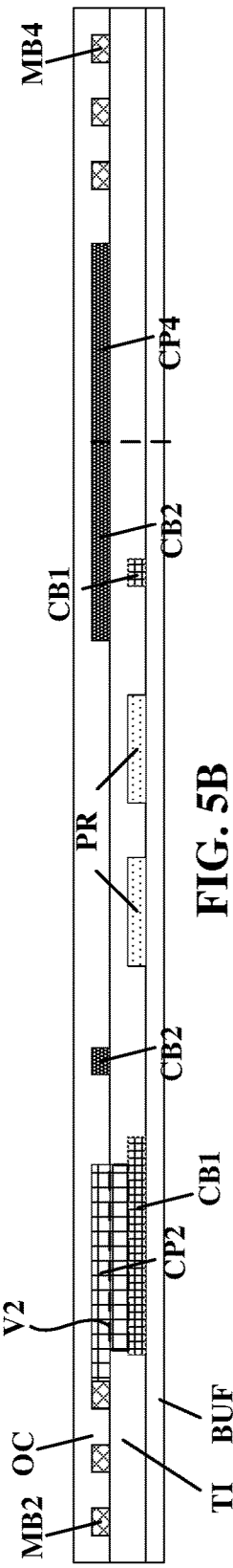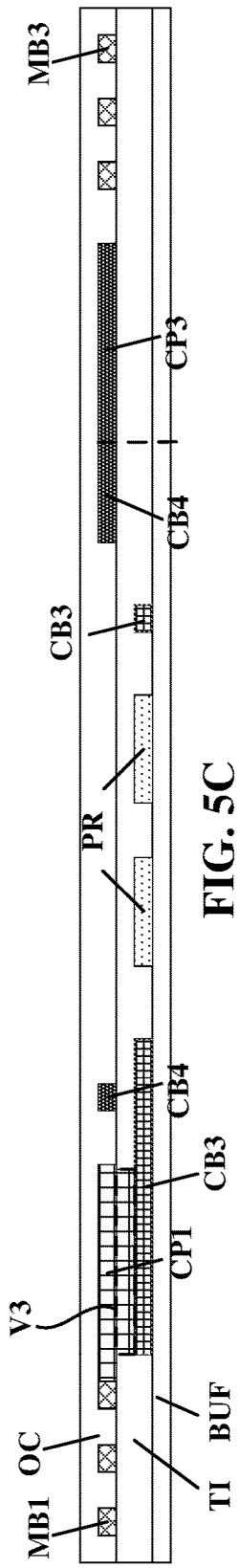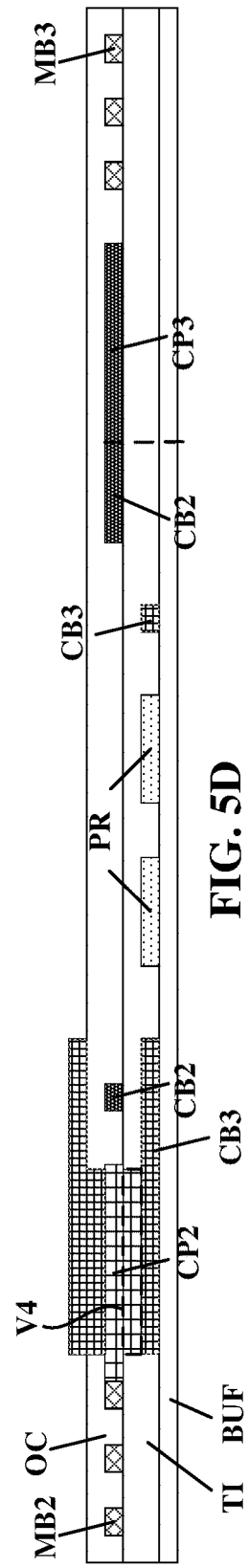

TOUCH CONTROL STRUCTURE, DISPLAY PANEL, DISPLAY APPARATUS, AND METHOD OF FABRICATING TOUCH CONTROL STRUCTURE

CROSS-REFERENCE TO RELATED APPLICATION

This application is a national stage application under 35 U.S.C. § 371 of International Application No. PCT/CN2020/125302, filed Oct. 30, 2020, which claims priority to International Application No. PCT/CN2020/113191, filed Sep. 3, 2020. Each of the forgoing applications is herein incorporated by reference in its entirety for all purposes.

TECHNICAL FIELD

The present invention relates to display technology, more particularly, to a touch control structure, a display panel, a display apparatus, and a method of fabricating a touch control structure.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present disclosure provides a touch control structure, comprising a plurality of first mesh electrodes along a row direction and a plurality of second mesh electrodes along a column direction; wherein the touch control structure is limited in a touch control region and absent in a window region surrounded by the touch control region; wherein a window-crossing row of the plurality of first mesh electrodes comprises a first mesh block and a second mesh block respectively on a first side and a second side of the window region; a first conductive plate directly connected to multiple mesh lines of the first mesh block; a second conductive plate directly connected to multiple mesh lines of the second mesh block; and a first conductive bridge connecting the first conductive plate and the second conductive plate; wherein the first conductive plate, the second conductive plate, and the first conductive bridge are respectively around a first portion, a second portion, and a third portion of a periphery of the window region.

Optionally, the window-crossing row further comprises a plurality of first non-window mesh blocks; at least the first mesh block has an area smaller than each of the plurality of first non-window mesh blocks due to presence of the window region.

Optionally, edges of the first mesh block are identical to edges of at least one of the plurality of first non-window mesh blocks, except for a first edge directly adjacent to the window region; and at least one mesh line along the first edge is connected to the first conductive plate.

Optionally, the second mesh block has an area smaller than each of the plurality of first non-window mesh blocks due to presence of the window region; edges of the second mesh block are identical to edges of at least one of a plurality of first non-window mesh blocks, except for a second edge directly adjacent to the window region; and at least one mesh line along the second edge is connected to the second conductive plate.

Optionally, the third portion is partially overlapping with the first portion, and partially overlapping with the second portion.

Optionally, the touch control structure further comprises a touch insulating layer between the first conductive bridge and the first conductive plate, and between the first conductive bridge and the second conductive plate; and a first via and a second via respectively extending through the touch insulating layer, the first conductive bridge respectively connected to the first conductive plate and the second conductive plate respectively through the first via and the second via; wherein the first mesh block, the second mesh block, the first conductive plate, and the second conductive plate are in a same layer different from the first conductive bridge.

Optionally, a window-crossing column of the plurality of second mesh electrodes comprises a third mesh block and a fourth mesh block respectively on a third side and a fourth side of the window region; a third conductive plate directly connected to multiple mesh lines of the third mesh block; a fourth conductive plate directly connected to multiple mesh lines of the fourth mesh block; and a second conductive bridge connecting the third conductive plate and the fourth conductive plate; wherein the third conductive plate, the fourth conductive plate, and the second conductive bridge are respectively around a fourth portion, a fifth portion, and a sixth portion of the periphery of the window region.

Optionally, the window-crossing column further comprises a plurality of second non-window mesh blocks; at least the third mesh block has an area smaller than each of the plurality of second non-window mesh blocks due to presence of the window region.

Optionally, edges of the third mesh block are identical to edges of at least one of the plurality of second non-window mesh blocks, except for a third edge directly adjacent to the window region; and at least one mesh line along the third edge is connected to the third conductive plate.

Optionally, the fourth mesh block has an area smaller than each of the plurality of second non-window mesh blocks due to presence of the window region; edges of the fourth mesh block are identical to edges of at least one of the plurality of second non-window mesh blocks, except for a fourth edge directly adjacent to the window region; and at least one mesh line along the fourth edge is connected to the fourth conductive plate.

Optionally, the sixth portion is partially overlapping with the fourth portion, and partially overlapping with the fifth portion.

Optionally, the touch control structure further comprises a touch insulating layer between the first conductive bridge and the first conductive plate and between the first conductive bridge and the second conductive plate; and a first via and a second via respectively extending through the touch insulating layer, the first conductive bridge respectively connected to the first conductive plate and the second conductive plate respectively through the first via and the second via; wherein the first mesh block, the second mesh block, the third mesh block, the fourth mesh block, the first conductive plate, the second conductive plate, the third conductive plate, the fourth conductive plate and the second conductive bridge are in a same layer different from the first conductive bridge.

Optionally, an orthographic projection of the first conductive bridge on the touch insulating layer partially overlaps with an orthographic projection of the second conductive bridge on the touch insulating layer.

Optionally, center lines of the widow-crossing row and the window-crossing column crossing over each other, forming a window-region virtual intersection inside the window region; outside the window region, center lines of rows of the plurality of first mesh electrodes and center lines of columns of the plurality of second mesh electrodes cross over each other, forming a plurality of virtual intersections in the touch control region; wherein the first conductive bridge and the second conductive bridge do not cross over the window-region virtual intersection.

Optionally, the touch control structure further comprises a first electrode bridge connecting adjacent first mesh electrodes in a respective one of the plurality of virtual intersections; and a second electrode bridge connecting adjacent second mesh electrodes in the respective one of the plurality of virtual intersections; wherein the first electrode bridge and the second electrode bridge respectively cross over the respective one of the plurality of virtual intersections.

Optionally, an addition window-crossing column of the plurality of second mesh electrodes comprises an additional third mesh block and an additional fourth mesh block respectively on a third side and a fourth side of the window region; an additional third conductive plate directly connected to multiple mesh lines of the additional third mesh block; an additional fourth conductive plate directly connected to multiple mesh lines of the additional fourth mesh block; and an additional second conductive bridge connecting the additional third conductive plate and the additional fourth conductive plate; wherein the additional third conductive plate, the additional fourth conductive plate, and the additional second conductive bridge are respectively around a ninth portion, a tenth portion, and an eleventh portion of the periphery of the window region.

Optionally, the touch control structure further comprises an intermediate mesh blocks in a touch transmission path between the first mesh block and the second mesh block; and an intermediate conductive plate directly connected to multiple mesh lines of the intermediate mesh block, and is connected to the first conductive bridge.

Optionally, the touch control structure further comprises a second window region in which the touch control structure is absent; the first mesh block is directly adjacent to the window region on one side and directly adjacent to the second window region on an opposite side.

Optionally, the window-crossing row of the plurality of first mesh electrodes further comprises a fifth mesh block; the first mesh block and the second mesh block are respectively on a first side and a second side of the window region; the fifth mesh block and the first mesh block are respectively on a first side and a second side of the second window region; wherein the touch control structure further comprises an additional conductive plate directly connected to multiple mesh lines of the first mesh block; a fifth conductive plate directly connected to multiple mesh lines of the fifth mesh block; and a third conductive bridge connecting the fifth conductive plate and the additional conductive plate.

Optionally, a first window-crossing column of the plurality of second mesh electrodes comprises a third mesh block and a fourth mesh block respectively on a third side and a fourth side of the window region; a third conductive plate directly connected to multiple mesh lines of the third mesh block; a fourth conductive plate directly connected to multiple mesh lines of the fourth mesh block; and a second conductive bridge connecting the third conductive plate and the fourth conductive plate; a second window-crossing column of the plurality of second mesh electrodes comprises a sixth mesh block and a seventh mesh block respectively on a third side and a fourth side of the second window region; a sixth conductive plate directly connected to multiple mesh lines of the sixth mesh block; a seventh conductive plate directly connected to multiple mesh lines of the seventh mesh block; and a fourth conductive bridge connecting the sixth conductive plate and the seventh conductive plate; and a third window-crossing column of the plurality of second mesh electrodes comprises an eighth mesh block and a ninth mesh block respectively on the third side and the fourth side of the second window region; a eighth conductive plate directly connected to multiple mesh lines of the eighth mesh block; a ninth conductive plate directly connected to multiple mesh lines of the ninth mesh block; and a fifth conductive bridge connecting the eighth conductive plate and the ninth conductive plate.

Optionally, the first mesh block, the second mesh block, the third mesh block, the fourth mesh block, the fifth mesh block, the sixth mesh block, the seventh mesh block, the eighth mesh block, the ninth mesh block, the first conductive plate, the additional conductive plate, the second conductive plate, the third conductive plate, the fourth conductive plate, the fifth conductive plate, the sixth conductive plate, the seventh conductive plate, the eighth conductive plate, the ninth conductive plate, the second conductive bridge, the fourth conductive bridge, and the fifth conductive bridge, are in a same layer, and are in a layer different from the first conductive bridge and the third conductive bridge; and the first conductive bridge and the third conductive bridge are in a same layer.

Optionally, the touch control structure further comprises a protective ring between the first mesh block and the second mesh block, the protective ring surrounding the window region.

Optionally, the first conductive bridge and the protective ring are in a same layer; a touch insulating layer is on a side of the first conductive bridge and the protective ring away from a base substrate; and the first conductive plate, the second conductive plate, mesh blocks of the plurality of first mesh electrodes and the plurality of second mesh electrodes are in a same layer, and are on a side of the touch insulating layer away from the first conductive bridge and the protective ring.

Optionally, the first conductive plate has a first plate width along a direction perpendicular to an interface between the first conductive plate and the first mesh block; the second conductive plate has a second plate width along a direction perpendicular to an interface between the second conductive plate and the second mesh block; and the first plate width and the second plate width are respectively greater than a mesh line width of the multiple mesh lines of the first mesh block and the multiple mesh lines of the second mesh block by at least 200%.

In another aspect, the present disclosure provides a display panel, comprising the touch control structure described herein or fabricated by a method described herein, and a hole in the window region; wherein display elements of the display panel are absent in the window region; and the display panel is configured to display an image in at least a portion of the touch control region.

Optionally, the display panel further comprises an accessory installed in the window region.

In another aspect, the present disclosure provides a display apparatus, comprising the display panel described herein, and an integrated circuit connected to the display panel.

BRIEF DESCRIPTION OF THE FIGURES

The following drawings are merely examples for illustrative purposes according to various disclosed embodiments and are not intended to limit the scope of the present invention.

FIG. 5A is a cross-sectional view along an A-A' line in FIG. 4.

FIG. 5B is a cross-sectional view along a B-B' line in FIG. 4.

FIG. 5C is a cross-sectional view along a C-C' line in FIG. 4.

FIG. 5D is a cross-sectional view along a D-D' line in FIG. 4.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a touch control structure, a display panel, a display apparatus, and a method of fabricating a touch control structure that substantially obviate one or more of the problems due to limitations and disadvantages of the related art. In one aspect, the present disclosure provides a touch control structure. In some embodiments, the touch control structure includes a plurality of first mesh electrodes along a row direction and a plurality of second mesh electrodes along a column direction. The touch control structure is limited in a touch control region and absent in a window region surrounded by the touch control region. Optionally, a window-crossing row of the plurality of first mesh electrodes includes a first mesh block and a second mesh block respectively on a first side and a second side of the window region; a first conductive plate directly connected to multiple mesh lines of the first mesh block; a second conductive plate directly connected to multiple mesh lines of the second mesh block; and a first conductive bridge connecting the first conductive plate and the second conductive plate. Optionally, the first conductive plate, the second conductive plate, and the first conductive bridge are respectively around a first portion, a second portion, and a third portion of a periphery of the window region. Optionally, the row direction and the column direction intersect each other. Optionally, the row direction and the column direction are perpendicular to each other.

Mesh electrodes include mesh lines which typically have a line width in a range of 1 μm to 50 μm. Thus, connecting adjacent mesh blocks through the mesh lines is particularly difficult, and often resulting in poor connectivity. The present disclosure adopts a novel and advantageous touch electrode design that obviate issues in related touch control structures.

Figure 1:
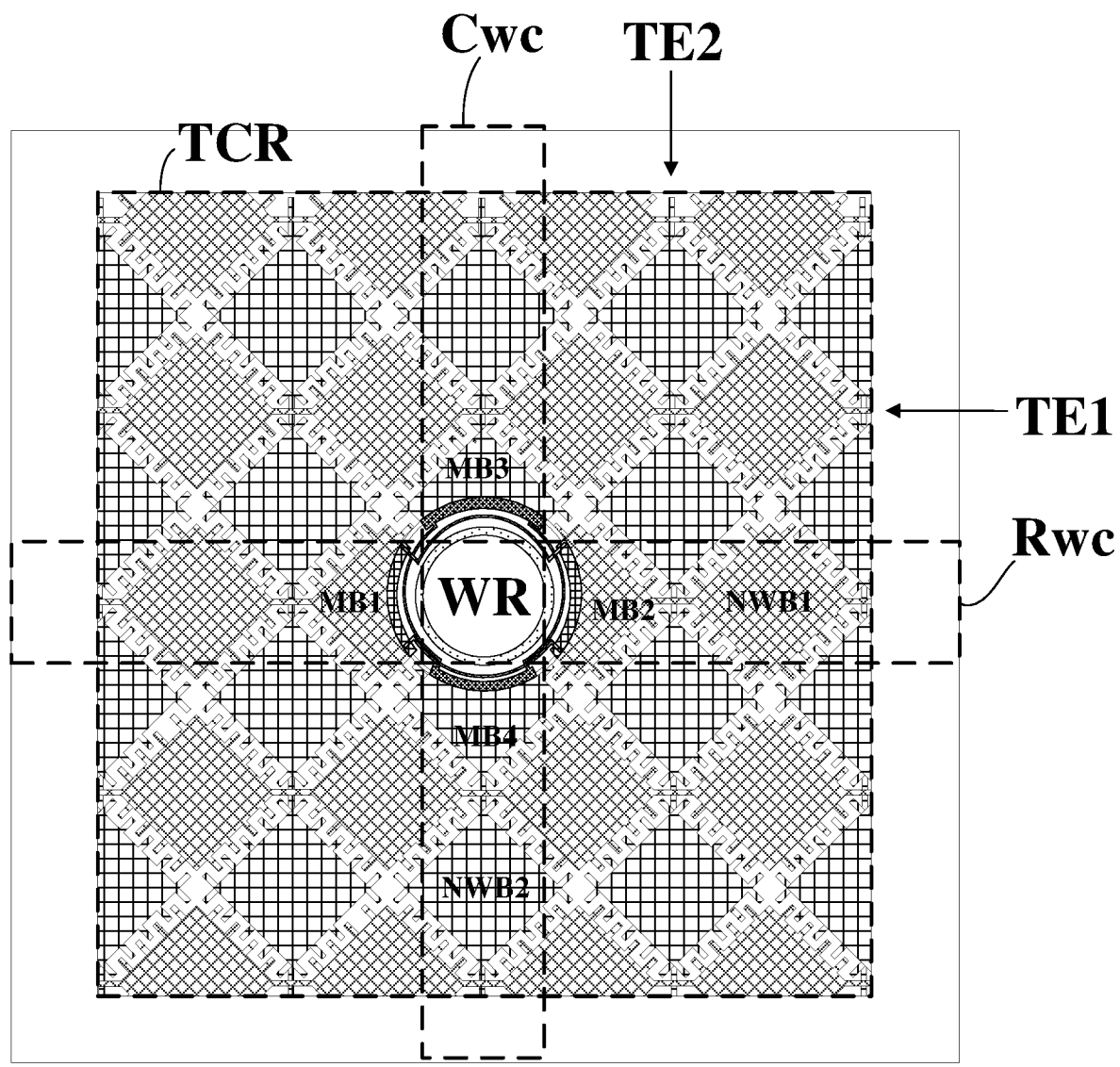
FIG. 1 is a schematic diagram illustrating a touch control structure in some embodiments according to the present disclosure.

FIG. 1 is a schematic diagram illustrating a touch control structure in some embodiments according to the present disclosure. Referring to FIG. 1, the touch control structure in some embodiments includes a plurality of first mesh electrodes TE1 and a plurality of second mesh electrodes TE2. Optionally, the touch control structure is a mutual capacitance type touch control structure. Optionally, the plurality of first mesh electrodes TE1 are a plurality of touch scanning electrodes, and the plurality of second mesh electrodes TE2 are a plurality of touch sensing electrodes. Optionally, the plurality of mesh touch electrodes TE1 are a plurality of touch sensing electrodes, and the plurality of second mesh electrodes TE2 are a plurality of touch scanning electrodes. The touch control structure is limited in a touch control region TCR and absent in a window region WR surrounded by the touch control region TCR. For example, the touch control structure may be a touch control structure in a display panel, where the touch control region TCR substantially overlaps with a display region of the display panel, and the window region WR is a region in the display panel having a hole configured for installing an accessory such as a camera lens or a fingerprint sensor. The display panel is configured to display an image in at least a portion of the touch control region TCR. In one example, in the window region WR, display elements of the display panel and the touch control structure are absent; in the display region or at least a portion of the touch control region TCR, both display elements of the display panel and the touch control structure are present.

Referring to FIG. 1, in some embodiments, the plurality of mesh touch electrodes TE1 are arranged in a plurality of rows, each of which is a respective one of the plurality of mesh touch electrodes TE1; the plurality of mesh scanning electrodes TE2 are arranged in a plurality of columns, each of which is a respective one of the plurality of second mesh electrodes TE2. In some embodiments, at least one row of the plurality of rows of first mesh electrodes TE1 crosses over the window region WR. For example, as shown in FIG. 1, a window-crossing row Rwc of the plurality of first mesh electrodes TE1 crosses over the window region WR. The touch electrode in the window-crossing row Rwc is spaced apart by the window region WR into two portions (a portion on left side of the window region WR and a portion on right side of the window region WR). In some embodiments, at least one column of the plurality of columns of second mesh electrodes TE2 crosses over the window region WR. For example, as shown in FIG. 1, a window-crossing column Cwc of the plurality of second mesh electrodes TE2 crosses over the window region WR. The touch electrode in the window-crossing column Cwc is spaced apart by the window region WR into two portions (a portion on upper side of the window region WR and a portion on lower side of the window region WR).

Figure 2A:
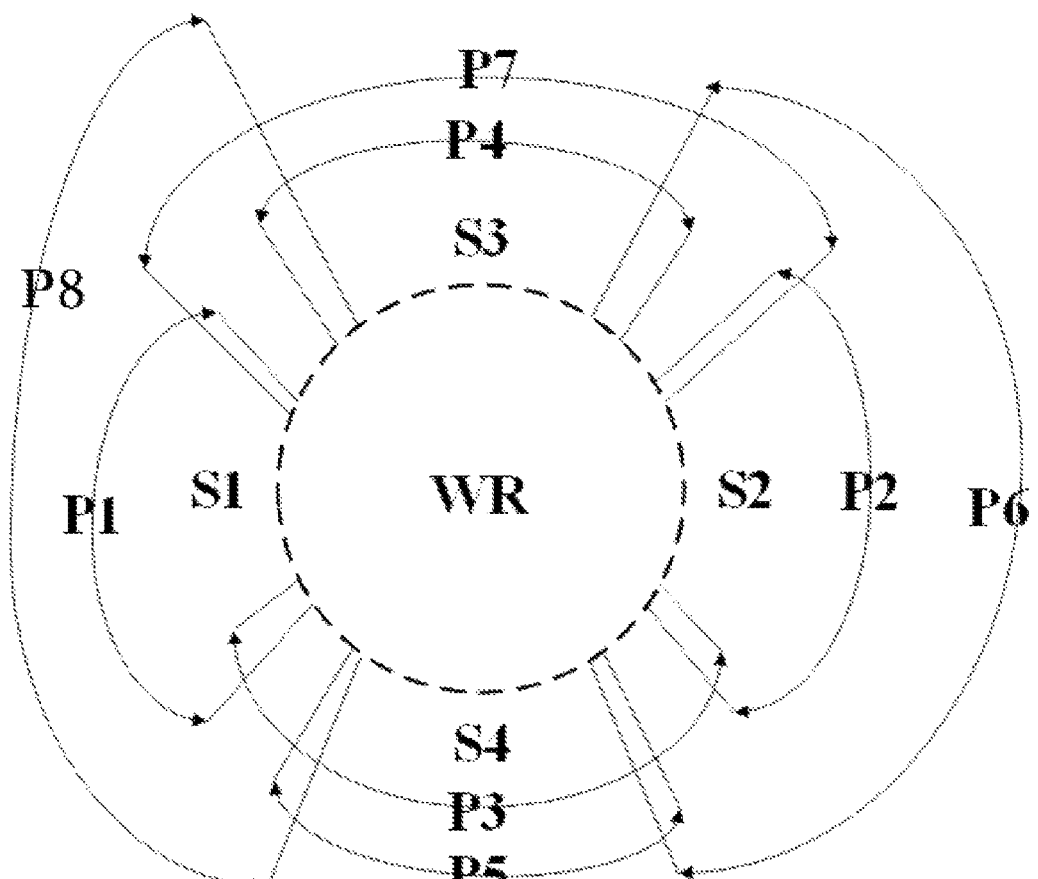
FIG. 2A is a schematic diagram illustrating a window region in some embodiments according to the present disclosure.
Figure 2B:
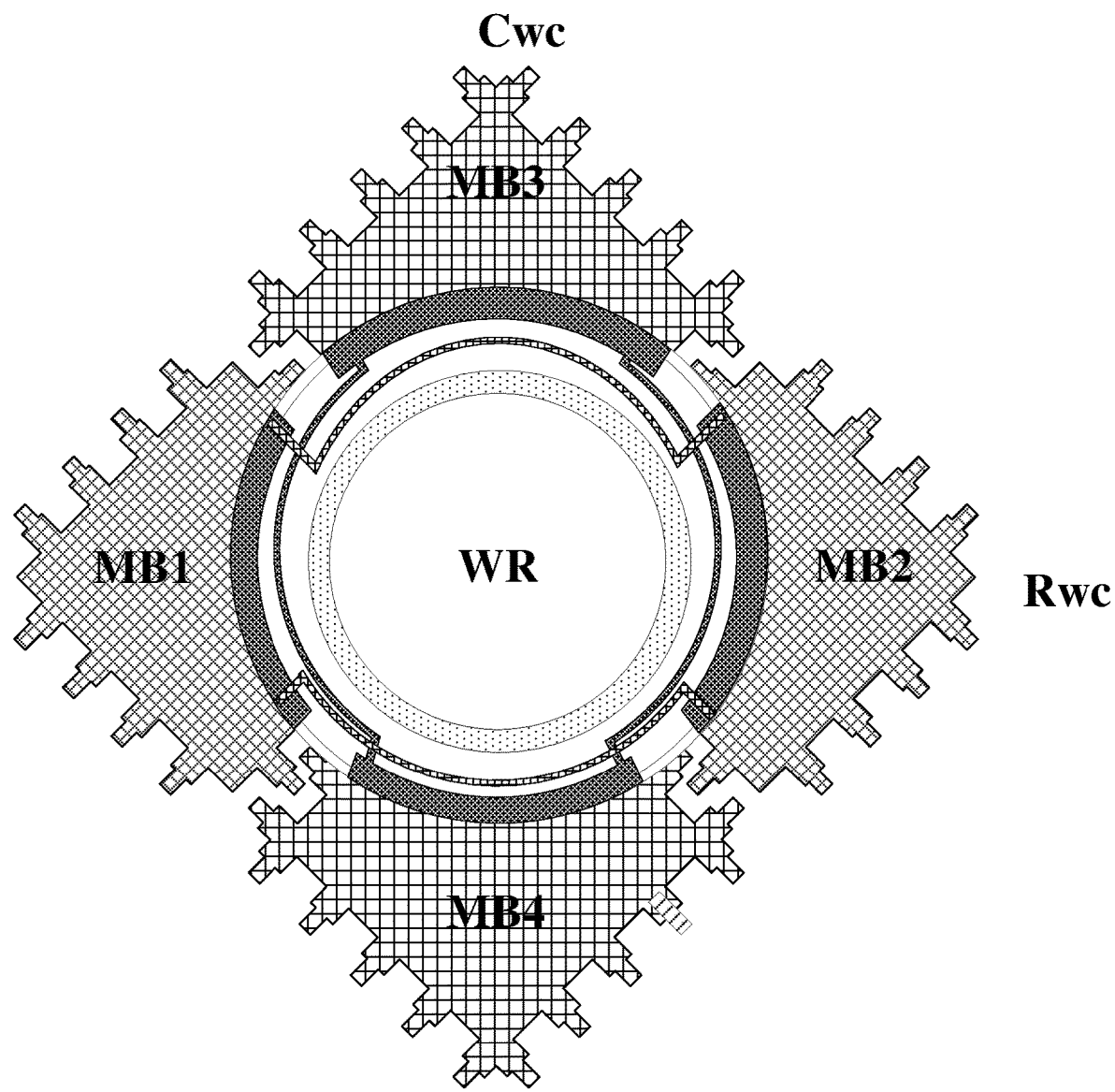
FIG. 2B is a zoom-in view of a touch control structure surrounding a window region in some embodiments according to the present disclosure.
Figure 2C:
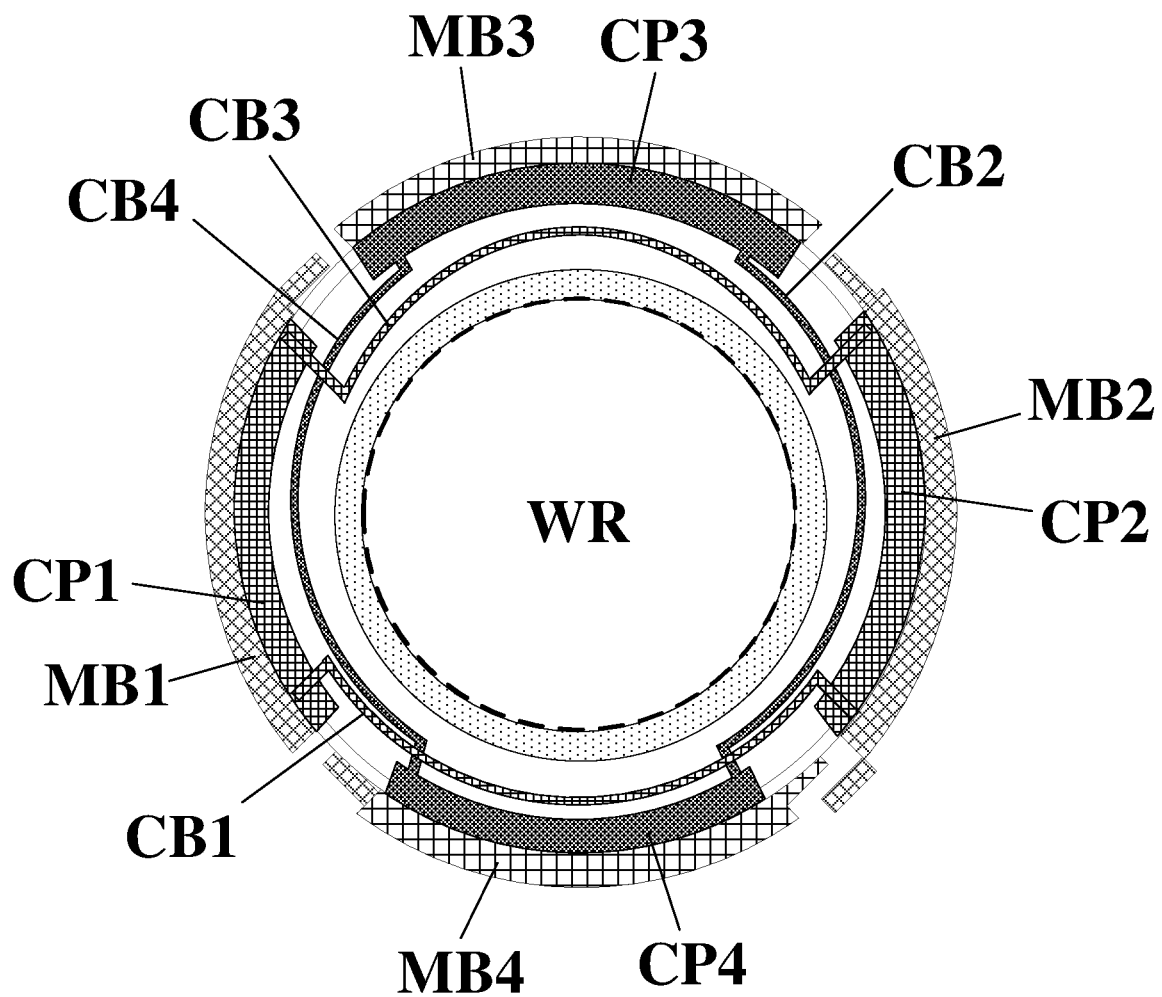
FIG. 2C is a further zoom-in view of a touch control structure surrounding a window region in some embodiments according to the present disclosure.

FIG. 2A is a schematic diagram illustrating a window region in some embodiments according to the present disclosure. FIG. 2B is a zoom-in view of a touch control structure surrounding a window region in some embodiments according to the present disclosure. FIG. 2C is a further zoom-in view of a touch control structure surrounding a window region in some embodiments according to the present disclosure. Referring to FIG. 2A, in some embodiments, the window region WR has at least four sides, including a first side S1, a second side S2, a third side S3, and a fourth side S4. Referring to FIG. 2A to FIG. 2C, in some embodiments, the window-crossing row Rwc of the plurality of first mesh electrodes TE1 includes a first mesh block MB1 and a second mesh block MB2 respectively on a first side S1 and a second side S2 of the window region WR; a first conductive plate CP1 directly connected to multiple mesh lines of the first mesh block MB1; a second conductive plate CP2 directly connected to multiple mesh lines of the second mesh block MB2; and a first conductive bridge CB1 connecting the first conductive plate CP1 and the second conductive plate CB2.

In the present touch control structure, the adjacent mesh blocks (e.g., the first mesh block MB1 and the second mesh block MB2) separated by the window region WR are connected by a conductive connecting bridge (e.g., the first conductive bridge CP1) through the aid of conductive plates (e.g., the first conductive plate CP1 and the second conductive plate CP2). Because forming the connecting bridge typically involves forming vias to connect corresponding mesh electrodes, it is extremely difficult to precisely connect mesh electrode lines with the connecting bridge without a conductive plate as an intermediate. The novel and unique structure of the present touch control structure ensures the adjacent mesh blocks separated by the window region WR are connected to transmit touch signals.

Referring to FIG. 2A and FIG. 2C, the first conductive plate CP1, the second conductive plate CP2, and the first conductive bridge CB1 are respectively around a first portion P1, a second portion P2, and a third portion P3 of a periphery of the window region WR. Optionally, the third portion P3 is partially overlapping with the first portion P1, and partially overlapping with the second portion P2. Optionally, the first portion P1 is on the first side S1 of the window region WR; the second portion P2 is on the second side S2 of the window region WR; and the third portion P3 is on the fourth side S4 of the window region WR.

Referring to FIG. 2A to FIG. 2C, in some embodiments, the window-crossing column Cwc of the plurality of second mesh electrodes TE2 includes a third mesh block MB3 and a fourth mesh block MB4 respectively on a third side S3 and a fourth side S4 of the window region WR; a third conductive plate CP3 directly connected to multiple mesh lines of the third mesh block MB3; a fourth conductive plate CP4 directly connected to multiple mesh lines of the fourth mesh block MB4; and a second conductive bridge CB2 connecting the third conductive plate CP3 and the fourth conductive plate CP4.

Referring to FIG. 2A and FIG. 2C, the third conductive plate CP3, the fourth conductive plate CP4, and the second conductive bridge CB2 are respectively around a fourth portion P4, a fifth portion P5, and a sixth portion P6 of the periphery of the window region WR. In one example, the third conductive plate CP3, the fourth conductive plate CP4, and the second conductive bridge CB2 are parts of a unitary structure; the third conductive plate CP3 include a plate of a first arch shape, the fourth conductive plate CP4 include a plate of a second arch shape, and the second conductive bridge CB2 include a bridge of a third arch shape. In another example, the third arch shape is non-concentric with respect to the first arch shape, and is non-concentric with respect to the second arch shape, thus the boundary between the third conductive plate CP3 and the second conductive bridge CB2 and boundary between the fourth conductive plate CP4 and the second conductive bridge CB2 can be discerned. In another example, the third arch shape has a radius different from that of the first arch shape, and different from that of the second arch shape, thus the boundary between the third conductive plate CP3 and the second conductive bridge CB2 and boundary between the fourth conductive plate CP4 and the second conductive bridge CB2 can be discerned. Optionally, the sixth portion P6 is partially overlapping with the fourth portion P4, and partially overlapping with the fifth portion P5. Optionally, the fourth portion P4 is on the third side S3 of the window region WR; the fifth portion P5 is on the fourth side S4 of the window region WR; and the sixth portion P6 is on the second side S2 of the window region WR.

Referring to FIG. 2A to FIG. 2C, in some embodiments, the window-crossing row Rwc of the plurality of first mesh electrodes TE1 further includes a third conductive bridge CB3 connecting the first conductive plate CP1 and the second conductive plate CB2. Referring to FIG. 2A and FIG. 2C, the first conductive plate CP1, the second conductive plate CP2, and the third conductive bridge CB3 are respectively around a first portion P1, a second portion P2, and a seventh portion P7 of a periphery of the window region WR. Optionally, the seventh portion P7 is partially overlapping with the first portion P1, and partially overlapping with the second portion P2. Optionally, the first portion P1 is on the first side S1 of the window region WR; the second portion P2 is on the second side S2 of the window region WR; and the seventh portion P7 is on the third side S3 of the window region WR.

Referring to FIG. 2A to FIG. 2C, in some embodiments, the window-crossing column Cwc of the plurality of second mesh electrodes TE2 further includes a fourth conductive bridge CB4 connecting the third conductive plate CP3 and the fourth conductive plate CB4. Referring to FIG. 2A and FIG. 2C, the third conductive plate CP3, the fourth conductive plate CP4, and the fourth conductive bridge CB4 are respectively around a fourth portion P4, a fifth portion P5, and an eighth portion P8 of the periphery of the window region WR. Optionally, the eighth portion P8 is partially overlapping with the fourth portion P4, and partially overlapping with the fifth portion P5. Optionally, the fourth portion P4 is on the third side S3 of the window region WR; the fifth portion P5 is on the fourth side S4 of the window region WR; and the eighth portion P8 is on the first side S1 of the window region WR.

Referring to FIG. 1, in some embodiments, the window-crossing row Rwc further includes a plurality of first non-window mesh blocks NWB1, and the window-crossing column Cwc further includes a plurality of second non-window mesh blocks NWB2. Optionally, at least the first mesh block MB1 has an area smaller than (by 5%, by 10%, by 20%, by 30%, by 40%, by 50%, by 60%, by 70%, by 80%, by 90%, or by 95% or more) each of the plurality of first non-window mesh blocks NWB1 due to presence of the window region WR. Optionally, the first mesh block MB1 has an area smaller than each of the plurality of first non-window mesh blocks NWB1, and the second mesh block MB2 also has an area smaller than each of the plurality of first non-window mesh blocks NWB1. Optionally, at least the third mesh block MB3 has an area smaller than each of the plurality of second non-window mesh blocks NWB2 due to presence of the window region WR. Optionally, the third mesh block MB3 has an area smaller than each of the plurality of second non-window mesh blocks NWB2, and the fourth mesh block MB4 also has an area smaller than each of the plurality of second non-window mesh blocks NWB2.

Figure 3A:
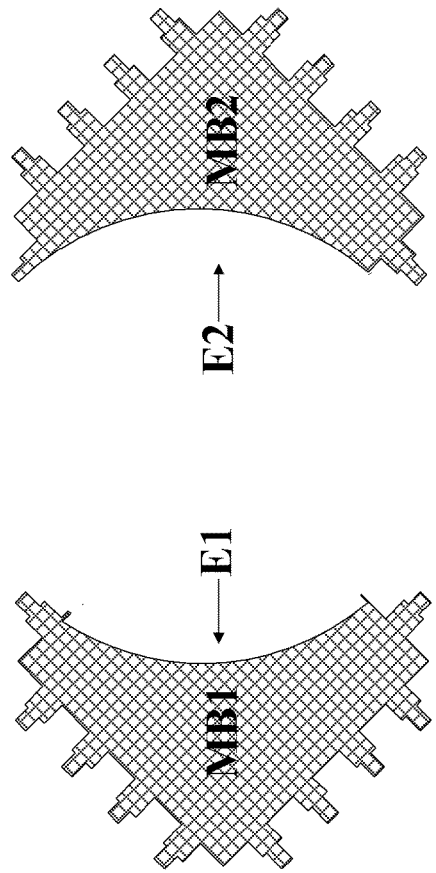
FIG. 3A is a schematic diagram illustrating the structure of a first non-window mesh block in some embodiments according to the present disclosure.
Figure 3B:
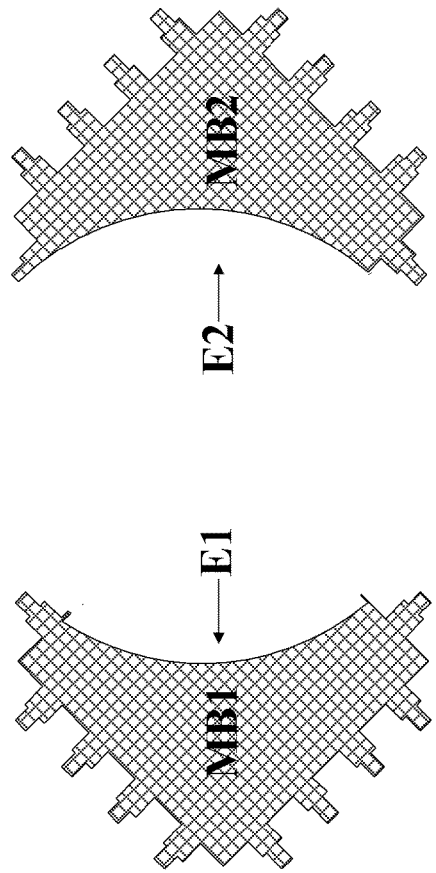
FIG. 3B is a schematic diagram illustrating the structure of a first mesh block in some embodiments according to the present disclosure.
Figure 4:
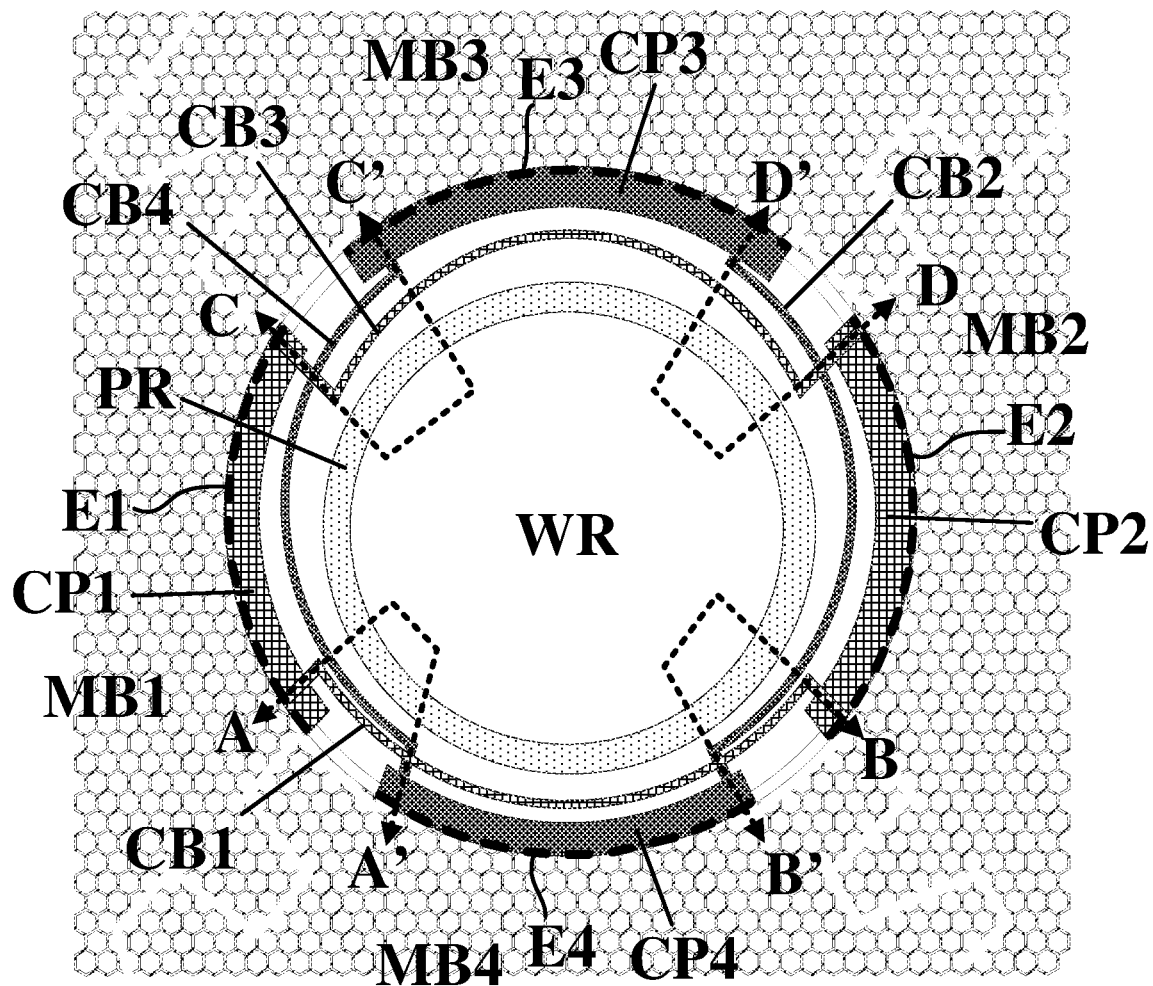
FIG. 4 is a zoom-in view of a touch control structure surrounding a window region in some embodiments according to the present disclosure.

FIG. 3A is a schematic diagram illustrating the structure of a first non-window mesh block in some embodiments according to the present disclosure. FIG. 3B is a schematic diagram illustrating the structure of a first mesh block in some embodiments according to the present disclosure. Referring to FIG. 3A and FIG. 3B, in some embodiments, edges of the first mesh block MB1 are identical to edges of at least one of the plurality of first non-window mesh blocks NWB1, except for a first edge E1 directly adjacent to the window region WR. Optionally, edges of the first mesh block MB1 are identical to edges of each of the plurality of first non-window mesh blocks NWB1, except for a first edge E1 directly adjacent to the window region WR. FIG. 4 is a zoom-in view of a touch control structure surrounding a window region in some embodiments according to the present disclosure. Referring to FIG. 4, at least one mesh line along the first edge E1 is connected to the first conductive plate CP1. Optionally, substantially all mesh lines along the first edge E1 are connected to the first conductive plate CP1 (see, also, FIG. 1, FIG. 2B, and FIG. 2C). Optionally, the first conductive plate CP1 includes a plurality of sub-plates spaced apart from each other, and at least one mesh line along the first edge E1 is connected to a respective one of the plurality of sub-plates.

As used herein, the term "substantially all" refers to a value which is at least 70%, e.g., at least 75%, at least 80%, at least 85%, at least 90%, at least 95%, at least 99%, or 100%.

Figure 3C:
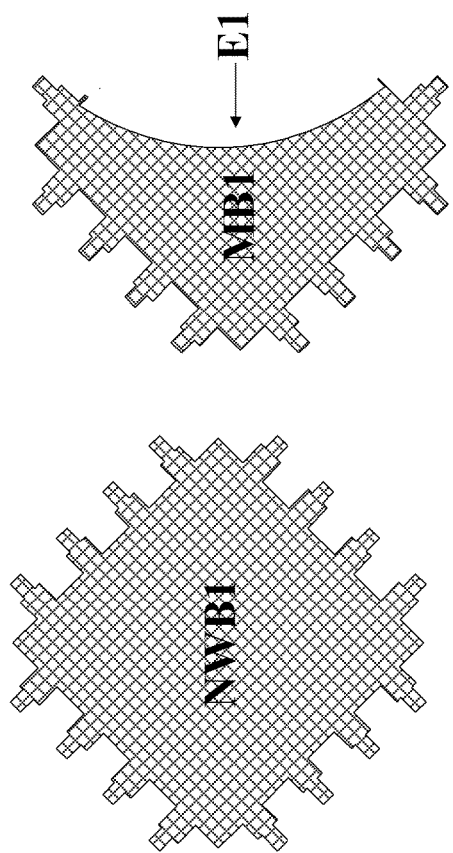
FIG. 3C is a schematic diagram illustrating the structure of a second mesh block in some embodiments according to the present disclosure.

FIG. 3C is a schematic diagram illustrating the structure of a second mesh block in some embodiments according to the present disclosure. Referring to FIG. 3A and FIG. 3C, in some embodiments, edges of the second mesh block MB2 are identical to edges of at least one of the plurality of first non-window mesh blocks NWB1, except for a second edge E2 directly adjacent to the window region WR. Optionally, edges of the second mesh block MB2 are identical to edges of each of the plurality of first non-window mesh blocks NWB1, except for a second edge E2 directly adjacent to the window region WR. Referring to FIG. 4, at least one mesh line along the second edge E2 is connected to the second conductive plate CB2. Optionally, substantially all mesh lines along the second edge E2 are connected to the second conductive plate CP2 (see, also, FIG. 1, FIG. 2B, and FIG. 2C). Optionally, the second conductive plate CP2 includes a plurality of sub-plates spaced apart from each other, and at least one mesh line along the second edge E2 is connected to a respective one of the plurality of sub-plates.

Figure 3D:
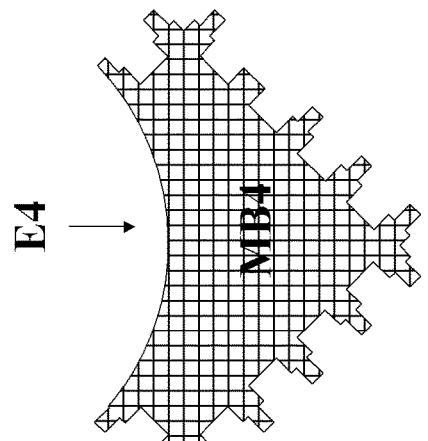
FIG. 3D is a schematic diagram illustrating the structure of a second non-window mesh block in some embodiments according to the present disclosure.

FIG. 3D is a schematic diagram illustrating the structure of a second non-window mesh block in some embodiments according to the present disclosure. Referring to FIG. 3A and FIG. 3D, in some embodiments, edges of the third mesh block MB3 are identical to edges of at least one of the plurality of second non-window mesh blocks NWB2, except for a third edge E3 directly adjacent to the window region WR. Optionally, edges of the third mesh block MB3 are identical to edges of each of the plurality of second non-window mesh blocks NWB2, except for a third edge E3 directly adjacent to the window region WR. Referring to FIG. 4, at least one mesh line along the third edge E3 is connected to the third conductive plate CP3. Optionally, substantially all mesh lines along the third edge E3 are connected to the third conductive plate CP3 (see, also, FIG. 1, FIG. 2B, and FIG. 2C). Optionally, the third conductive plate CP3 includes a plurality of sub-plates spaced apart from each other, and at least one mesh line along the third edge E3 is connected to a respective one of the plurality of sub-plates.

Figure 3E:
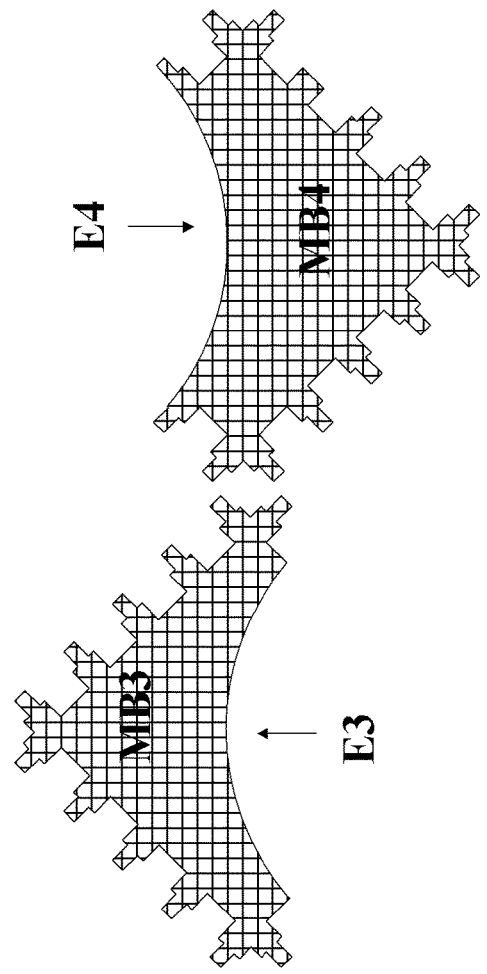
FIG. 3E is a schematic diagram illustrating the structure of a third mesh block in some embodiments according to the present disclosure.
Figure 3F:
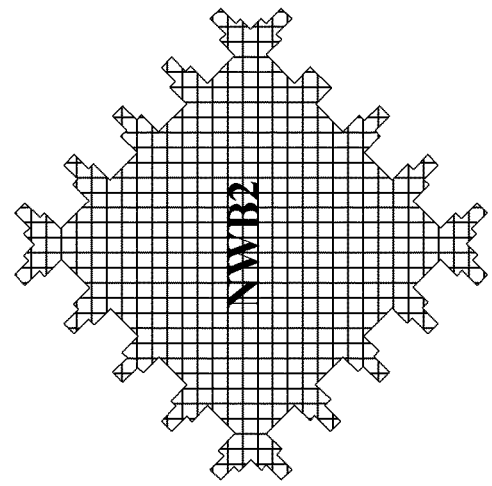
FIG. 3F is a schematic diagram illustrating the structure of a fourth mesh block in some embodiments according to the present disclosure.

FIG. 3E is a schematic diagram illustrating the structure of a third mesh block in some embodiments according to the present disclosure. Referring to FIG. 3A and FIG. 3E, in some embodiments, edges of the fourth mesh block MB4 are identical to edges of at least one of the plurality of second non-window mesh blocks NWB2, except for a fourth edge E4 directly adjacent to the window region WR. Optionally, edges of the fourth mesh block MB4 are identical to edges of each of the plurality of second non-window mesh blocks NWB2, except for a fourth edge E4 directly adjacent to the window region WR. Referring to FIG. 4, at least one mesh line along the fourth edge E4 is connected to the fourth conductive plate CB4. Optionally, substantially all mesh lines along the fourth edge E4 are connected to the fourth conductive plate CP4 (see, also, FIG. 1, FIG. 2B, and FIG. 2C). Optionally, the fourth conductive plate CP4 includes a plurality of sub-plates spaced apart from each other, and at least one mesh line along the fourth edge E4 is connected to a respective one of the plurality of sub-plates.

FIG. 5A is a cross-sectional view along an A-A' line in FIG. 4. FIG. 5B is a cross-sectional view along a B-B' line in FIG. 4. FIG. 5C is a cross-sectional view along a C-C' line in FIG. 4. FIG. 5D is a cross-sectional view along a D-D' line in FIG. 4. Referring to FIG. 5A to FIG. 5D, in some embodiments, the touch control structure further includes a buffer layer BUF; a protective ring PR, a first conductive bridge CB1, and a third conductive bridge CB3 on the buffer layer BUF, a touch insulating layer TI on a side of the protective ring PR, the first conductive bridge CB1, and the third conductive bridge CB3 away from the buffer layer BUF, mesh blocks (e.g., the first mesh block MB1, the second mesh block MB2, the third mesh block MB3, the fourth mesh block MB4) on a side of the touch insulating layer TI away from the buffer layer BUF, and an overcoat layer OC on a side of the mesh blocks away from the touch insulating layer TI. In some embodiments, the touch insulating layer TI is between the first conductive bridge CB1 and the first conductive plate CP1, and between the first conductive bridge CB1 and the second conductive plate CB2. The touch control structure further includes a first via V1 and a second via V2 respectively extending through the touch insulating layer TI. The first conductive bridge CB1 is respectively connected to the first conductive plate CP1 and the second conductive plate CP2 respectively through the first via V1 and the second via V2. Optionally, the first mesh block MB1, the second mesh block MB2, the first conductive plate CP1, and the second conductive plate CP2 are in a same layer.

As used herein, the term "same layer" refers to the relationship between the layers simultaneously formed in the same step. In one example, the first mesh block MB1, the second mesh block MB2, the first conductive plate CP1, and the second conductive plate CP2 are in a same layer when they are formed as a result of one or more steps of a same patterning process performed in a material deposited in a same deposition process. In another example, the first mesh block MB1, the second mesh block MB2, the first conductive plate CP1, and the second conductive plate CP2 can be formed in a same layer by simultaneously performing the step of forming the first mesh block MB1 and the second mesh block MB2, and the step of forming the first conductive plate CP1 and the second conductive plate CB2. The term "same layer" does not always mean that the thickness of the layer or the height of the layer in a cross-sectional view is the same.

Optionally, the first mesh block MB1, the second mesh block MB2, the third mesh block MB3, the fourth mesh block MB4, the first conductive plate CP1, the second conductive plate CP2, the third conductive plate CP3, the fourth conductive plate CP4, and the second conductive bridge CB2 are in a same layer.

In some embodiments, the touch insulating layer TI is between the third conductive bridge CB3 and the first conductive plate CP1, and between the third conductive bridge CB3 and the second conductive plate CB2. The touch control structure further includes a third via V3 and a fourth via V4 respectively extending through the touch insulating layer TI. The third conductive bridge CB3 is respectively connected to the first conductive plate CP1 and the second conductive plate CP2 respectively through the third via V3 and the fourth via V4. Optionally, the first mesh block MB1, the second mesh block MB2, the first conductive plate CP1, and the second conductive plate CP2 are in a same layer.

Optionally, the first mesh block MB1, the second mesh block MB2, the third mesh block MB3, the fourth mesh block MB4, the first conductive plate CP1, the second conductive plate CP2, the third conductive plate CP3, the fourth conductive plate CP4, and the fourth conductive bridge CB4 are in a same layer.

Optionally, an orthographic projection of the first conductive bridge CB1 on the buffer layer BUF partially overlaps with an orthographic projection of the second conductive bridge CB2 on the buffer layer BUF. Optionally, an orthographic projection of the first conductive bridge CB1 on the buffer layer BUF partially overlaps with an orthographic projection of the fourth conductive bridge CB4 on the buffer layer BUF.

Optionally, an orthographic projection of the third conductive bridge CB3 on the buffer layer BUF partially overlaps with an orthographic projection of the second conductive bridge CB2 on the buffer layer BUF. Optionally, an orthographic projection of the third conductive bridge CB3 on the buffer layer BUF partially overlaps with an orthographic projection of the fourth conductive bridge CB4 on the buffer layer BUF.

Figure 6:
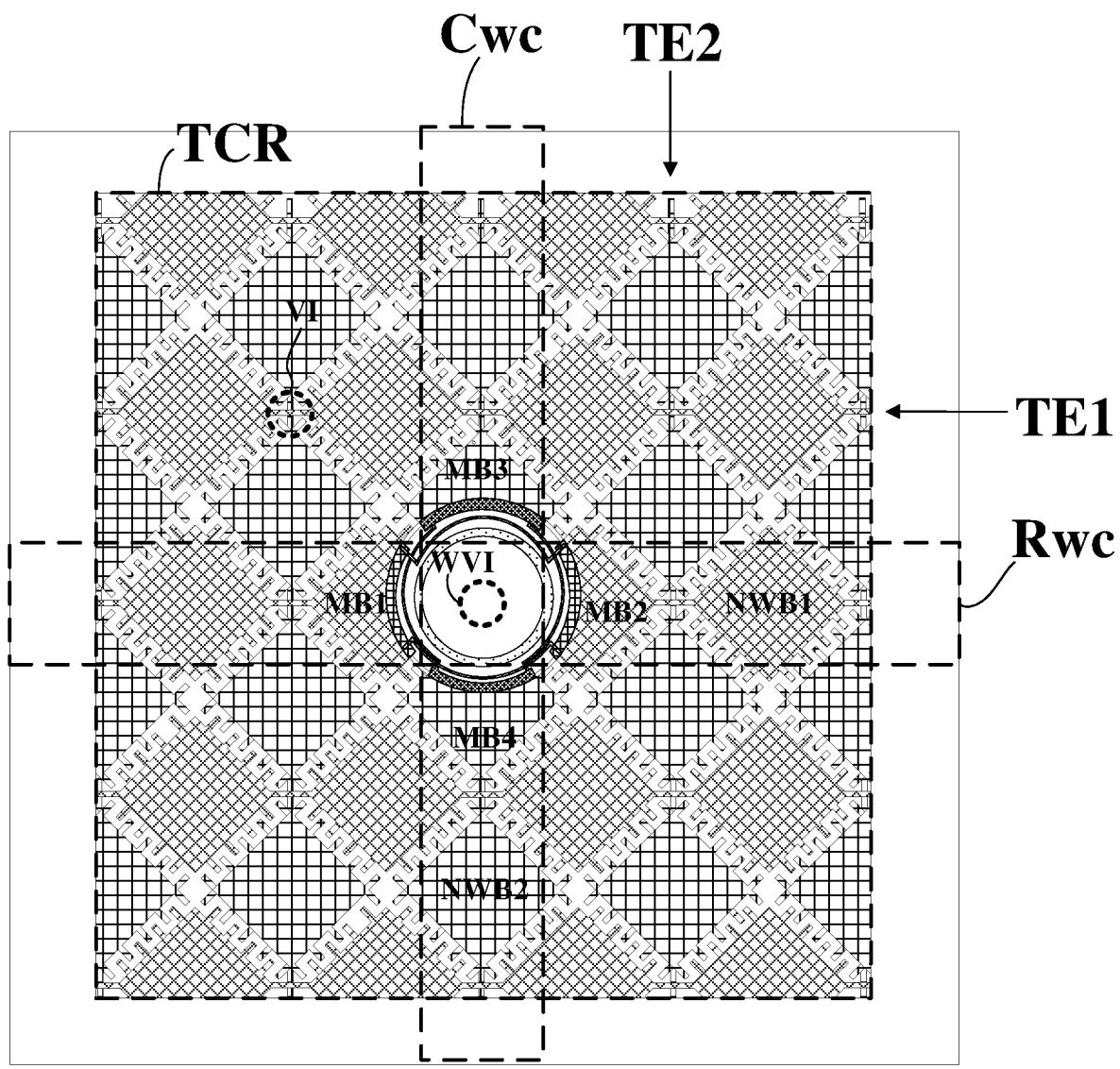
FIG. 6 is a schematic diagram illustrating a touch control structure in some embodiments according to the present disclosure.

FIG. 6 is a schematic diagram illustrating a touch control structure in some embodiments according to the present disclosure. In some embodiments, and referring to FIG. 6 and FIG. 1, center lines of the widow-crossing row Rwc and the window-crossing column Cwc cross over each other, forming a window-region virtual intersection WVI inside the window region WR. Outside the window region WR, center lines of rows of the plurality of first mesh electrodes TE1 and center lines of columns of the plurality of second mesh electrodes TE2 cross over each other, forming a plurality of virtual intersections VI in the touch control region TCR. None of the conductive bridges connecting mesh blocks surrounding the window region WR crosses the window-region virtual intersection WVI. For example, the first conductive bridge CB1 and the second conductive bridge CB2 do not cross over the window-region virtual intersection WVI. Similarly, the third conductive bridge CB3 and the fourth conductive bridge CB4 also do not cross over the window-region virtual intersection WVI. Referring to FIG. 6, the window-region virtual intersection WVI is absent of any touch electrodes or connecting bridges thereof.

Figure 7:
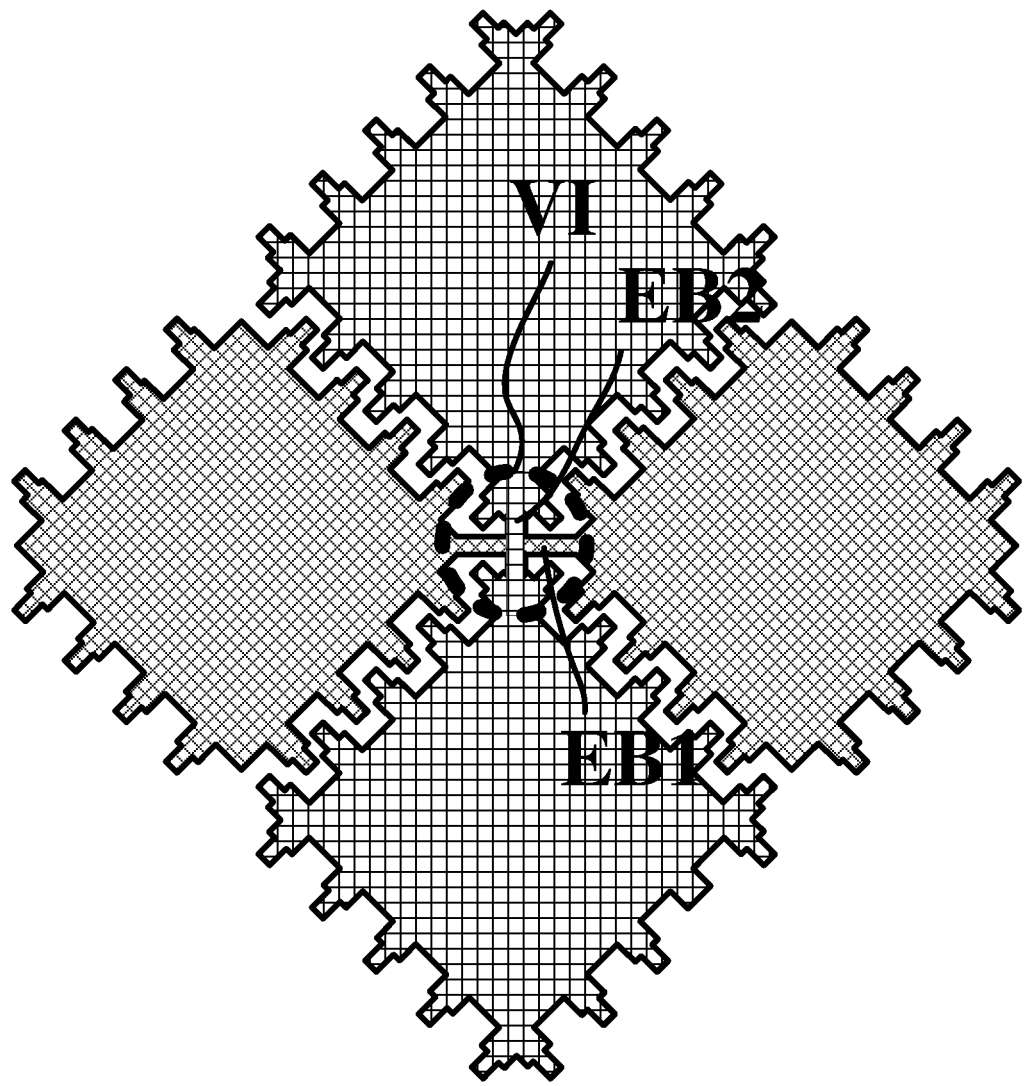
FIG. 7 is a zoom-in view of a virtual intersection in a touch control structure in some embodiments according to the present disclosure.

FIG. 7 is a zoom-in view of a virtual intersection in a touch control structure in some embodiments according to the present disclosure. Referring to FIG. 7, in some embodiments, the touch control structure further includes a first electrode bridge EB1 connecting adjacent first mesh electrodes in a respective one of the plurality of virtual intersections VI; and a second electrode bridge EB2 connecting adjacent second mesh electrodes in the respective one of the plurality of virtual intersections VI. Referring to FIG. 6, touch electrode material (e.g., at least one of the first electrode bridge EB1 and the second electrode bridge EB2, or other touch electrode material such as a connecting island) is present in the respective one of the plurality of virtual intersections VI.

Referring to FIG. 4, and FIG. 5A to FIG. 5D, the touch control structure in some embodiments further includes a protective ring PR between the first mesh block MB1 and the second mesh block MB2, the protective ring PR surrounding the window region WR. The protective ring may be made of a metallic material. Optionally, and referring to FIG. 5A to FIG. 5D, the protective ring PR is in a same layer as the first conductive bridge CB1 and the third conductive bridge CB3. Optionally, the protective ring PR is in a same layer as the second conductive bridge CB2 and the fourth conductive bridge CB4.

Figure 8:
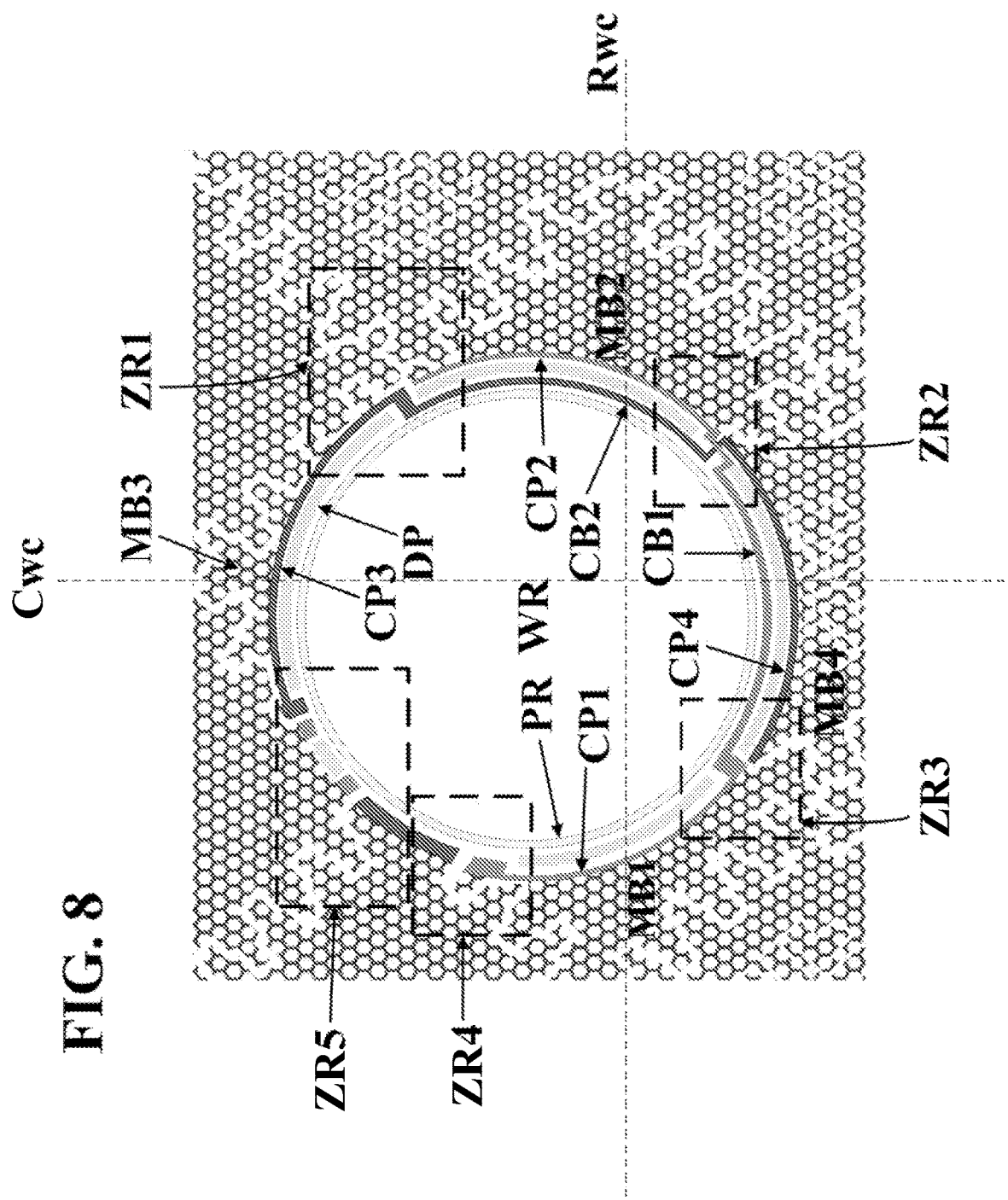
FIG. 8 is a zoom-in view of a touch control structure surrounding a window region in some embodiments according to the present disclosure.
Figure 9:
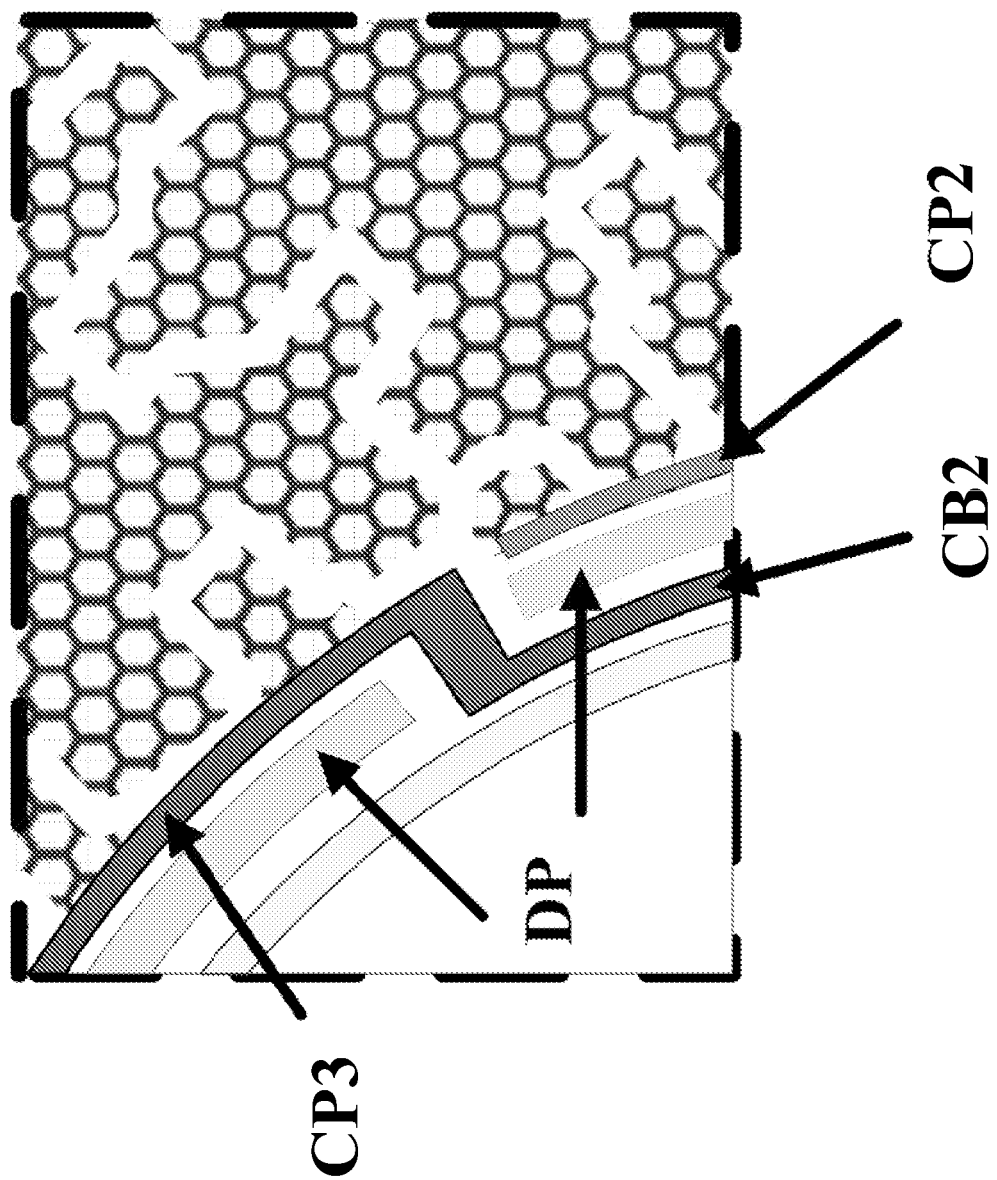
FIG. 9 is a zoom-in view of a first zoom-in region in FIG. 8.
Figure 10:
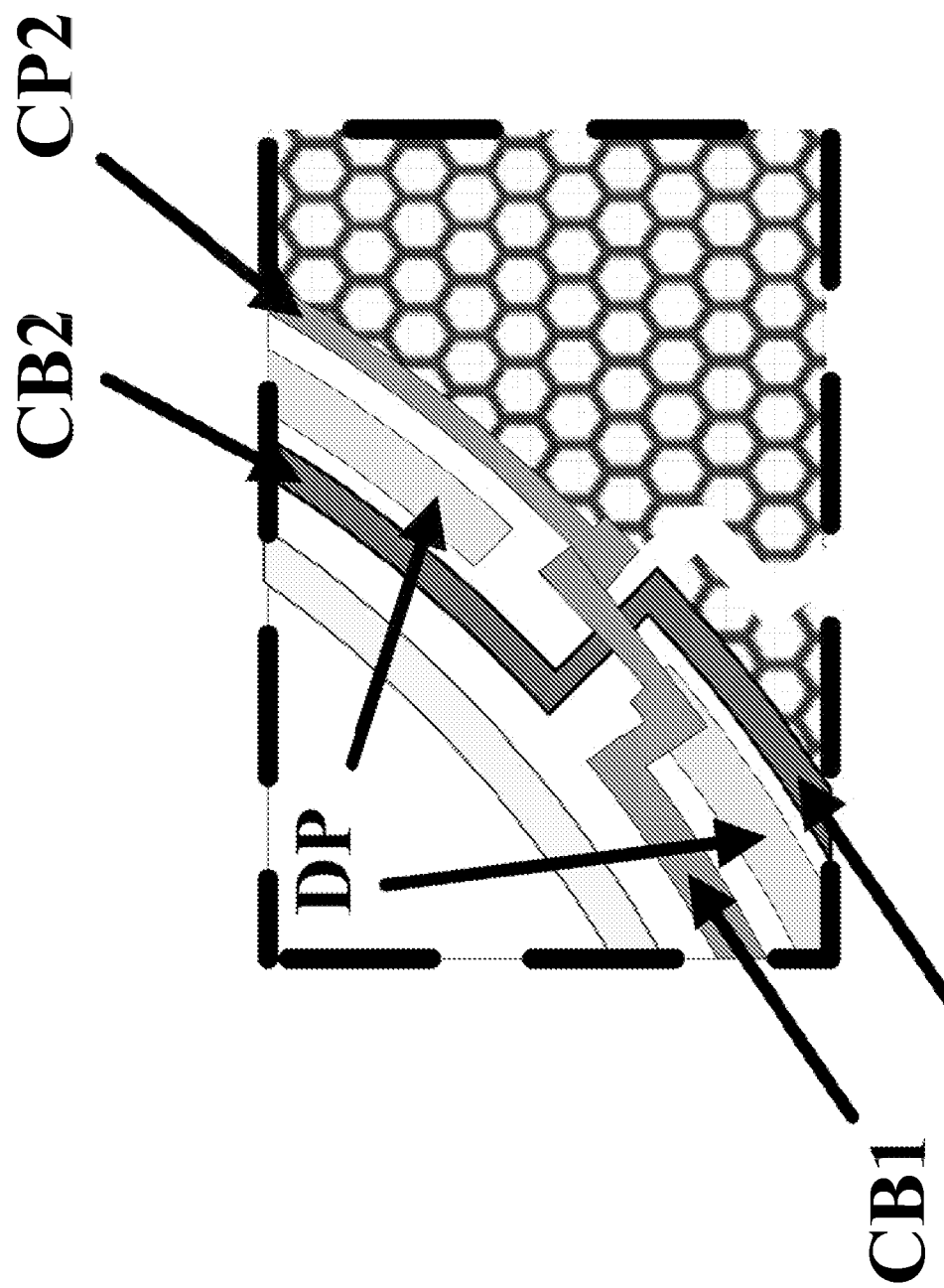
FIG. 10 is a zoom-in view of a second zoom-in region in FIG. 8.
Figure 11:
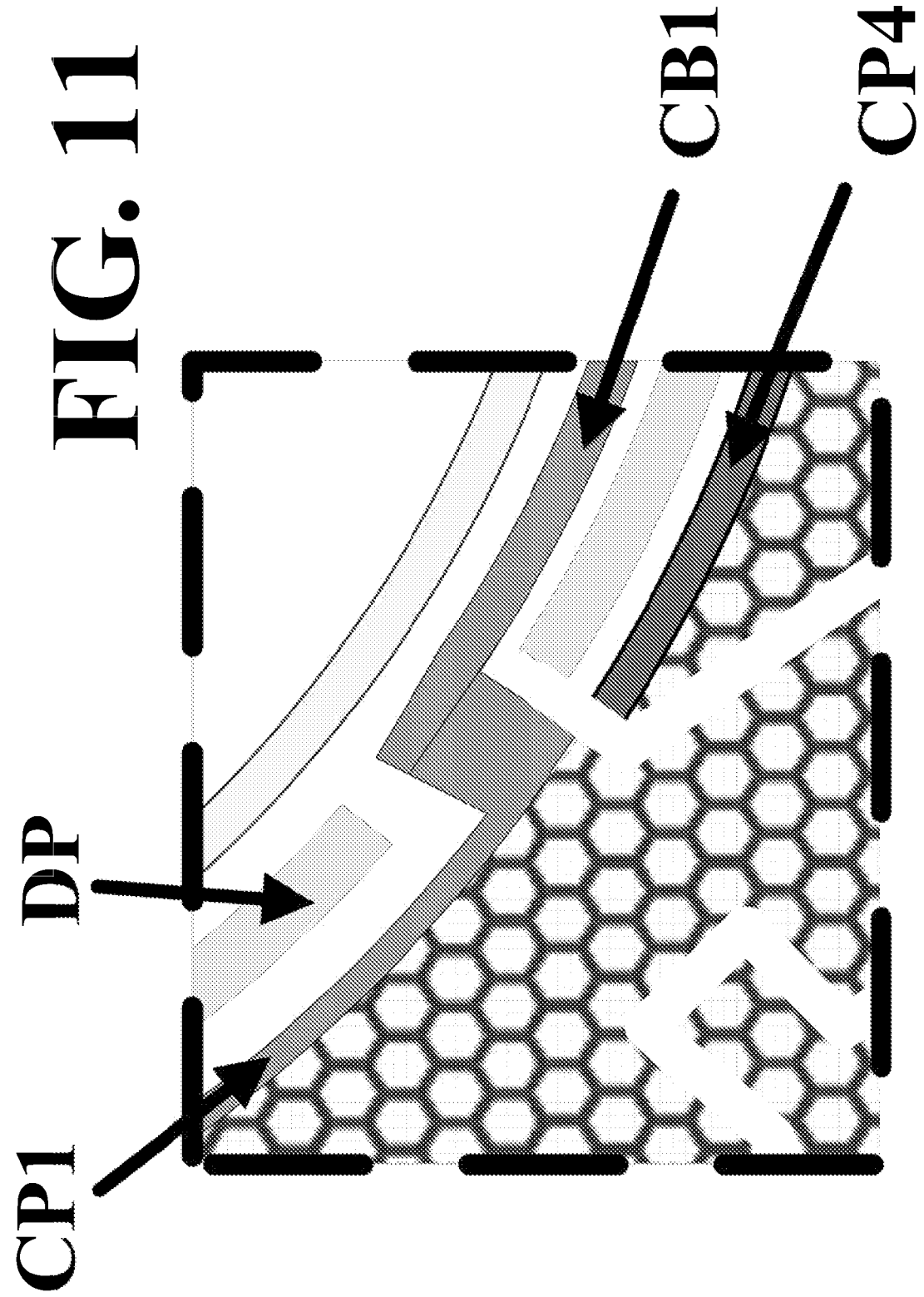
FIG. 11 is a zoom-in view of a third zoom-in region in FIG. 8.
Figure 12:
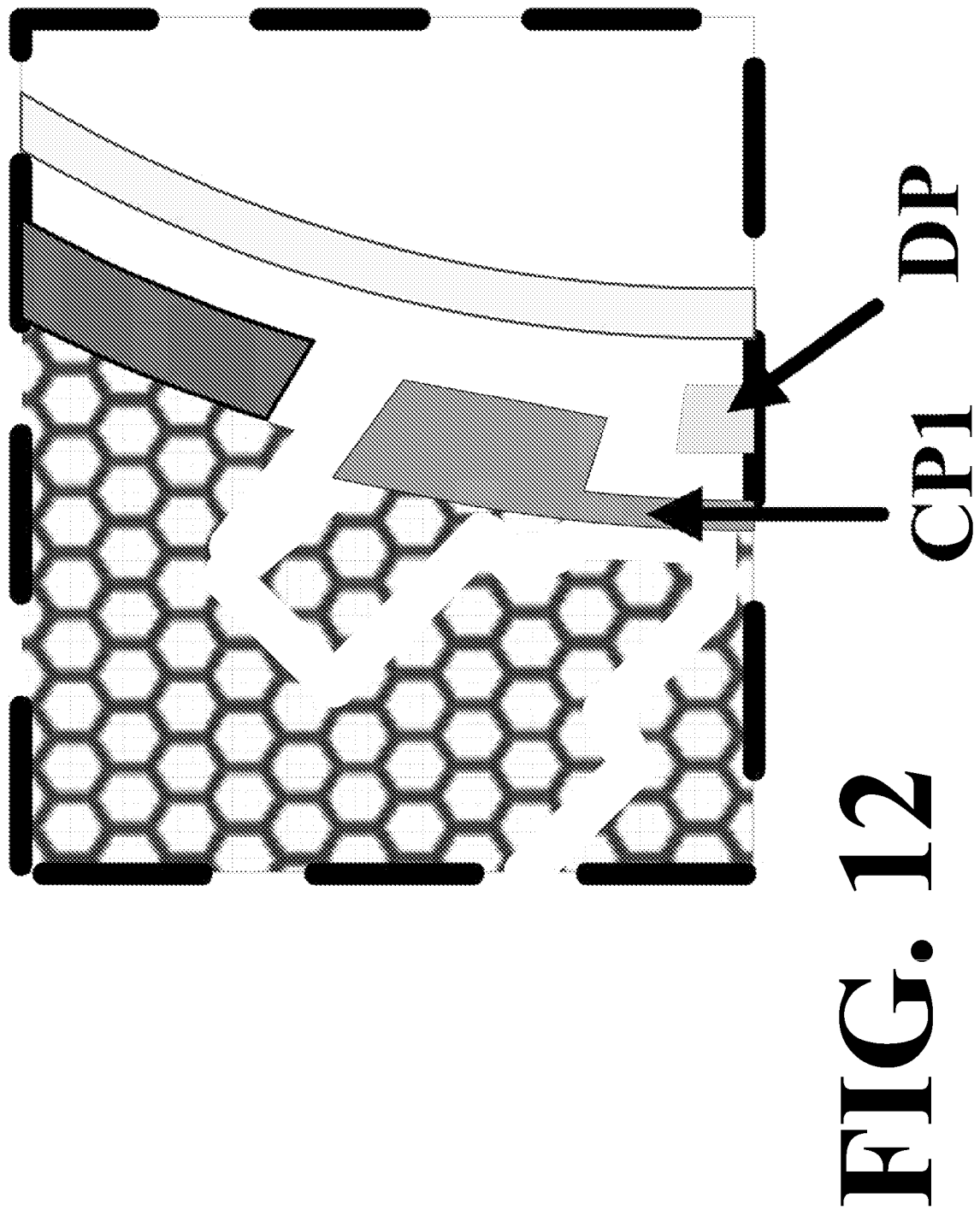
FIG. 12 is a zoom-in view of a fourth zoom-in region in FIG. 8.
Figure 13:
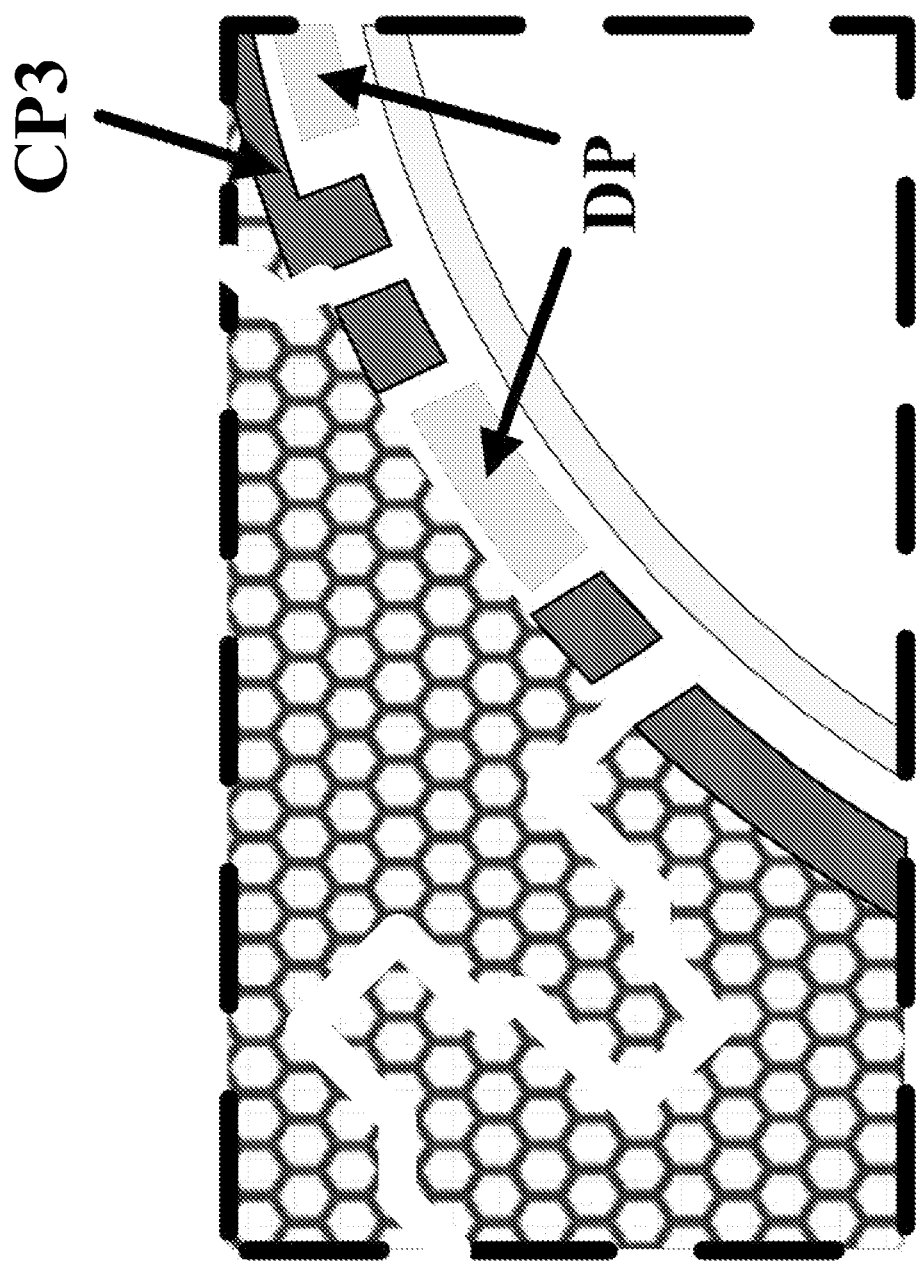
FIG. 13 is a zoom-in view of a fifth zoom-in region in FIG. 8.

FIG. 8 is a zoom-in view of a touch control structure surrounding a window region in some embodiments according to the present disclosure. FIG. 9 is a zoom-in view of a first zoom-in region ZR1 in FIG. 8. FIG. 10 is a zoom-in view of a second zoom-in region ZR2 in FIG. 8. FIG. 11 is a zoom-in view of a third zoom-in region ZR3 in FIG. 8. FIG. 12 is a zoom-in view of a fourth zoom-in region ZR4 in FIG. 8. FIG. 13 is a zoom-in view of a fifth zoom-in region ZR5 in FIG. 8. Referring to FIG. 2A, FIG. 8 to FIG. 13, in some embodiments, the window-crossing row Rwc of the plurality of first mesh electrodes TE1 includes a first mesh block MB1 and a second mesh block MB2 respectively on a first side S1 and a second side S2 of the window region WR; a first conductive plate CP1 directly connected to multiple mesh lines of the first mesh block MB1; a second conductive plate CP2 directly connected to multiple mesh lines of the second mesh block MB2; and a first conductive bridge CB1 connecting the first conductive plate CP1 and the second conductive plate CB2. In some embodiments, the window-crossing column Cwc of the plurality of second mesh electrodes TE2 includes a third mesh block MB3 and a fourth mesh block MB4 respectively on a third side S3 and a fourth side S4 of the window region WR; a third conductive plate CP3 directly connected to multiple mesh lines of the third mesh block MB3; a fourth conductive plate CP4 directly connected to multiple mesh lines of the fourth mesh block MB4; and a second conductive bridge CB2 connecting the third conductive plate CP3 and the fourth conductive plate CB4. Optionally, the first conductive plate CP1, the second conductive plate CP2, and the first conductive bridge CB1 are respectively around a first portion P1, a second portion P2, and a third portion P3 of a periphery of the window region WR. Optionally, the third portion P3 is partially overlapping with the first portion P1, and partially overlapping with the second portion P2. Optionally, the first portion P1 is on the first side S1 of the window region WR; the second portion P2 is on the second side S2 of the window region WR; and the third portion P3 is on the fourth side S4 of the window region WR. Optionally, the third conductive plate CP3, the fourth conductive plate CP4, and the second conductive bridge CB2 are respectively around a fourth portion P4, a fifth portion P5, and a sixth portion P6 of the periphery of the window region WR. Optionally, the sixth portion P6 is partially overlapping with the fourth portion P4, and partially overlapping with the fifth portion P5. Optionally, the fourth portion P4 is on the third side S3 of the window region WR; the fifth portion P5 is on the fourth side S4 of the window region WR; and the sixth portion P6 is on the second side S2 of the window region WR.

Figure 14:
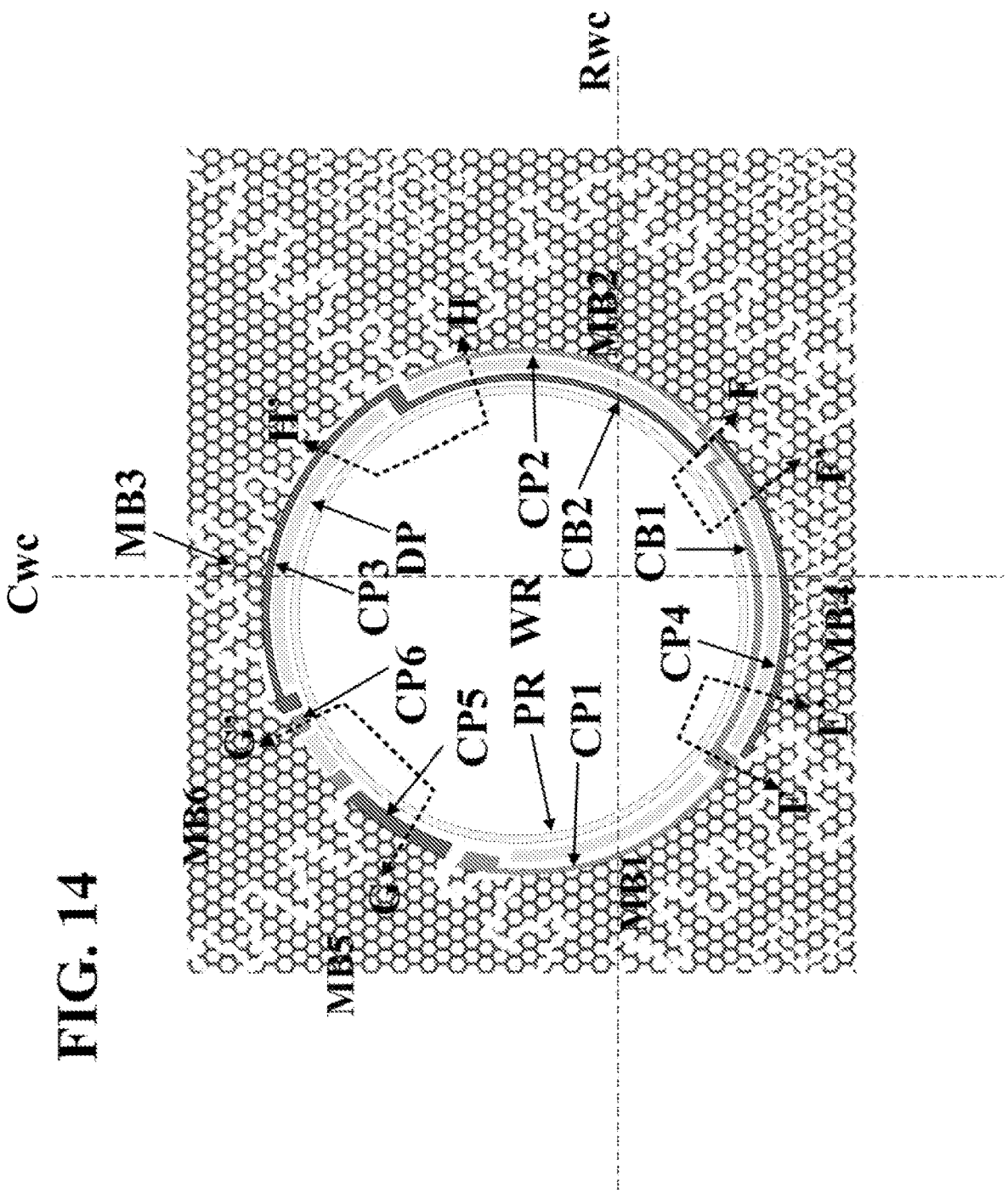
FIG. 14 is a zoom-in view of a touch control structure surrounding a window region in some embodiments according to the present disclosure.
Figure 15A:
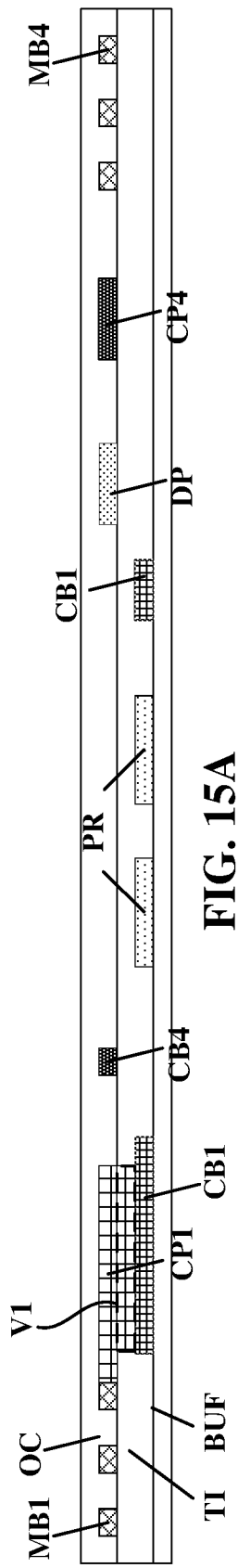
FIG. 15A is a cross-sectional view along an E-E' line in FIG. 14.
Figure 15B:
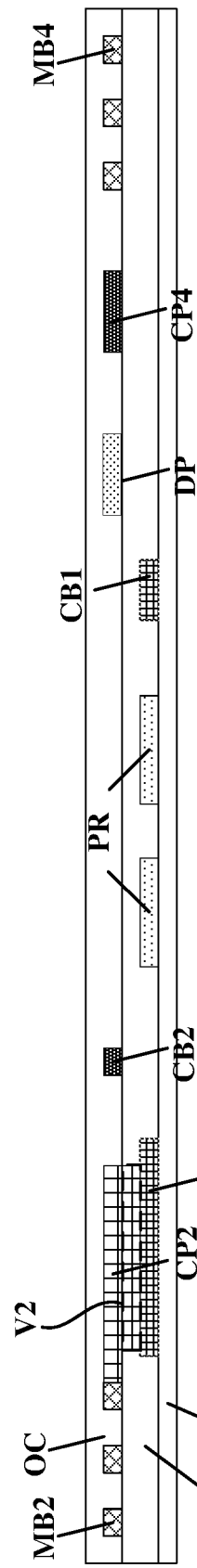
FIG. 15B is a cross-sectional view along an F-F' line in FIG. 14.
Figure 15C:
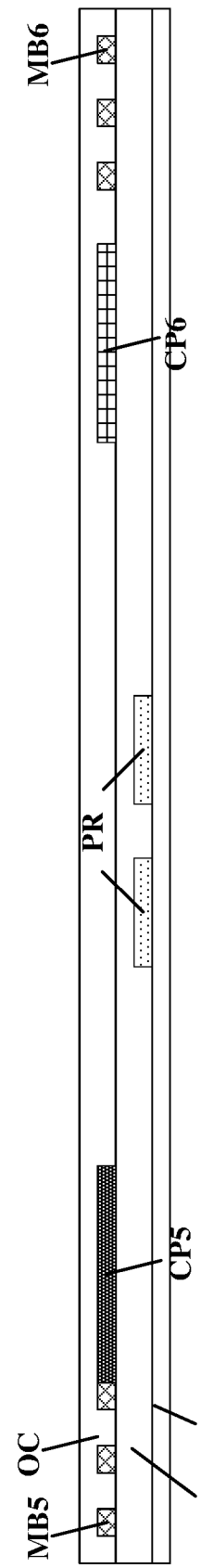
FIG. 15C is a cross-sectional view along a G-G' line in FIG. 14.
Figure 15D:
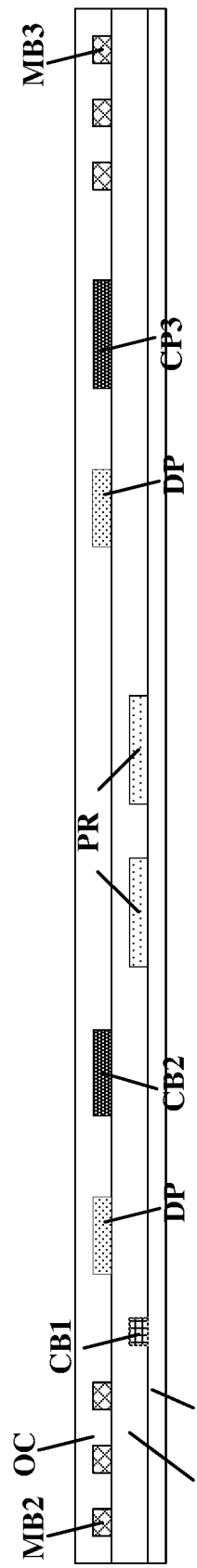
FIG. 15D is a cross-sectional view along an H-H' line in FIG. 14.

FIG. 14 is a zoom-in view of a touch control structure surrounding a window region in some embodiments according to the present disclosure. FIG. 15A is a cross-sectional view along an E-E' line in FIG. 14. FIG. 15B is a cross-sectional view along an F-F' line in FIG. 14. FIG. 15C is a cross-sectional view along an I-I' line in FIG. 14. FIG. 15D is a cross-sectional view along a J-J' line in FIG. 14. The first conductive bridge CB1 is respectively connected to the first conductive plate CP1 and the second conductive plate CP2 respectively through a first via V1 and a second via V2 respectively extending through a touch insulating layer TI between the first conductive bridge CB1 and the first conductive plate CP1, and between the first conductive bridge CB1 and the second conductive plate CB2. Optionally, the first mesh block MB1, the second mesh block MB2, the first conductive plate CP1, and the second conductive plate CP2 are in a same layer. Optionally, the first mesh block MB1, the second mesh block MB2, the third mesh block MB3, the fourth mesh block MB4, the first conductive plate CP1, the second conductive plate CP2, the third conductive plate CP3, the fourth conductive plate CP4, and the second conductive bridge CB2 are in a same layer.

Referring to FIG. 2A, FIG. 8 to FIG. 14, FIG. 15A and FIG. 15B, in some embodiments, the touch control structure further includes a plurality of dummy plates DP surrounding the window region WR. Each of the plurality of dummy plates DP is spaced apart from the adjacent conductive component(s), e.g., from adjacent conductive plates, adjacent mesh blocks, and conductive bridges. In one example, each of the plurality of dummy plates DP is a floating conductive block.

In some embodiments, an orthographic projection of a respective one of the plurality of dummy plates DP on the touch insulating layer TI is between an orthographic projection of a respective one of the conductive plates on the touch insulating layer TI and an orthographic projection of the protective ring PR on the touch insulating layer TI. Optionally, an orthographic projection of a first respective one of the plurality of dummy plates DP on the touch insulating layer TI is between an orthographic projection of the third conductive plate CP3 on the touch insulating layer TI and the orthographic projection of the protective ring PR on the touch insulating layer TI. Optionally, an orthographic projection of a second respective one of the plurality of dummy plates DP on the touch insulating layer TI is between an orthographic projection of the second conductive plate CP2 on the touch insulating layer TI and the orthographic projection of the protective ring PR on the touch insulating layer TI. Optionally, an orthographic projection of a third respective one of the plurality of dummy plates DP on the touch insulating layer TI is between an orthographic projection of the fourth conductive plate CP4 on the touch insulating layer TI and the orthographic projection of the protective ring PR on the touch insulating layer TI. Optionally, an orthographic projection of a fourth respective one of the plurality of dummy plates DP on the touch insulating layer TI is between an orthographic projection of the first conductive plate CP1 on the touch insulating layer TI and the orthographic projection of the protective ring PR on the touch insulating layer TI.

Optionally, the orthographic projection of the third respective one of the plurality of dummy plates DP on the touch insulating layer TI is between an orthographic projection of the fourth conductive plate CP4 on the touch insulating layer TI and the orthographic projection of the first conductive bridge CB1 on the touch insulating layer TI.

Optionally, an orthographic projection of a second respective one of the plurality of dummy plates DP on the touch insulating layer TI is between an orthographic projection of the second conductive plate CP2 on the touch insulating layer TI and the orthographic projection of the second conductive bridge CB2 on the touch insulating layer TI.

Referring to FIG. 15C, the touch control structure further includes a fifth conductive plate CP5 directly connected to multiple mesh lines of a mesh block MB5 of an adjacent first mesh electrode of the plurality of first mesh electrodes TE1, and a sixth conductive plate CP6 directly connected to multiple mesh lines of a mesh block MB6 of an adjacent second mesh electrode of the plurality of second mesh electrodes TE2.

Figure 16A:
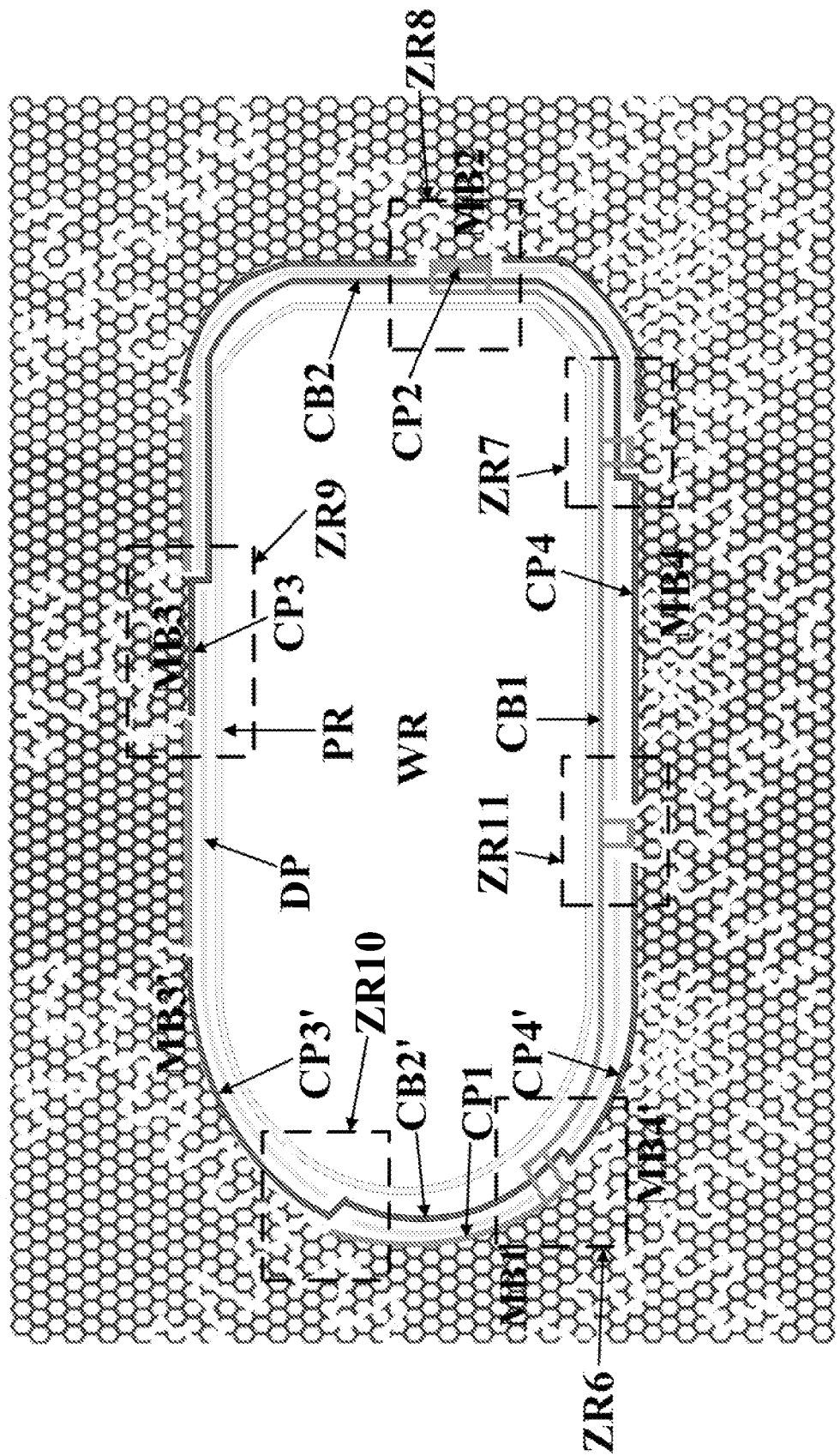
FIG. 16A is a zoom-in view of a touch control structure surrounding a window region in some embodiments according to the present disclosure.
Figure 17:
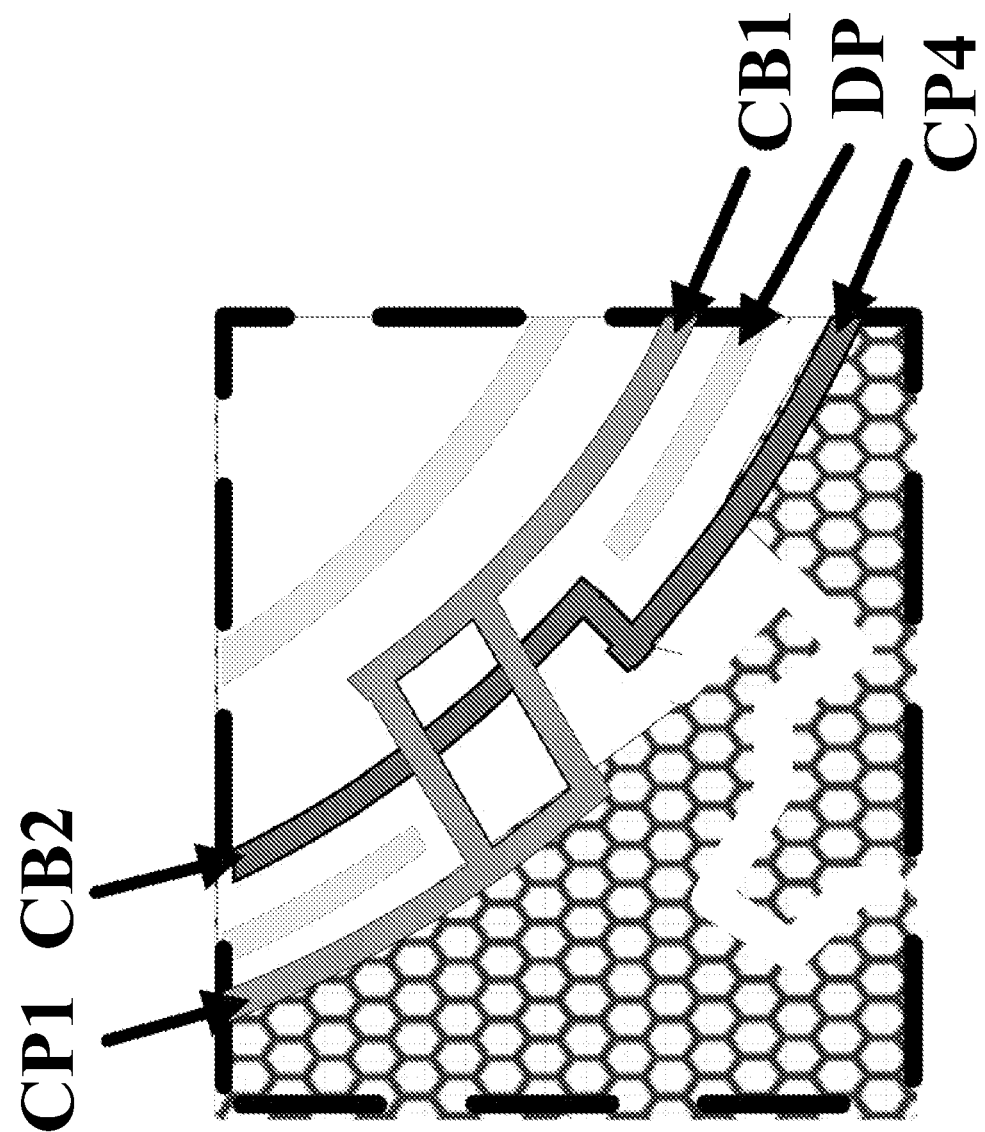
FIG. 17 is a zoom-in view of a sixth zoom-in region in FIG. 16A.
Figure 18:
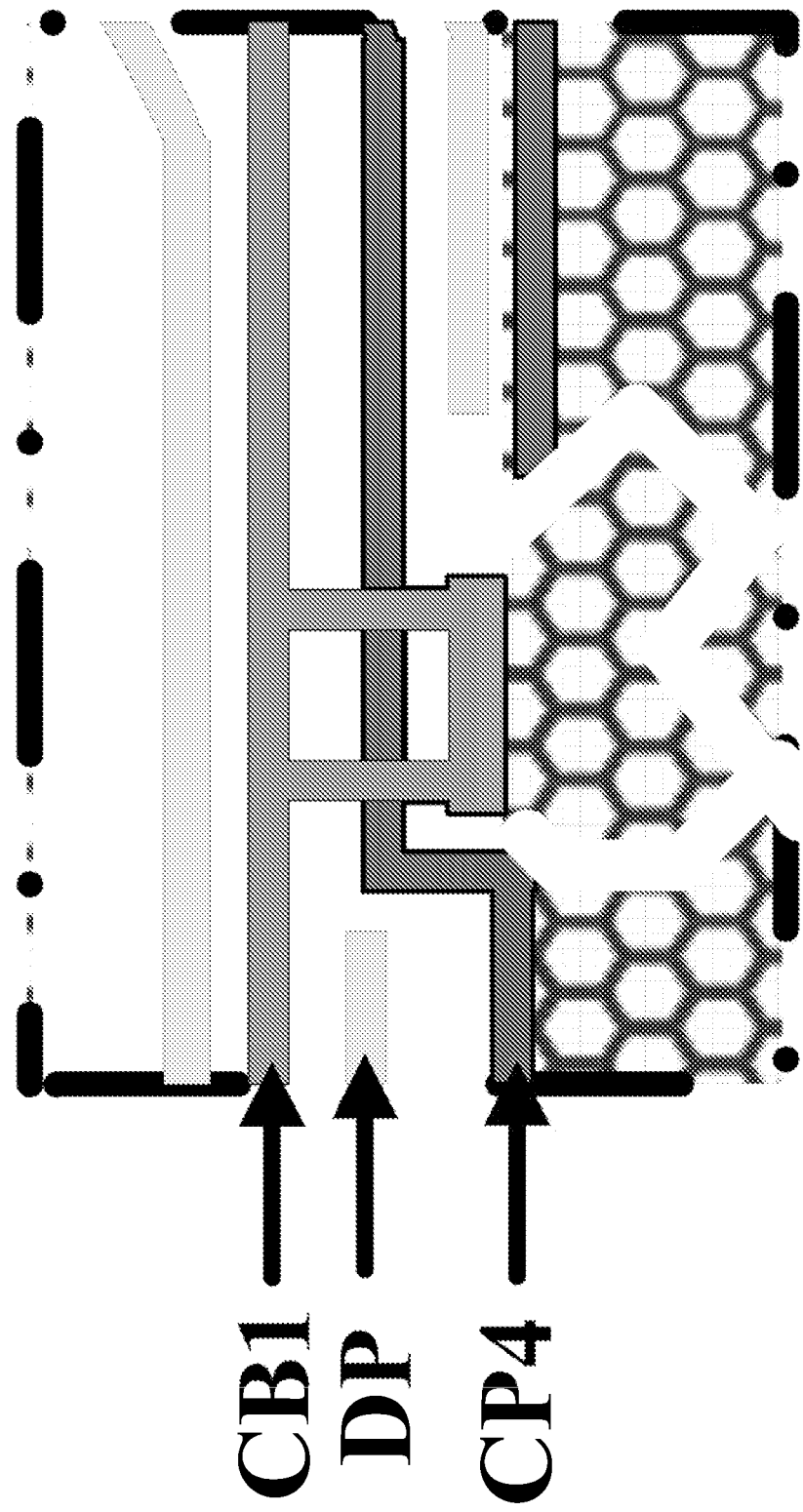
FIG. 18 is a zoom-in view of a seventh zoom-in region in FIG. 16A.
Figure 19:
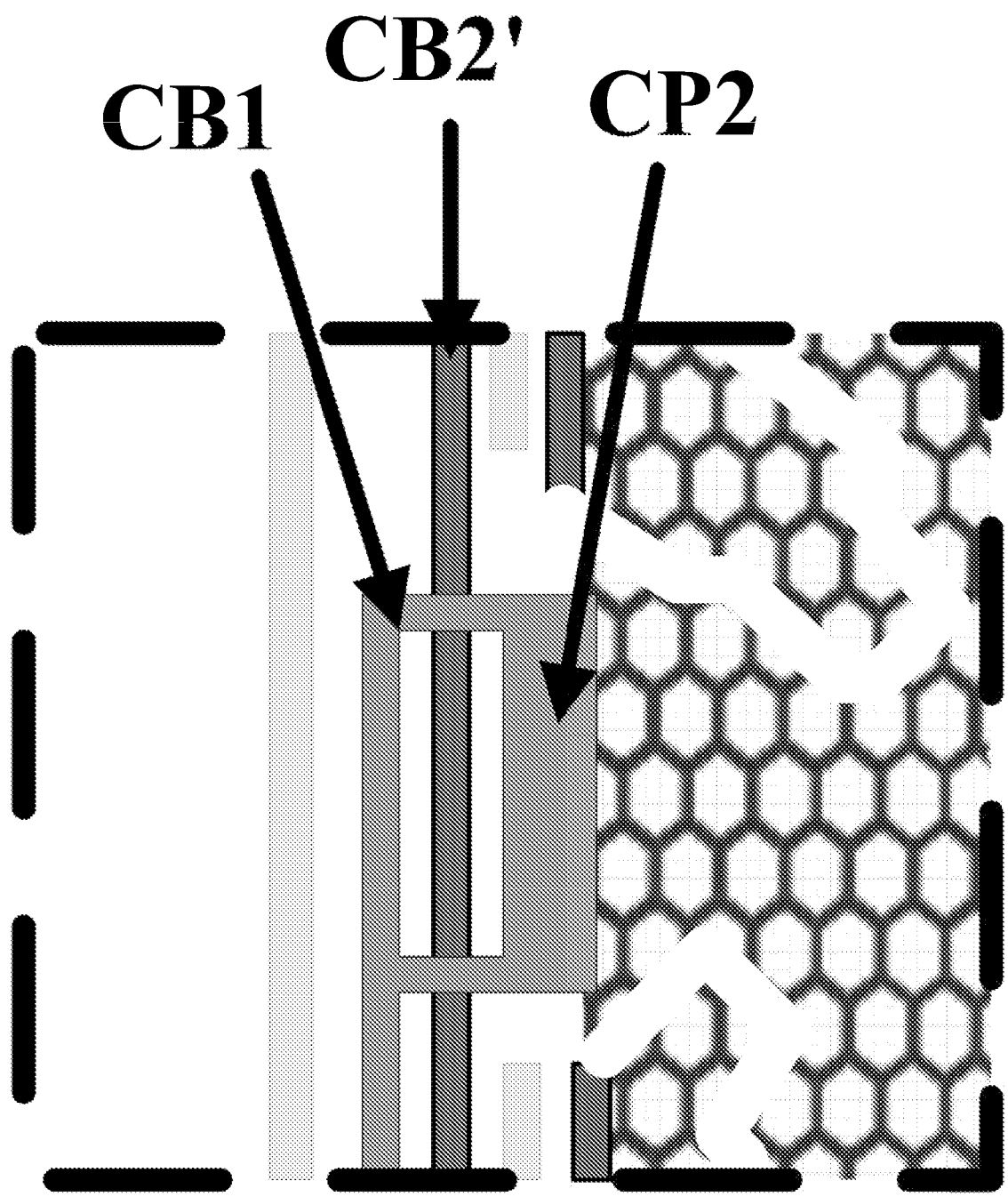
FIG. 19 is a zoom-in view of an eighth zoom-in region in FIG. 16A.
Figure 20:
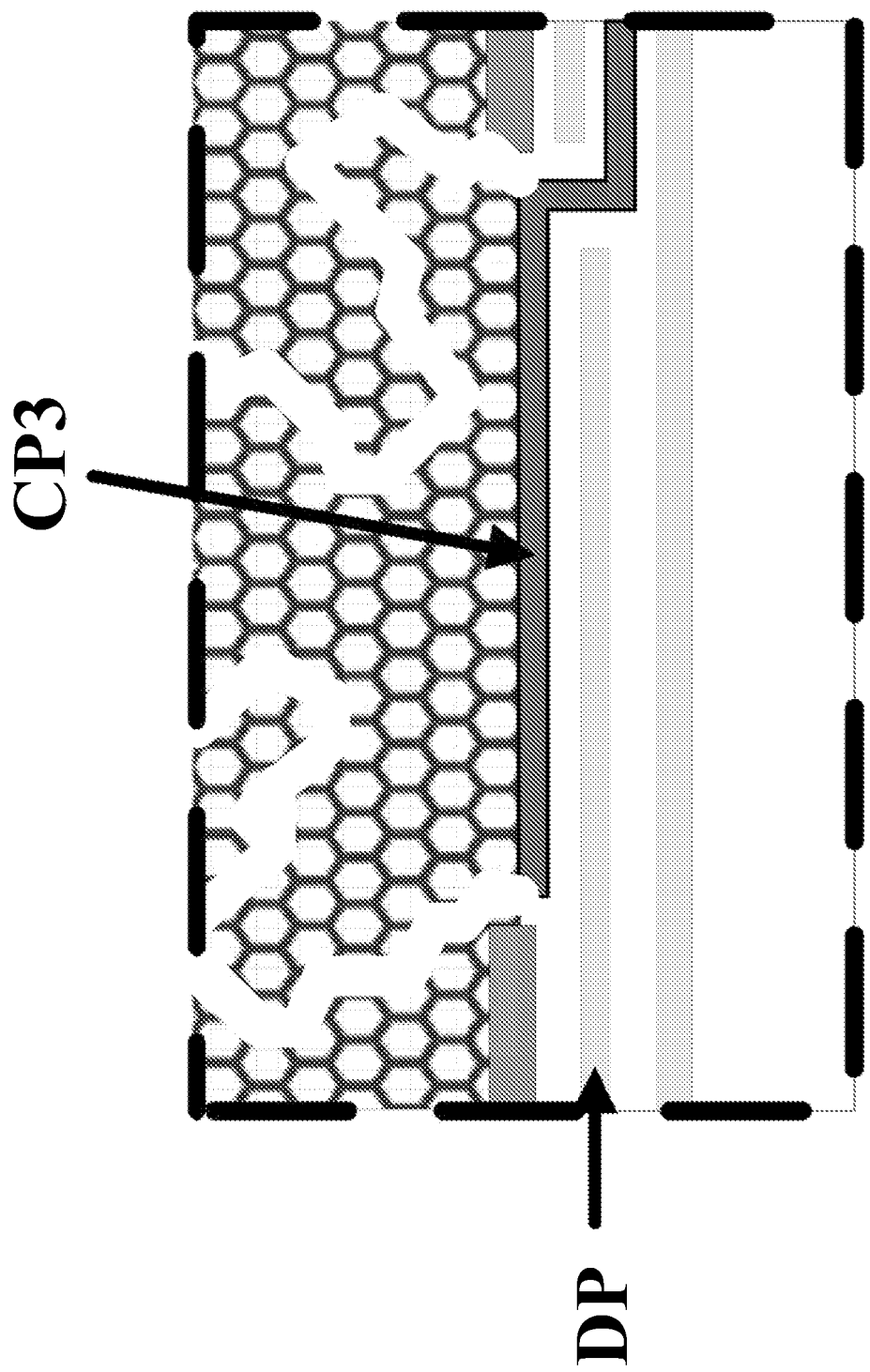
FIG. 20 is a zoom-in view of a ninth zoom-in region in FIG. 16A.
Figure 21:
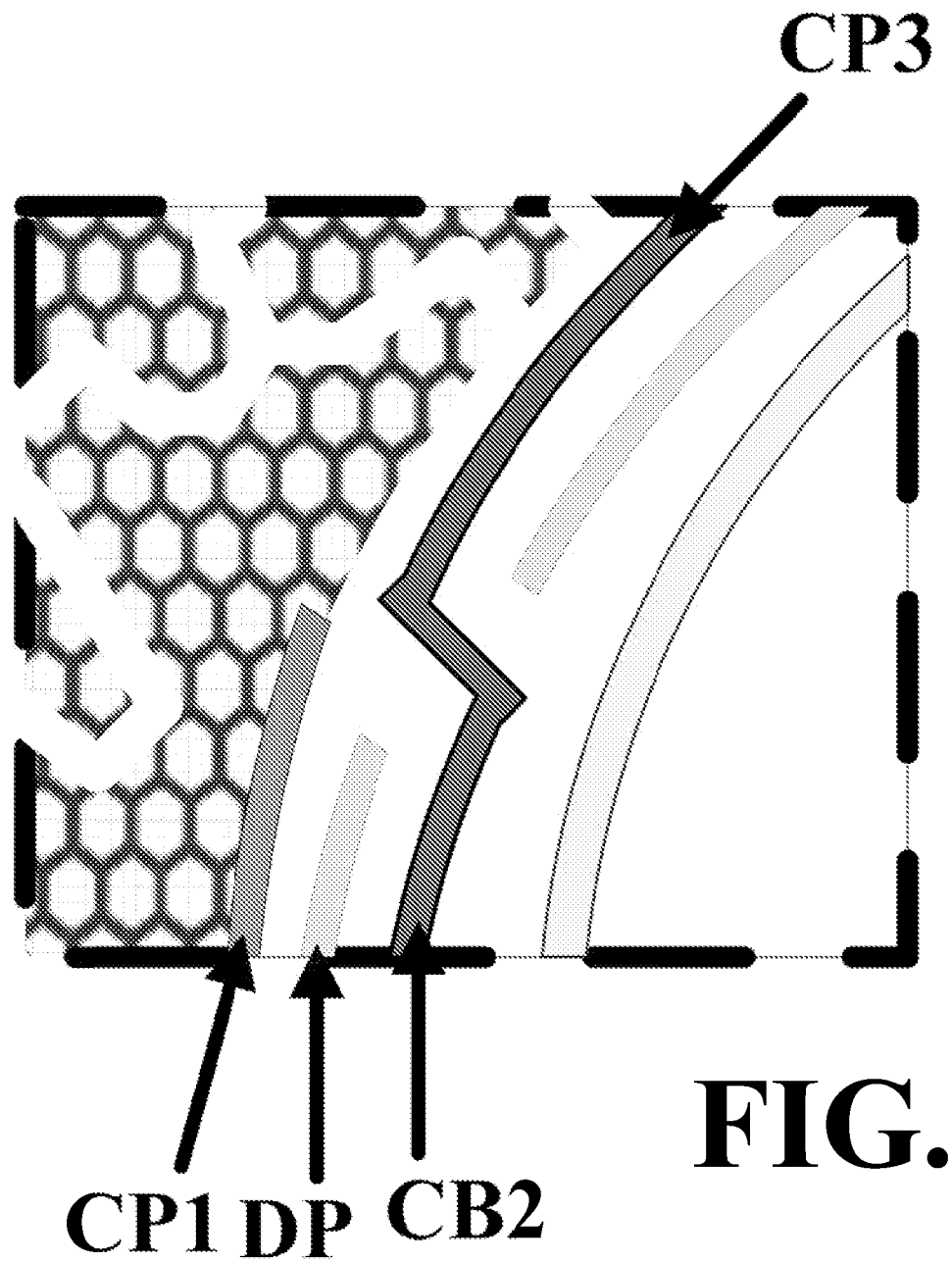
FIG. 21 is a zoom-in view of a tenth zoom-in region in FIG. 16A.
Figure 22:
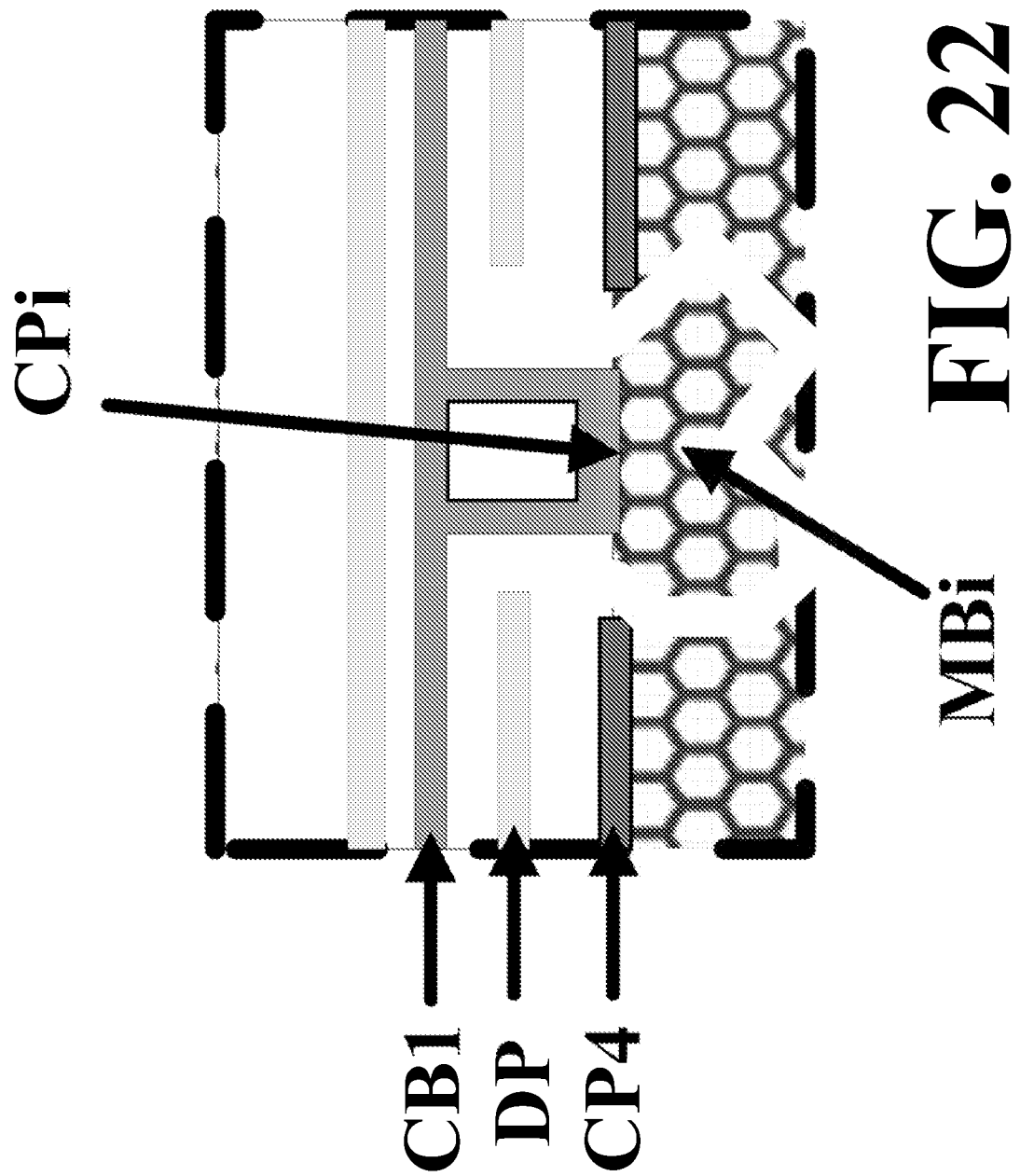
FIG. 22 is a zoom-in view of an eleventh zoom-in region in FIG. 16A.

FIG. 16A is a zoom-in view of a touch control structure surrounding a window region in some embodiments according to the present disclosure. FIG. 17 is a zoom-in view of a sixth zoom-in region ZR6 in FIG. 16A. FIG. 18 is a zoom-in view of a seventh zoom-in region ZR7 in FIG. 16A. FIG. 19 is a zoom-in view of an eighth zoom-in region ZR8 in FIG. 16A. FIG. 20 is a zoom-in view of a ninth zoom-in region ZR9 in FIG. 16A. FIG. 21 is a zoom-in view of a tenth zoom-in region ZR10 in FIG. 16A. FIG. 22 is a zoom-in view of an eleventh zoom-in region ZR11 in FIG. 16A. Referring to FIG. 16A, in some embodiments, the display panel has more than one window regions. For example, the right window region corresponds to a window region depicted in FIG. 8 or FIG. 14. The left window region is another window region in the display panel adjacent to the right window region. The touch control structure surrounding the left window region has a structure highly similar to the one surrounding the right window region.

In some embodiments, a first mesh block MB1 and a second mesh block MB2 are respectively arranged on a first side and a second side of the window region WR. A first conductive plate CP1 is directly connected to multiple mesh lines of the first mesh block MB1; a second conductive plate CP2 is directly connected to multiple mesh lines of the second mesh block MB2; and a first conductive bridge CB1 connects the first conductive plate CP1 and the second conductive plate CB2.

In some embodiments, a third mesh block MB3 and a fourth mesh block MB4 are respectively arranged on a third side and a fourth side of the window region WR; a third conductive plate CP3 is directly connected to multiple mesh lines of the third mesh block MB3; a fourth conductive plate CP4 is directly connected to multiple mesh lines of the fourth mesh block MB4; and a second conductive bridge CB2 connects the third conductive plate CP3 and the fourth conductive plate CB4.

In some embodiments, an additional third mesh block MB3' (different from the third mesh block MB3) and an additional fourth mesh block MB4' (different from the fourth mesh block MB4) are respectively arranged on the third side and the fourth side of the window region WR. The additional third mesh block MB3' and the additional fourth mesh block MB4' are in a column different from the column of the third mesh block MB3 and the fourth mesh block MB4. The touch control structure further includes an additional third conductive plate CP3' directly connected to multiple mesh lines of the additional third mesh block MB3'; an additional fourth conductive plate CP4' directly connected to multiple mesh lines of the additional fourth mesh block MB4'; and an additional second conductive bridge CB2' connects the additional third conductive plate CP3' and the additional fourth conductive plate CP4'.

Figure 16B:
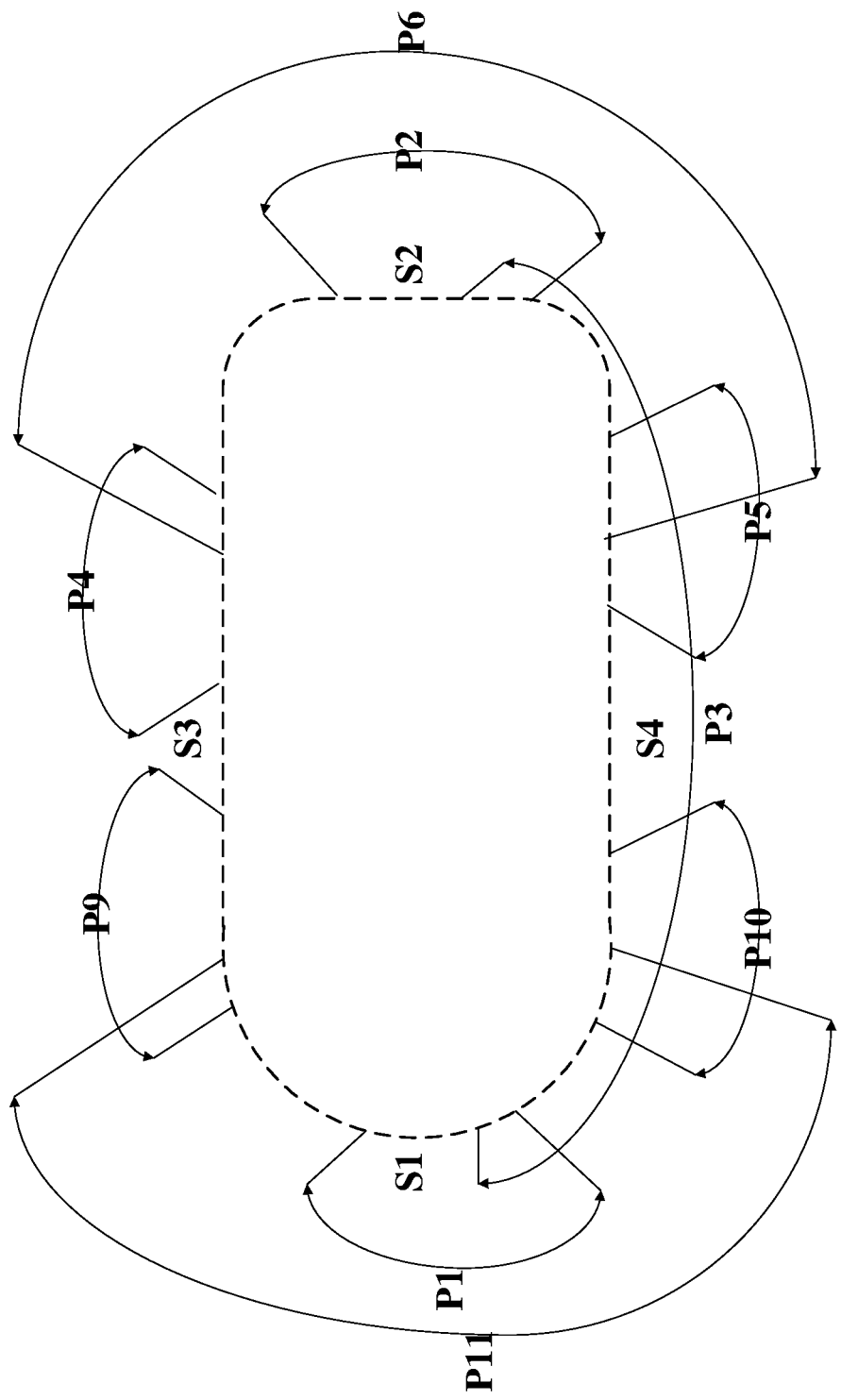
FIG. 16B is a schematic diagram illustrating a window region in some embodiments according to the present disclosure.

FIG. 16B is a schematic diagram illustrating a window region in some embodiments according to the present disclosure. Referring to FIG. 16A and FIG. 16B, the first conductive plate CP1, the second conductive plate CP2, and the first conductive bridge CB1 are respectively around a first portion P1, a second portion P2, and a third portion P3 of a periphery of the window region WR. Optionally, the third portion P3 is partially overlapping with the first portion P1, and partially overlapping with the second portion P2. Optionally, the first portion P1 is on the first side S1 of the window region WR; the second portion P2 is on the second side S2 of the window region WR; and the third portion P3 is on the fourth side S4 of the window region WR. Optionally, the third conductive plate CP3, the fourth conductive plate CP4, and the second conductive bridge CB2 are respectively around a fourth portion P4, a fifth portion P5, and a sixth portion P6 of the periphery of the window region WR. Optionally, the sixth portion P6 is partially overlapping with the fourth portion P4, and partially overlapping with the fifth portion P5. Optionally, the fourth portion P4 is on the third side S3 of the window region WR; the fifth portion P5 is on the fourth side S4 of the window region WR; and the sixth portion P6 is on the second side S2 of the window region WR. Optionally, the additional third conductive plate CP3', the additional fourth conductive plate CP4', and the additional second conductive bridge CB2' are respectively around a ninth portion P9, a tenth portion P10, and an eleventh portion P11 of the periphery of the window region WR. Optionally, the eleventh portion P11 is partially overlapping with the ninth portion P9, and partially overlapping with the tenth portion P10. Optionally, the ninth portion P9 is on the third side S3 of the window region WR; the tenth portion P10 is on the fourth side S4 of the window region WR; and the eleventh portion P11 is on the first side TE1 of the window region WR.

Referring to FIG. 16A and FIG. 22, the touch control structure in some embodiments further includes an intermediate mesh blocks MBi in the touch transmission path between the first mesh block MB1 and the second mesh block MB2. The touch control structure in some embodiments further includes an intermediate conductive plate CPi. The intermediate conductive plate CPi is directly connected to multiple mesh lines of the intermediate mesh block MBi, and is connected to the first conductive bridge CB1.

In some embodiments, the first conductive bridge CB1 is respectively connected to the first conductive plate CP1 and the second conductive plate CP2 respectively through vias respectively extending through an insulating layer between the first conductive bridge CB1 and the first conductive plate CP1, and between the first conductive bridge CB1 and the second conductive plate CB2. Optionally, the first mesh block MB1, the second mesh block MB2, the first conductive plate CP1, and the second conductive plate CP2 are in a same layer. Optionally, the first mesh block MB1, the second mesh block MB2, the third mesh block MB3, the fourth mesh block MB4, the first conductive plate CP1, the second conductive plate CP2, the third conductive plate CP3, the fourth conductive plate CP4, and the second conductive bridge CB2 are in a same layer, and are in a layer different from the first conductive bridge CB1.

Optionally, the first mesh block MB1, the second mesh block MB2, the third mesh block MB3, the fourth mesh block MB4, the additional third mesh block MB3', the additional fourth mesh block MB4', the first conductive plate CP1, the second conductive plate CP2, the third conductive plate CP3, the fourth conductive plate CP4, the additional third conductive plate CP3', the additional fourth conductive plate CP4', the second conductive bridge CB2 and the additional second conductive bridge CB2' are in a same layer, and are in a layer different from the first conductive bridge CB1.

Figure 23:
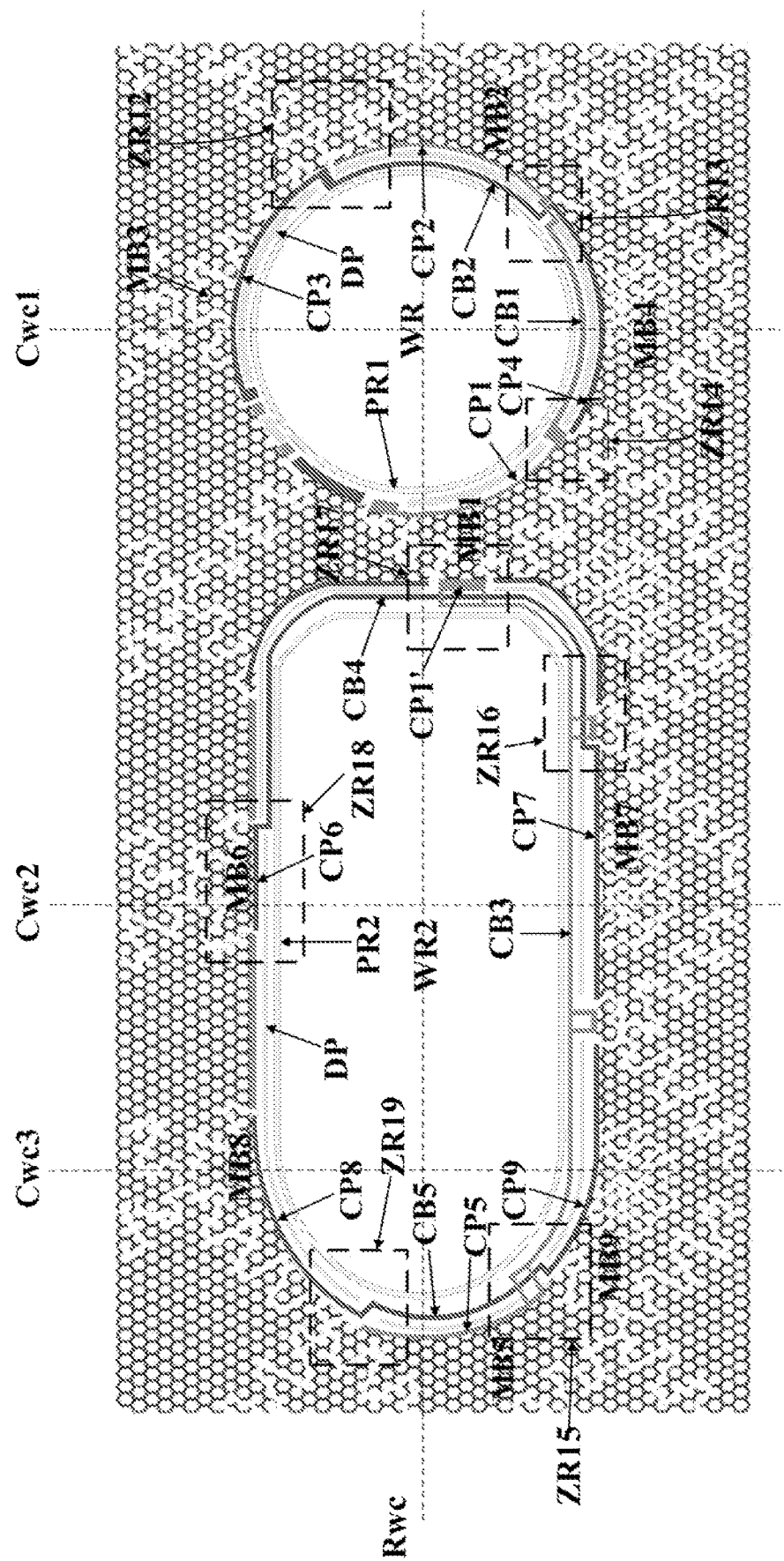
FIG. 23 is a zoom-in view of a touch control structure surrounding a window region in some embodiments according to the present disclosure.
Figure 24:
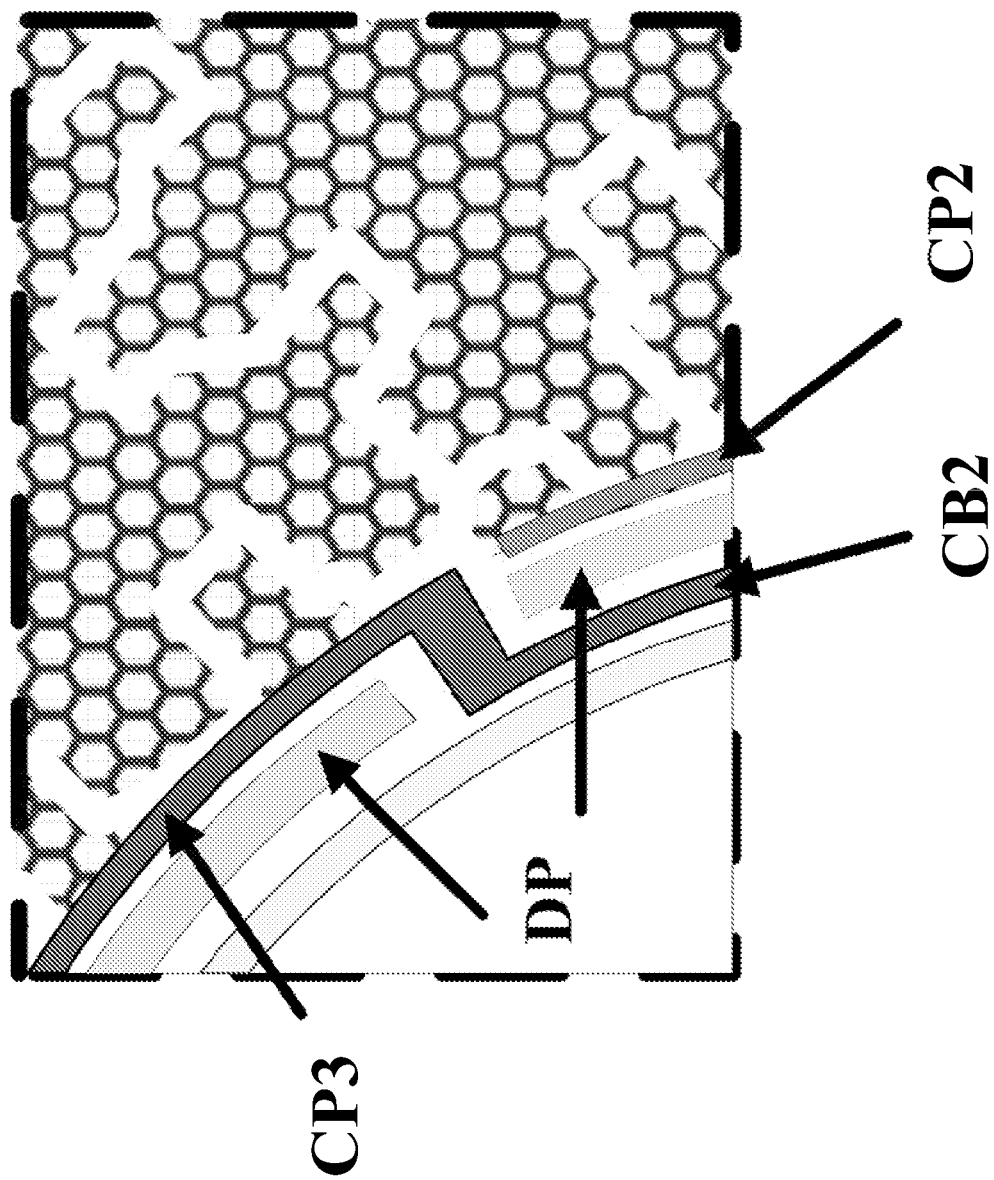
FIG. 24 is a zoom-in view of a twelfth zoom-in region in FIG. 23.
Figure 25:
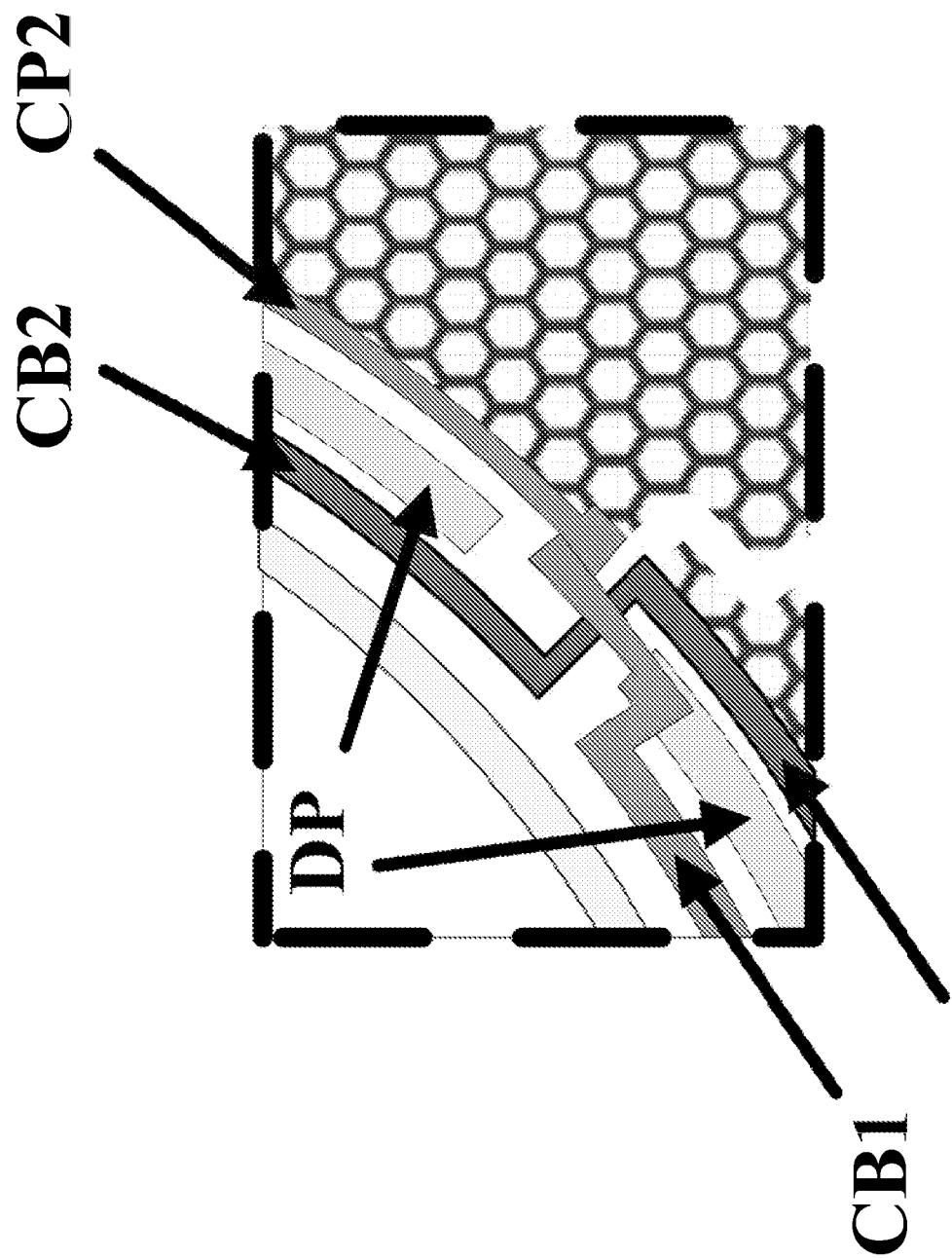
FIG. 25 is a zoom-in view of a thirteenth zoom-in region in FIG. 23.
Figure 26:
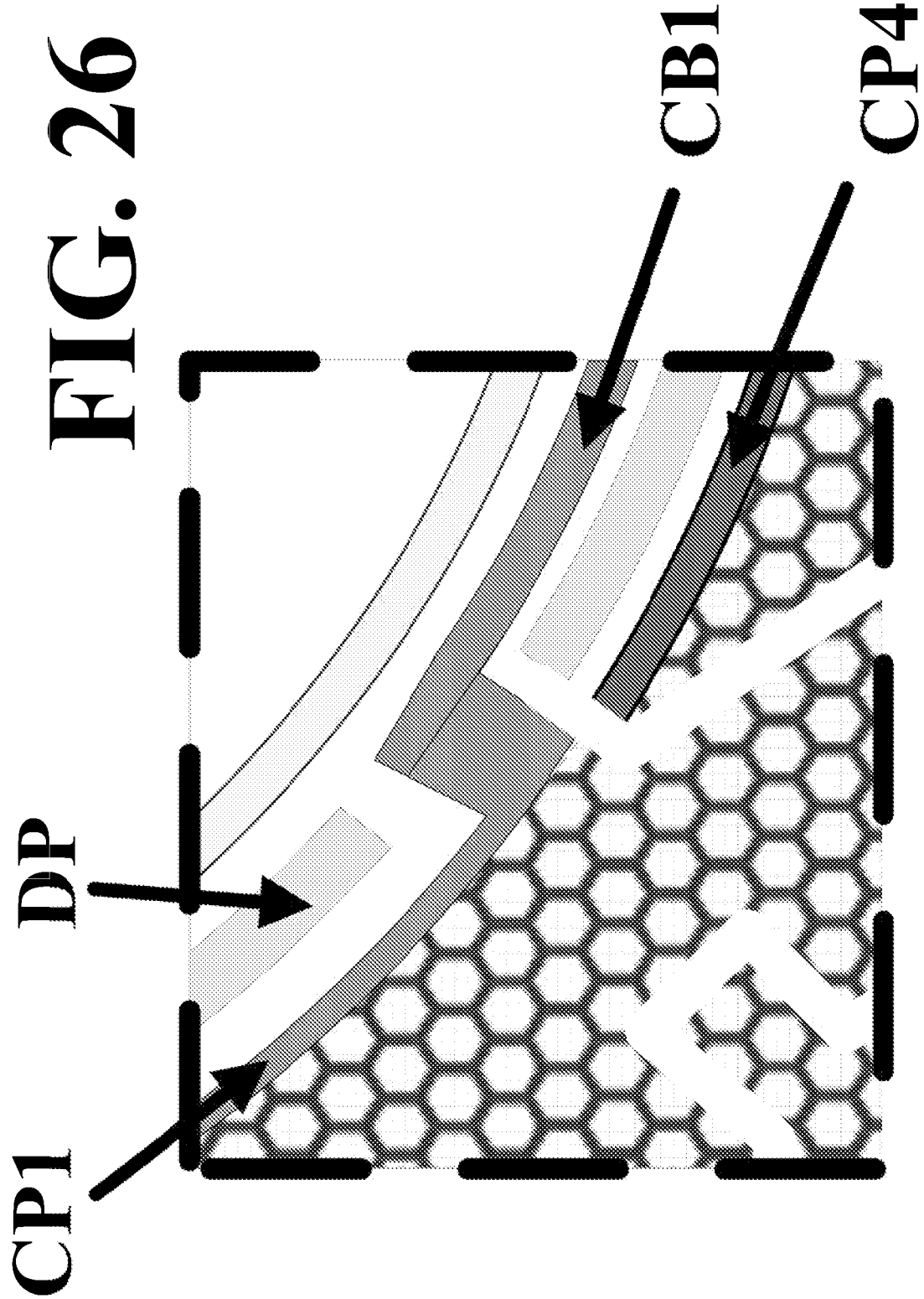
FIG. 26 is a zoom-in view of a fourteenth zoom-in region in FIG. 23.
Figure 27:
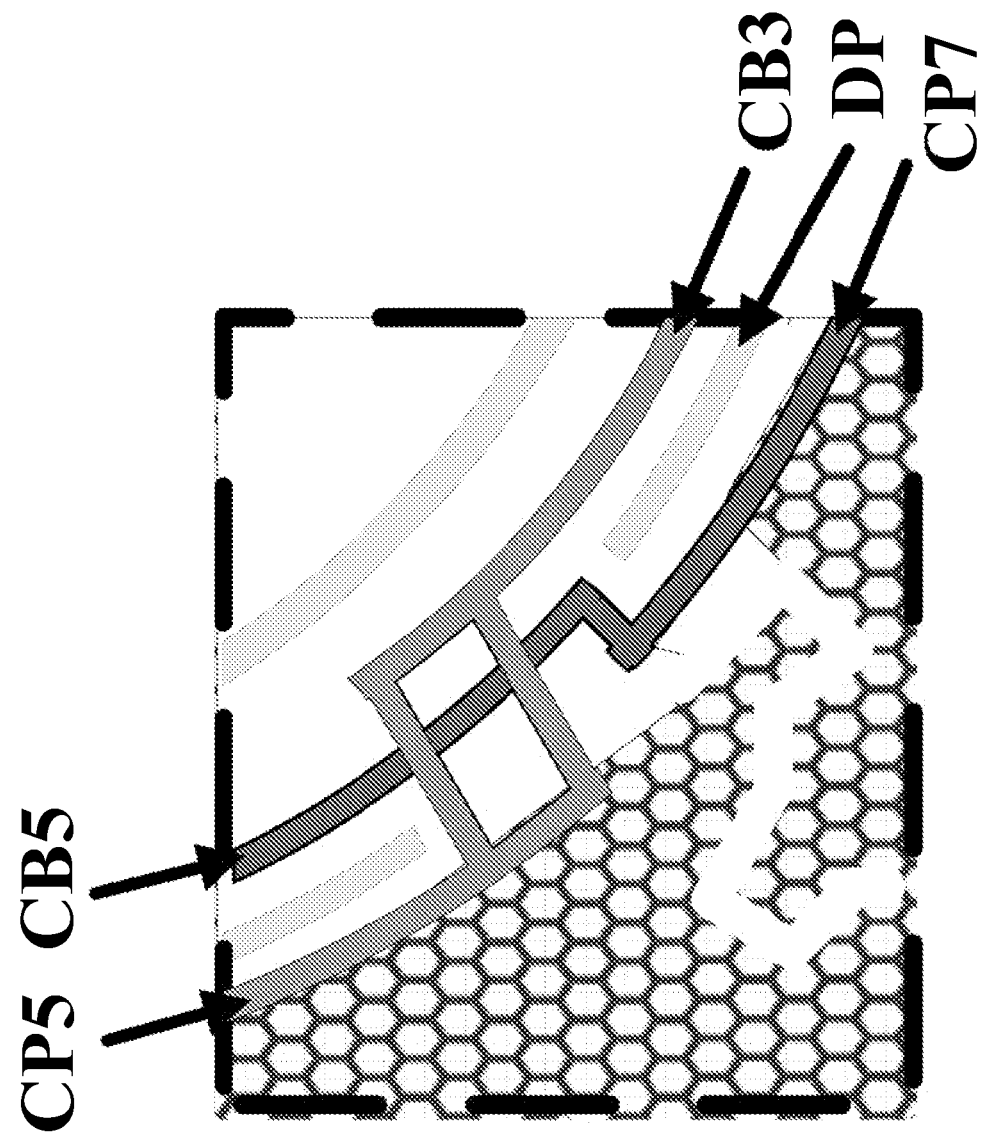
FIG. 27 is a zoom-in view of a fifteenth zoom-in region in FIG. 23.
Figure 28:
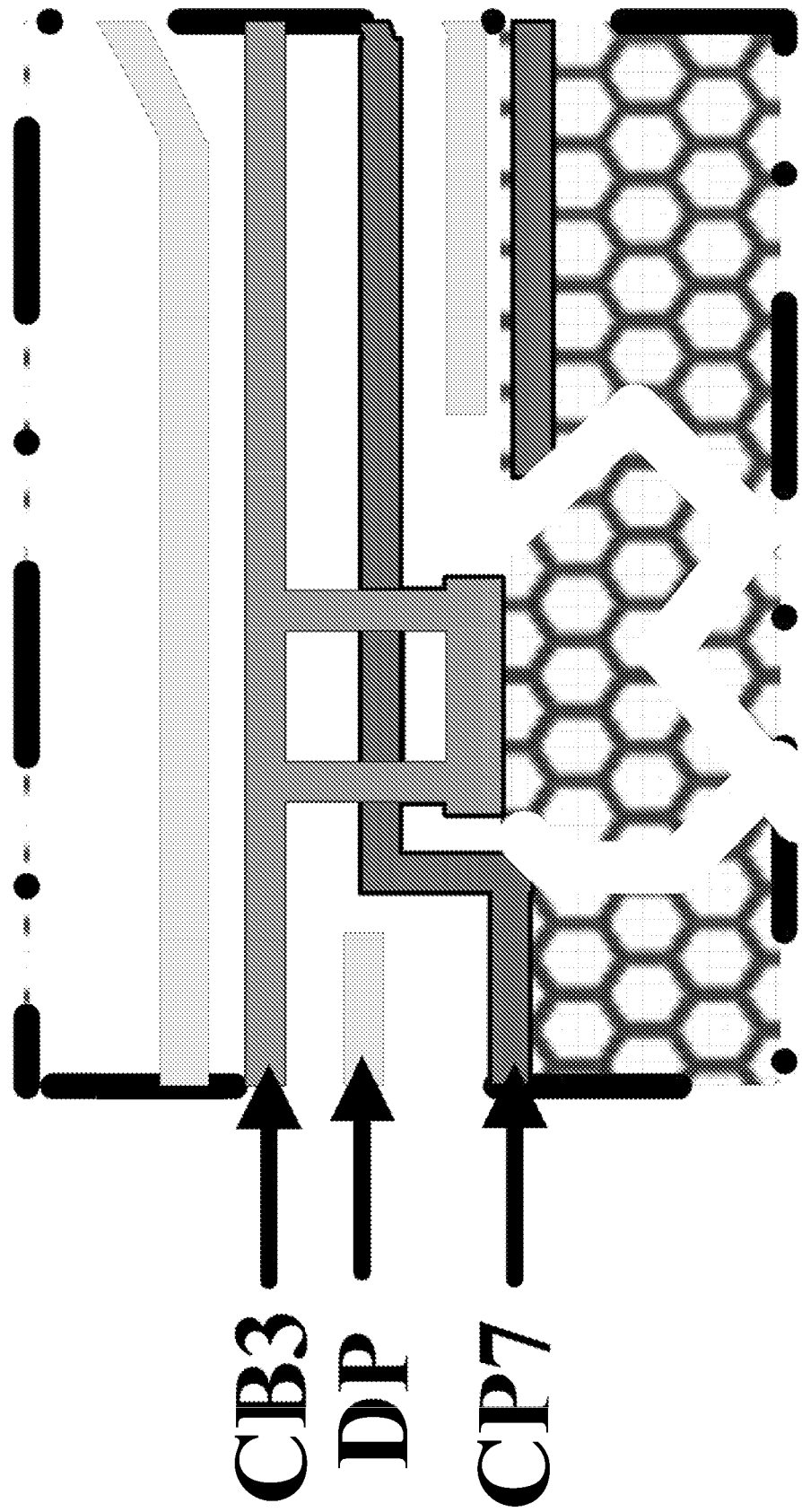
FIG. 28 is a zoom-in view of a sixteenth zoom-in region in FIG. 23.
Figure 29:
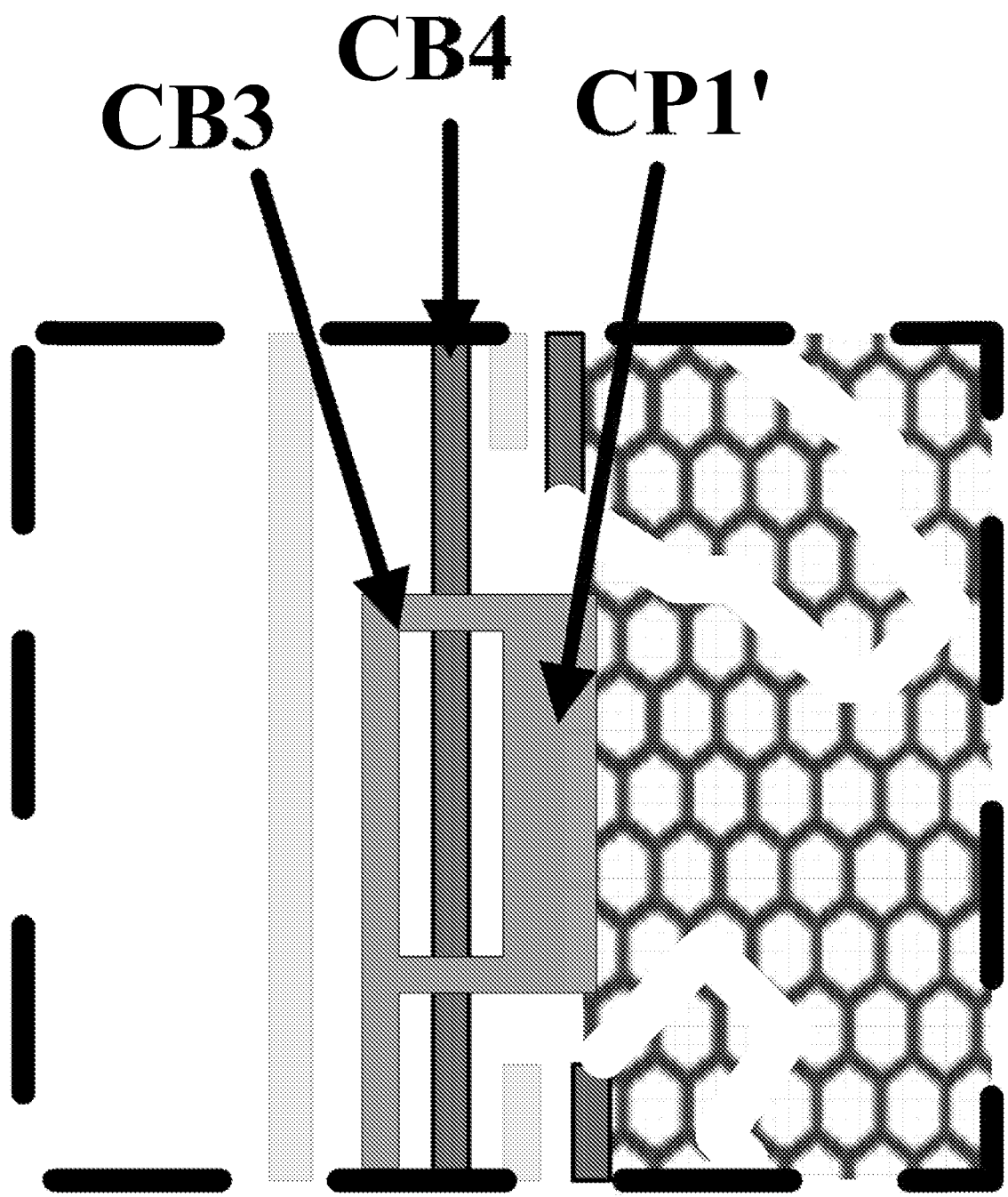
FIG. 29 is a zoom-in view of a seventeenth zoom-in region in FIG. 23.
Figure 30:
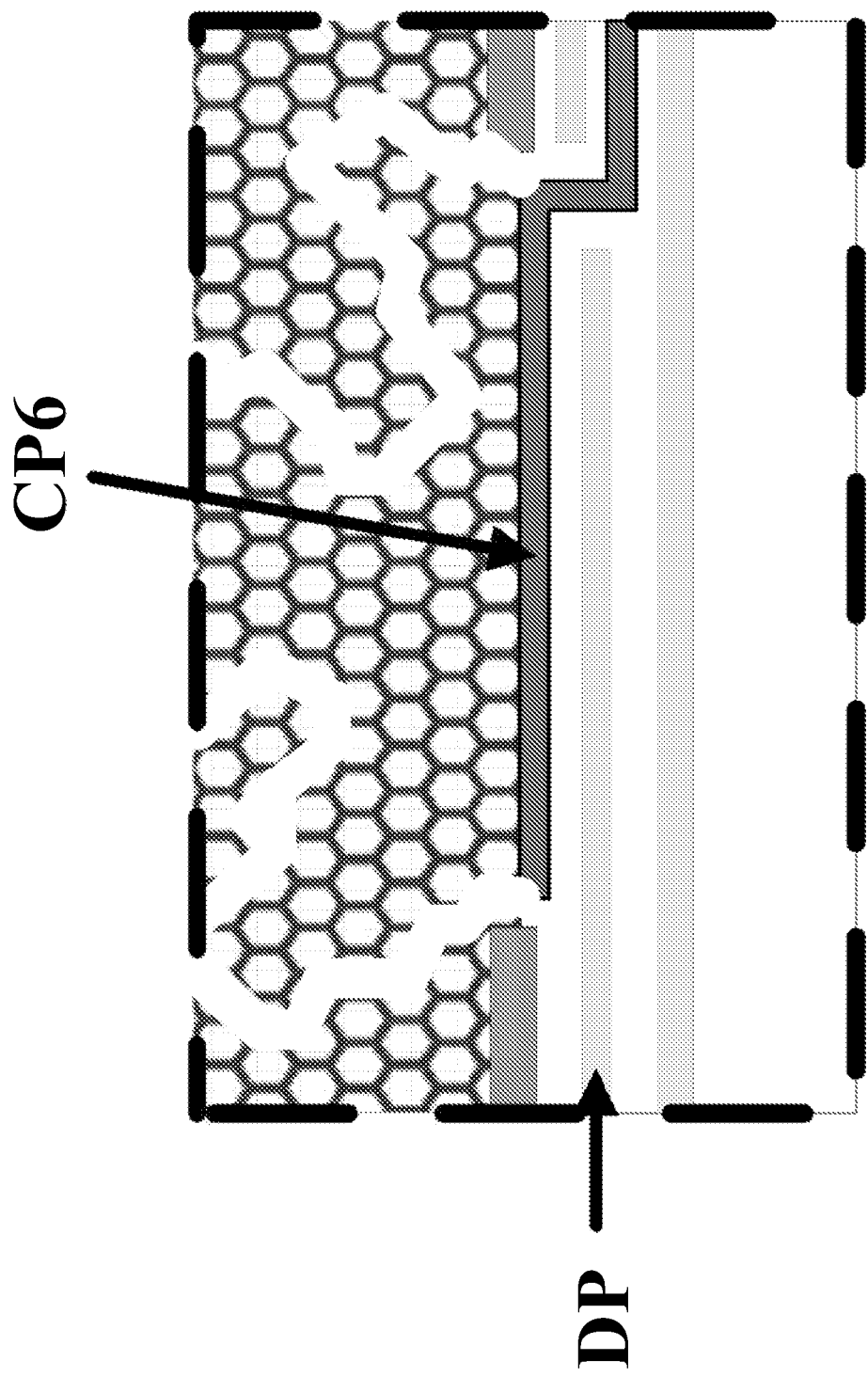
FIG. 30 is a zoom-in view of an eighteenth zoom-in region in FIG. 23.
Figure 31:
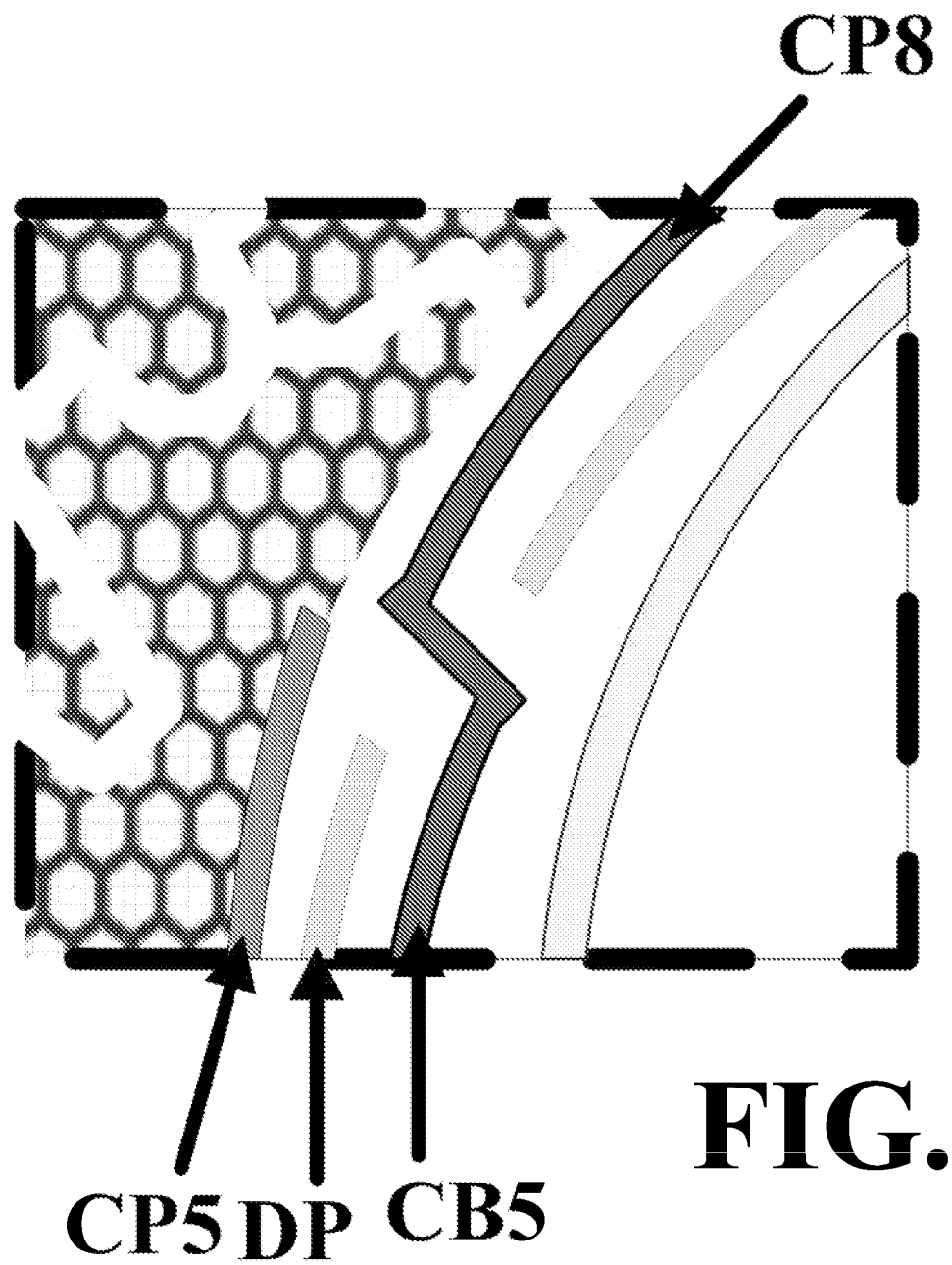
FIG. 31 is a zoom-in view of a nineteenth zoom-in region in FIG. 23.

FIG. 23 is a zoom-in view of a touch control structure surrounding a window region in some embodiments according to the present disclosure. FIG. 24 is a zoom-in view of a twelfth zoom-in region in FIG. 23. FIG. 25 is a zoom-in view of a thirteenth zoom-in region in FIG. 23. FIG. 26 is a zoom-in view of a fourteenth zoom-in region in FIG. 23. FIG. 27 is a zoom-in view of a fifteenth zoom-in region in FIG. 23. FIG. 28 is a zoom-in view of a sixteenth zoom-in region in FIG. 23. FIG. 29 is a zoom-in view of a seventeenth zoom-in region in FIG. 23. FIG. 30 is a zoom-in view of an eighteenth zoom-in region in FIG. 23. FIG. 31 is a zoom-in view of a nineteenth zoom-in region in FIG. 23. Referring to FIGS. 23-31, in some embodiments, the touch control structure has a window region WR and a second window region WR2 adjacent to each other. The touch control structure includes a first mesh block MB1 between the window region WR and the second window region WR2. The first mesh block MB1 is directly adjacent to the window region WR on one side and directly adjacent to the second window region WR2 on an opposite side. The touch control structure further includes a first protective ring PR1 surrounding the window region WR and a second protective ring PR2 surrounding the second window region WR2. Optionally, the window region WR and the second window region WR2 have a same shape. Optionally, the window region WR and the second window region WR2 have different shapes. Optionally, the window region WR and the second window region WR2 have a same size. Optionally, the window region WR and the second window region WR2 have different sizes.

In some embodiments, a window-crossing row Rwc of the plurality of first mesh electrodes TE1 includes a first mesh block MB1, a second mesh block MB2, and a fifth mesh block MB5. The first mesh block MB1 and the second mesh block MB2 are respectively on a first side and a second side of the window region WR. The fifth mesh block MB5 and the first mesh block MB1 are respectively on a first side and a second side of the second window region WR2. The touch control structure further includes a first conductive plate CP1 directly connected to multiple mesh lines of the first mesh block MB1; an additional conductive plate CP1' directly connected to multiple mesh lines of the first mesh block MB1; a second conductive plate CP2 directly connected to multiple mesh lines of the second mesh block MB2; a fifth conductive plate CP5 directly connected to multiple mesh lines of the fifth mesh block MB5; a first conductive bridge CB1 connecting the first conductive plate CP1 and the second conductive plate CP2; and a third conductive bridge CB3 connecting the fifth conductive plate CP5 and the additional conductive plate CP1'.

In some embodiments, a first window-crossing column Cwc1 of the plurality of second mesh electrodes TE2 includes a third mesh block MB3 and a fourth mesh block MB4 respectively on a third side and a fourth side of the window region WR; a third conductive plate CP3 directly connected to multiple mesh lines of the third mesh block MB3; a fourth conductive plate CP4 directly connected to multiple mesh lines of the fourth mesh block MB4; and a second conductive bridge CB2 connecting the third conductive plate CP3 and the fourth conductive plate CB4.

In some embodiments, a second window-crossing column Cwc2 of the plurality of second mesh electrodes TE2 includes a sixth mesh block MB6 and a seventh mesh block MB7 respectively on a third side and a fourth side of the second window region WR2; a sixth conductive plate CP6 directly connected to multiple mesh lines of the sixth mesh block MB6; a seventh conductive plate CP7 directly connected to multiple mesh lines of the seventh mesh block MB7; and a fourth conductive bridge CB4 connecting the sixth conductive plate CP6 and the seventh conductive plate CP7.

In some embodiments, a third window-crossing column Cwc3 of the plurality of second mesh electrodes TE2 includes an eighth mesh block MB8 and a ninth mesh block MB9 respectively on the third side and the fourth side of the second window region WR2; a eighth conductive plate CP8 directly connected to multiple mesh lines of the eighth mesh block MB9; a ninth conductive plate CP9 directly connected to multiple mesh lines of the ninth mesh block MB9; and a fifth conductive bridge CB5 connecting the eighth conductive plate CP8 and the ninth conductive plate CP9.

In some embodiments, the first conductive bridge CB1 is respectively connected to the first conductive plate CP1 and the second conductive plate CP2 respectively through vias respectively extending through an insulating layer between the first conductive bridge CB1 and the first conductive plate CP1, and between the first conductive bridge CB1 and the second conductive plate CB2. The third conductive bridge CB3 is respectively connected to the additional conductive plate CP1' and the fifth conductive plate CP5 respectively through vias respectively extending through the insulating layer between the third conductive bridge CB3 and the additional conductive plate CP1', and between the third conductive bridge CB3 and the second conductive plate CB2.

Optionally, the first mesh block MB1, the second mesh block MB2, the third mesh block MB3, the fourth mesh block MB4, the fifth mesh block MB5, the sixth mesh block MB6, the seventh mesh block MB7, the eighth mesh block MB8, the ninth mesh block MB9, the first conductive plate CP1, the additional conductive plate CP1', the second conductive plate CP2, the third conductive plate CP3, the fourth conductive plate CP4, the fifth conductive plate CP5, the sixth conductive plate CP6, the seventh conductive plate CP7, the eighth conductive plate CP8, the ninth conductive plate CP9, the second conductive bridge CB2, the fourth conductive bridge CB4, and the fifth conductive bridge CB5, are in a same layer, and are in a layer different from the first conductive bridge CB1 and the third conductive bridge CB3. Optionally, the first conductive bridge CB1 and the third conductive bridge CB3 are in a same layer.

Figure 32:
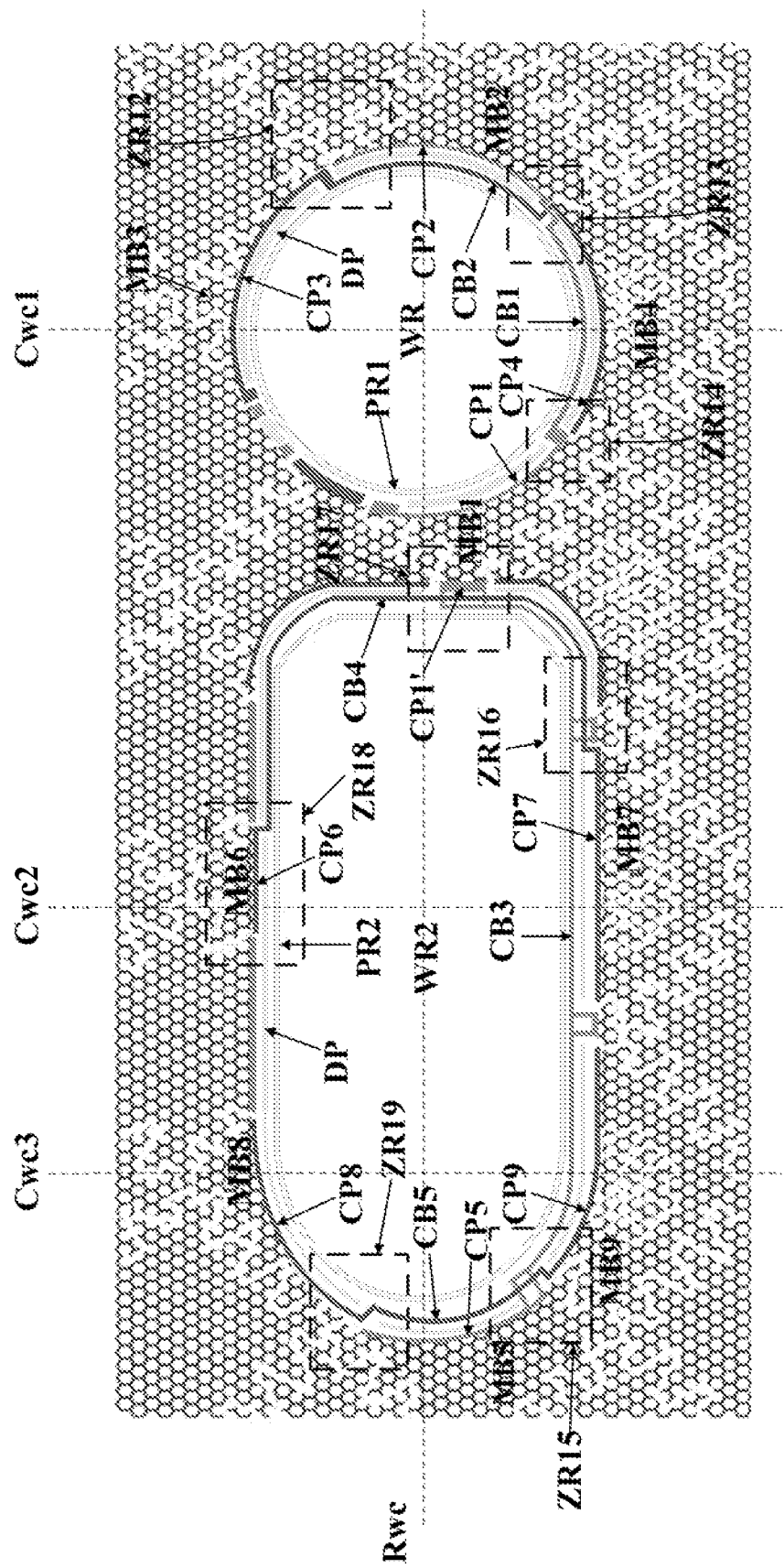
FIG. 32 is a zoom-in view of a touch control structure surrounding a window region in some embodiments according to the present disclosure.
Figure 33:
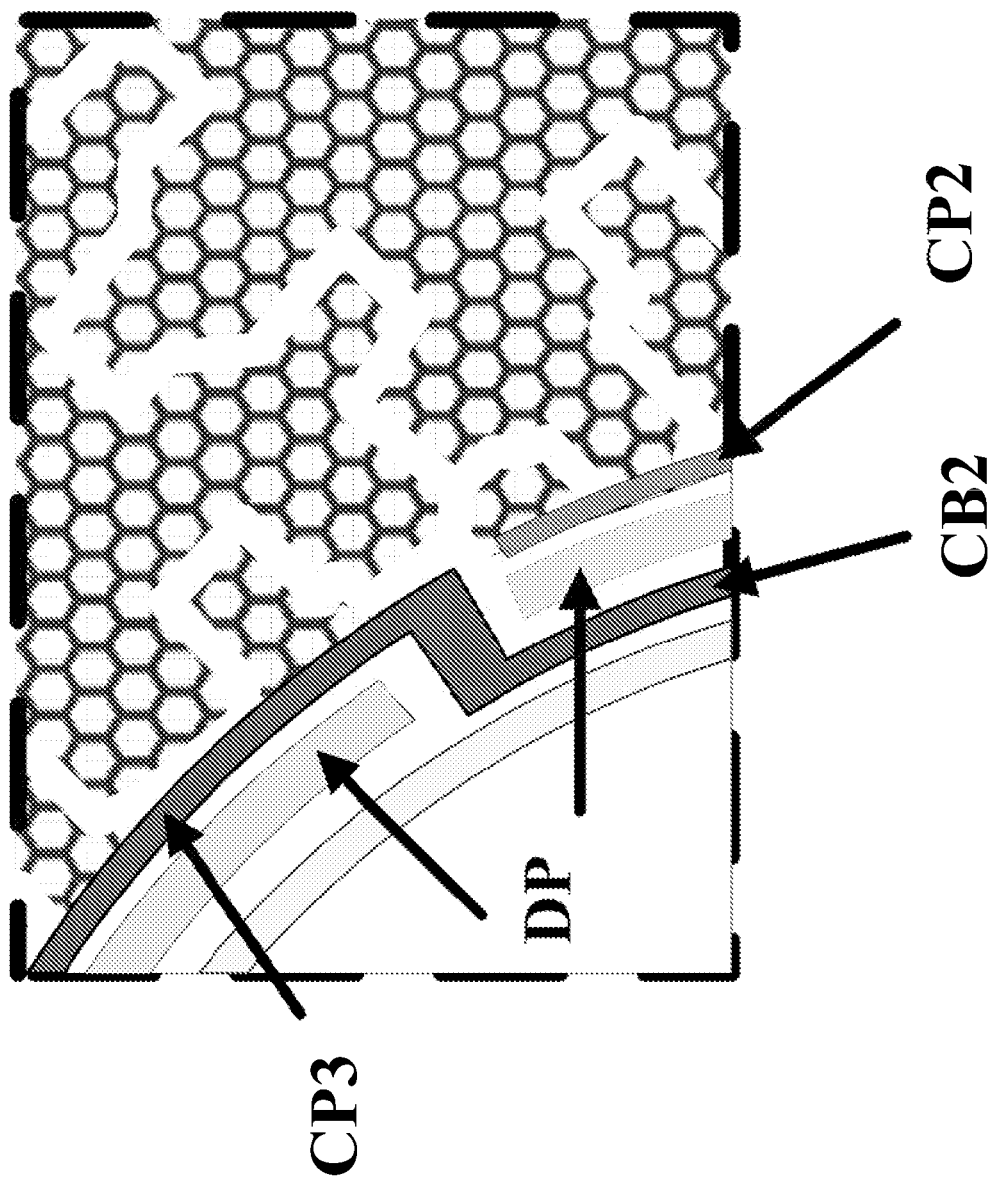
FIG. 33 is a zoom-in view of a twelfth zoom-in region in FIG. 32.
Figure 34:
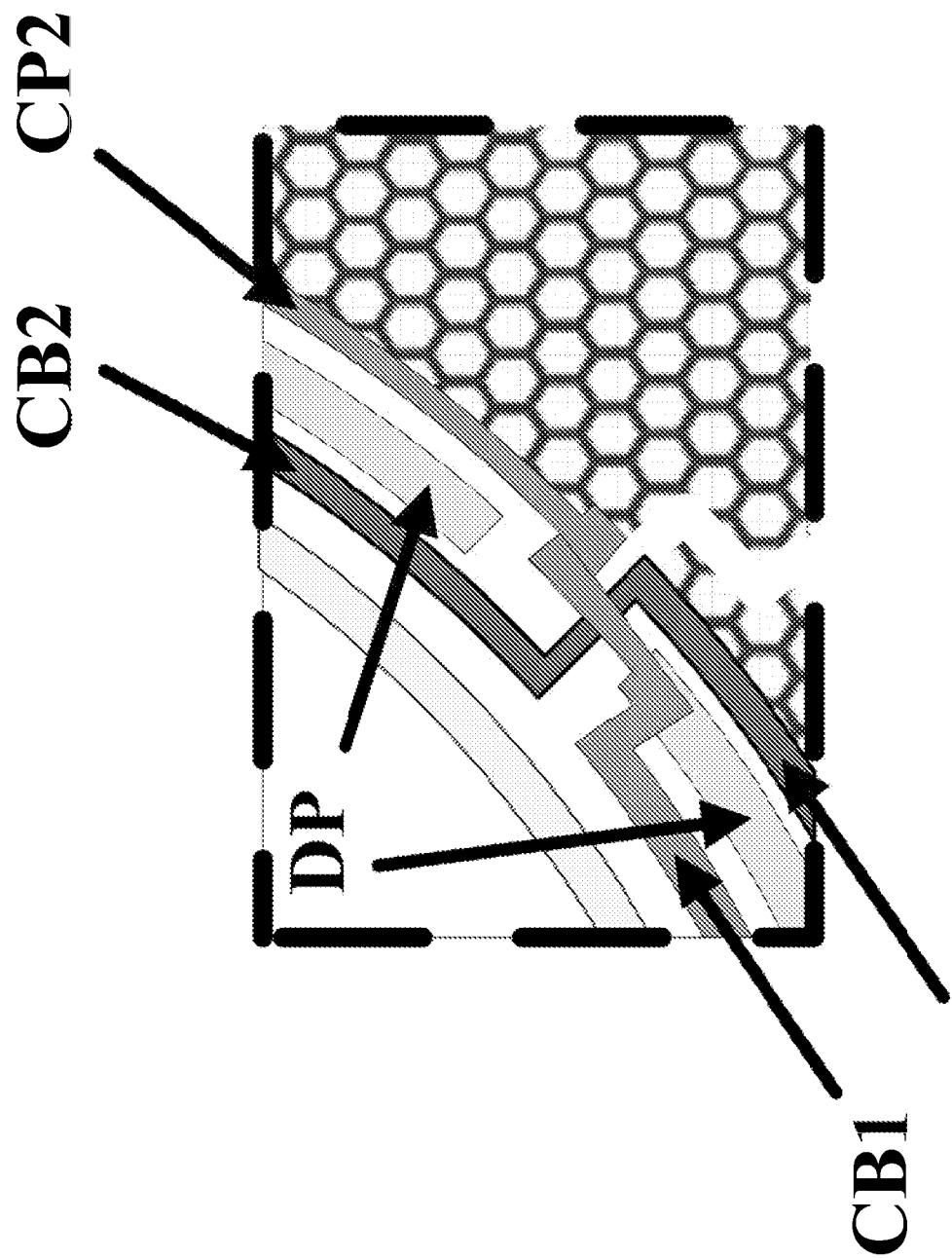
FIG. 34 is a zoom-in view of a thirteenth zoom-in region in FIG. 32.
Figure 35:
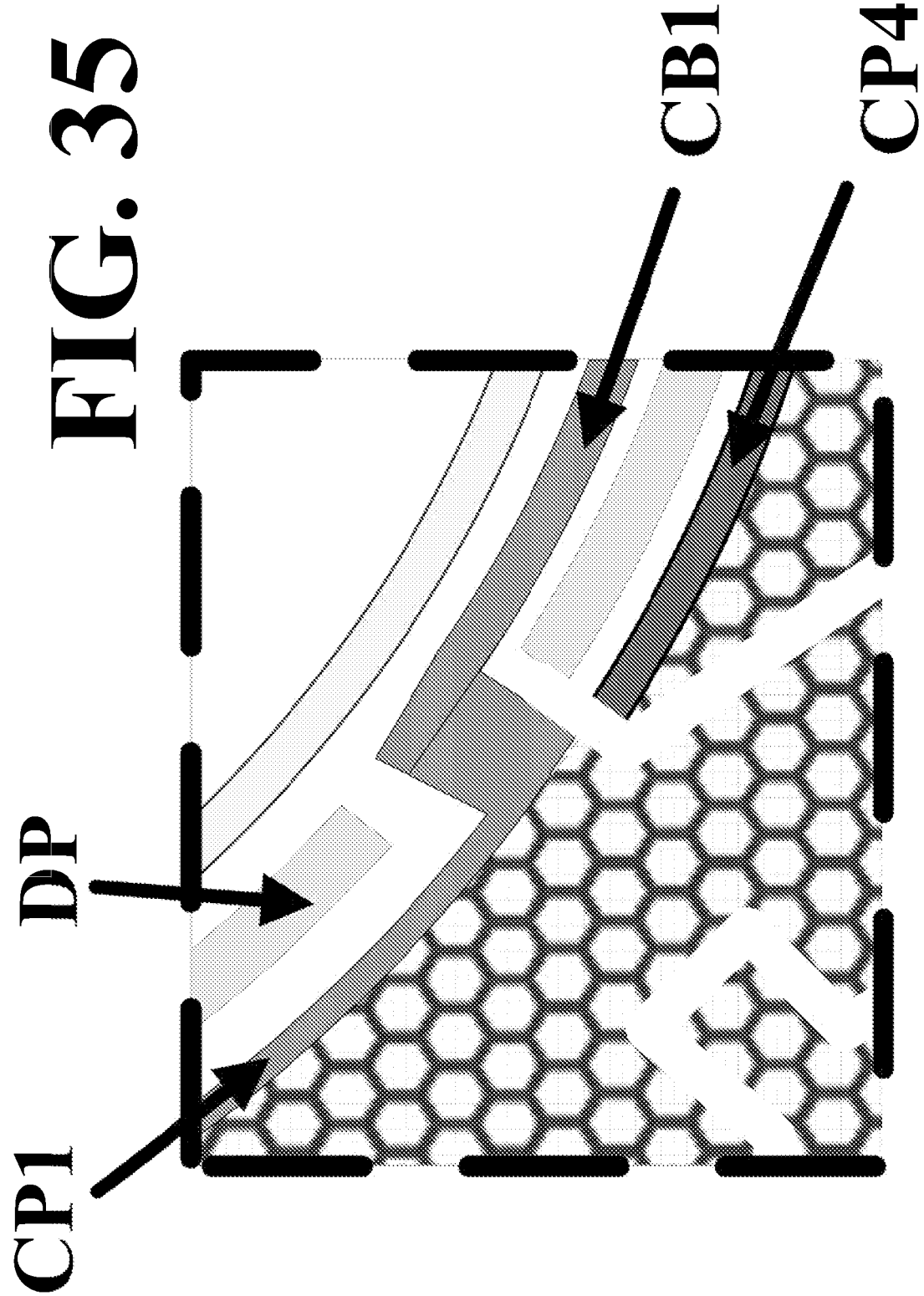
FIG. 35 is a zoom-in view of a fourteenth zoom-in region in FIG. 32.
Figure 36:
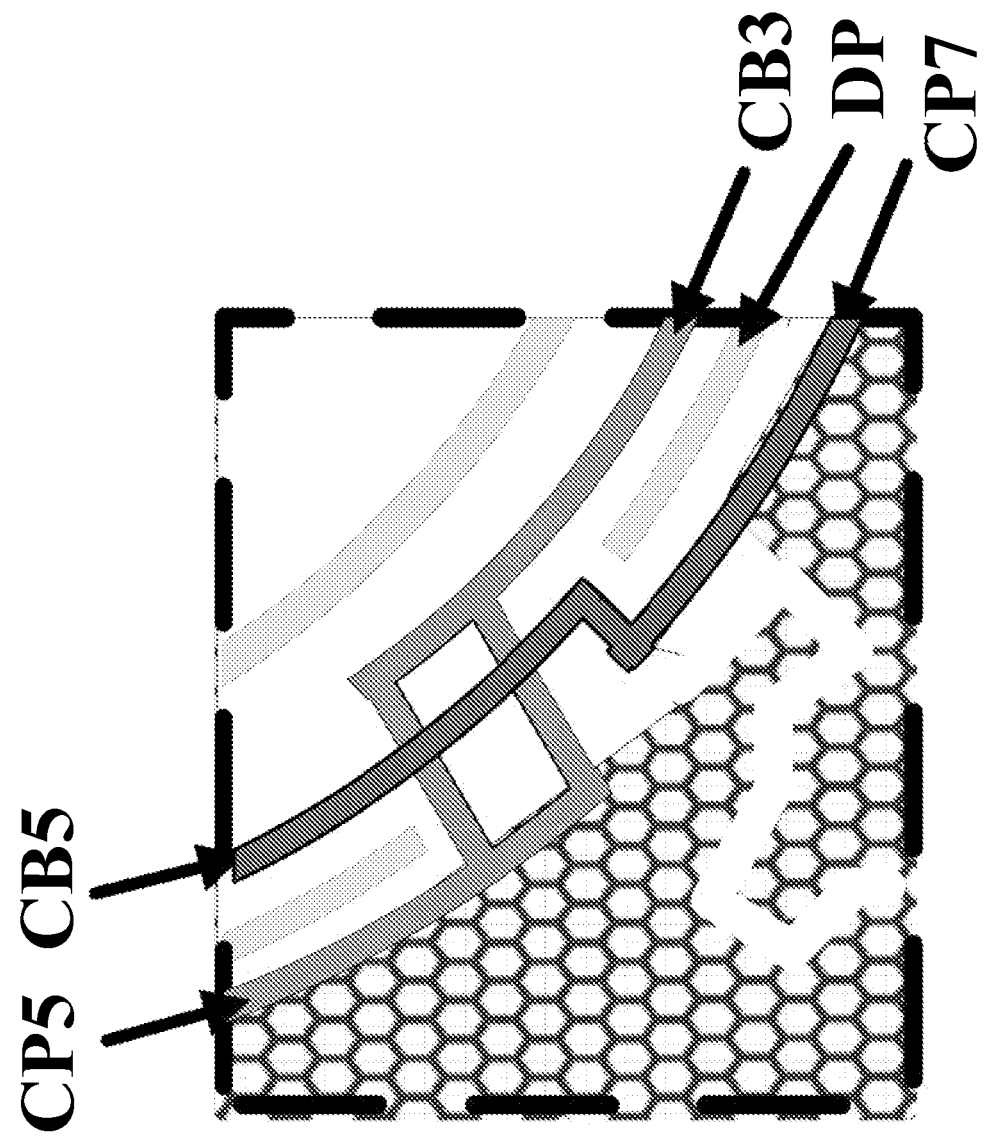
FIG. 36 is a zoom-in view of a fifteenth zoom-in region in FIG. 32.
Figure 37:
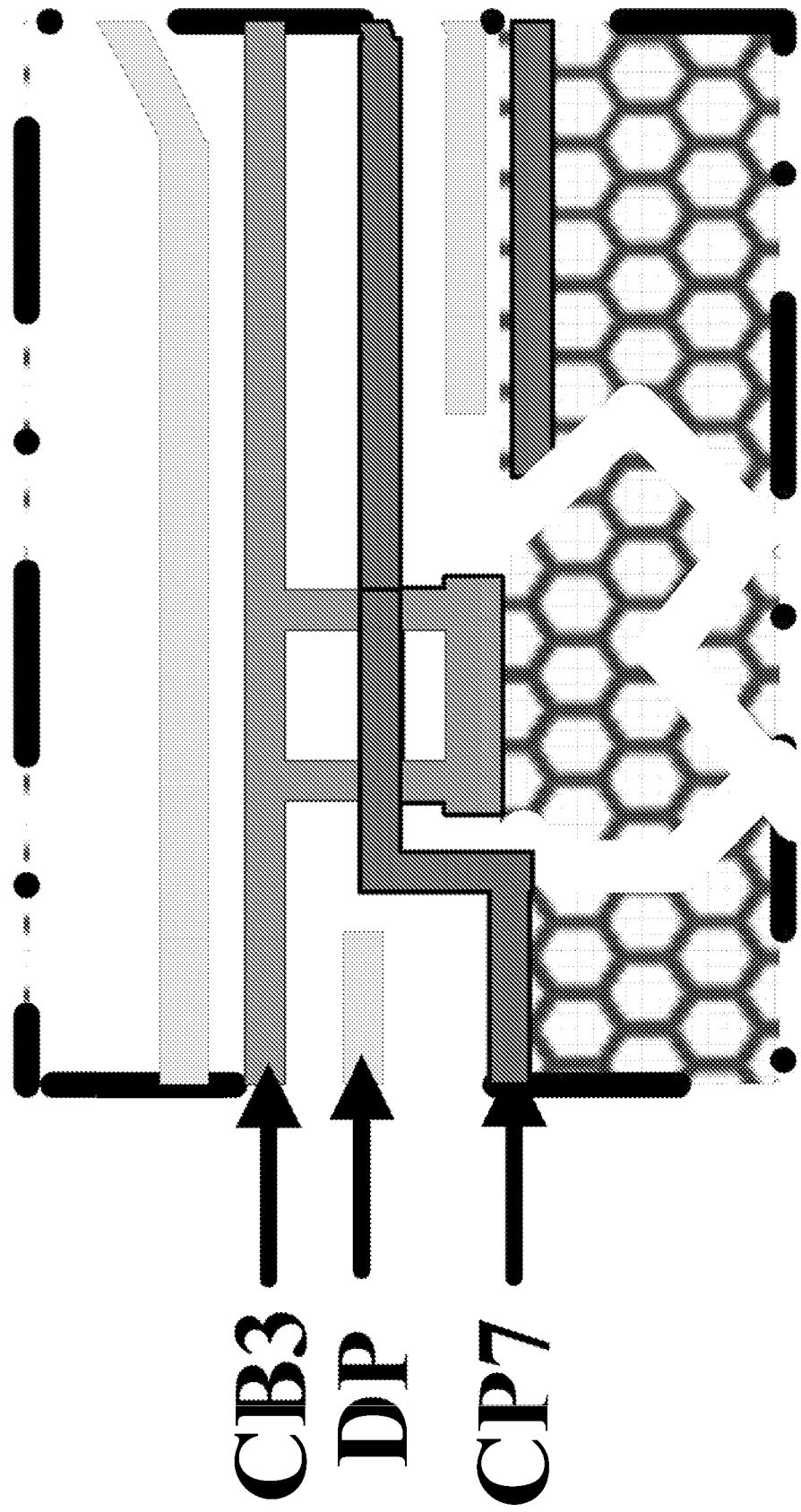
FIG. 37 is a zoom-in view of a sixteenth zoom-in region in FIG. 32.
Figure 38:
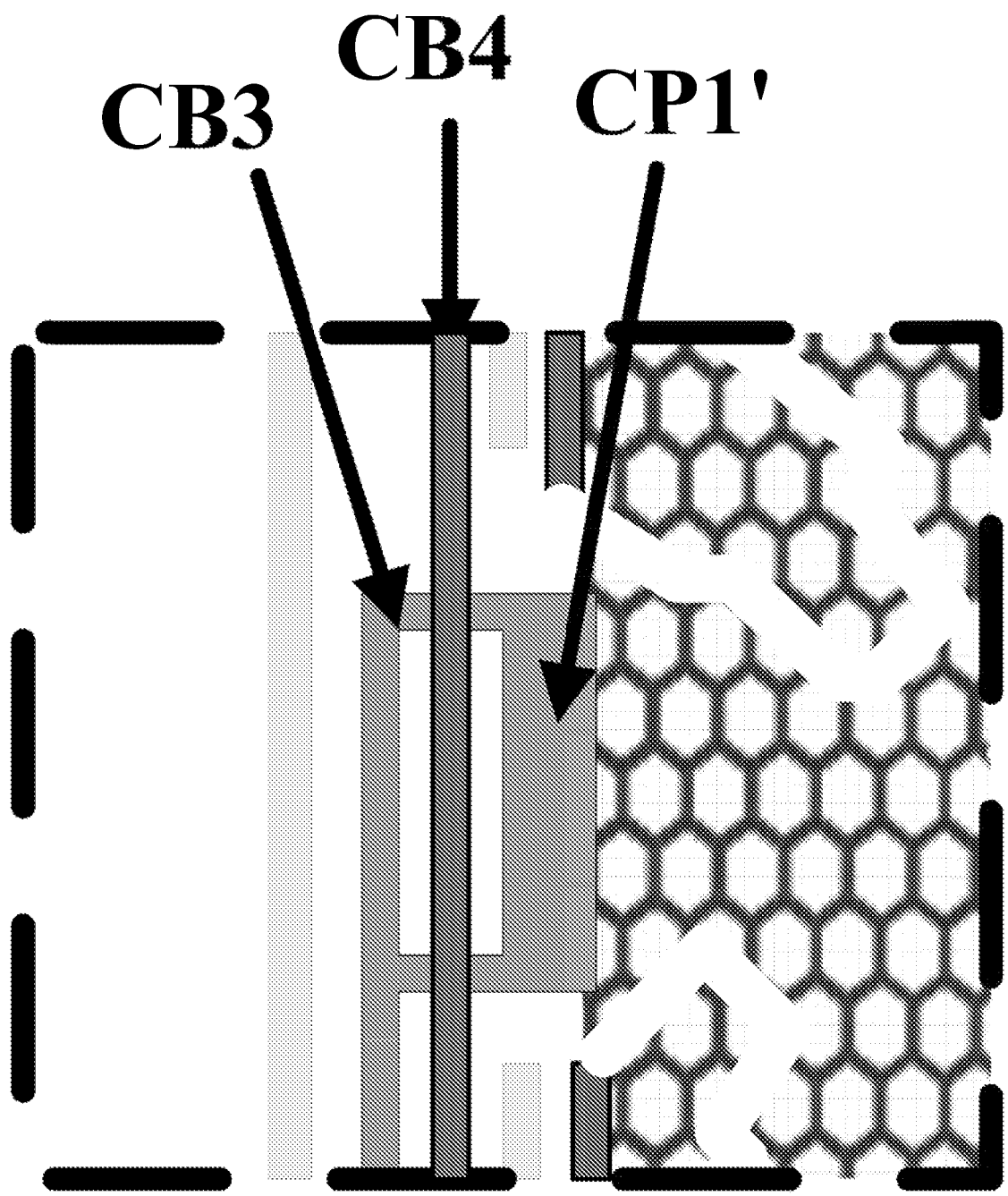
FIG. 38 is a zoom-in view of a seventeenth zoom-in region in FIG. 32.
Figure 39:
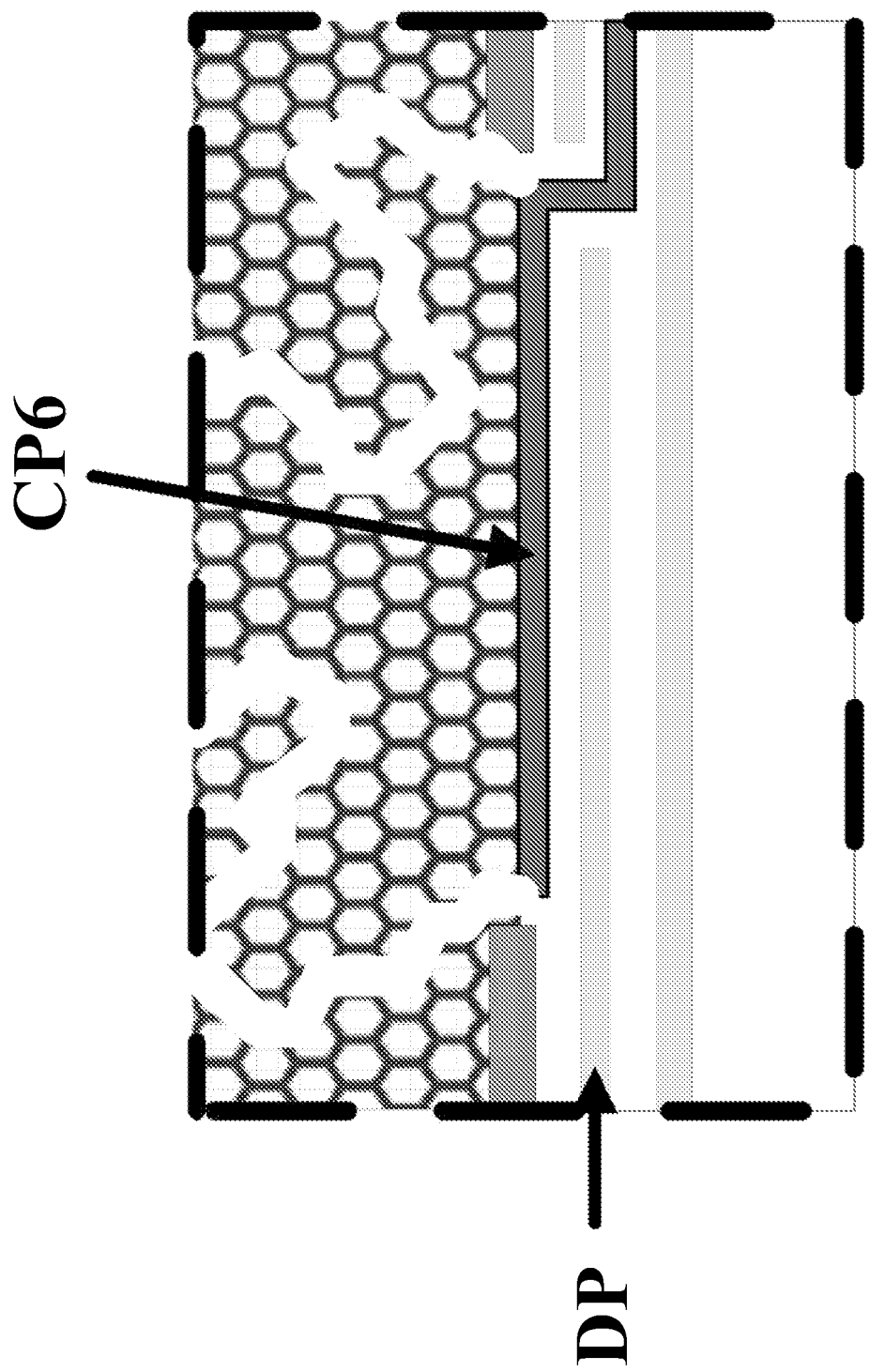
FIG. 39 is a zoom-in view of an eighteenth zoom-in region in FIG. 32.
Figure 40:
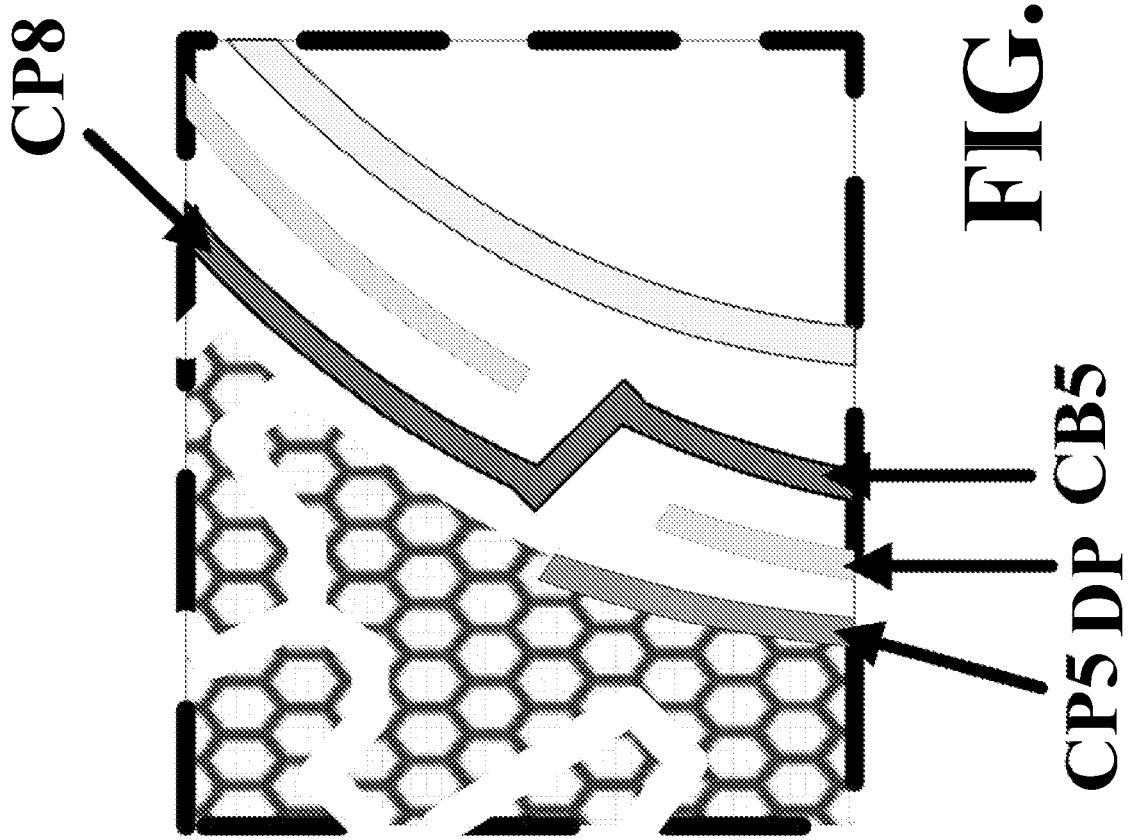
FIG. 40 is a zoom-in view of a nineteenth zoom-in region in FIG. 32.

FIG. 32 is a zoom-in view of a touch control structure surrounding a window region in some embodiments according to the present disclosure. FIG. 33 is a zoom-in view of a twelfth zoom-in region ZR12 in FIG. 32. FIG. 34 is a zoom-in view of a thirteenth zoom-in region ZR13 in FIG. 32. FIG. 35 is a zoom-in view of a fourteenth zoom-in region ZR14 in FIG. 32. FIG. 36 is a zoom-in view of a fifteenth zoom-in region ZR15 in FIG. 32. FIG. 37 is a zoom-in view of a sixteenth zoom-in region ZR16 in FIG. 32. FIG. 38 is a zoom-in view of a seventeenth zoom-in region ZR17 in FIG. 32. FIG. 39 is a zoom-in view of an eighteenth zoom-in region ZR18 in FIG. 32. FIG. 40 is a zoom-in view of a nineteenth zoom-in region ZR19 in FIG. 32. The touch control structure as shown in FIG. 32 is largely similar to that depicted in FIG. 23, except for certain conductive bridges are disposed in different layers.

In some embodiments, the first conductive bridge CB1 is respectively connected to the first conductive plate CP1 and the second conductive plate CP2 respectively through vias respectively extending through an insulating layer between the first conductive bridge CB1 and the first conductive plate CP1, and between the first conductive bridge CB1 and the second conductive plate CB2. The fourth conductive bridge CB4 is respectively connected to the sixth conductive plate CP6 and the seventh conductive plate CP7 respectively through vias respectively extending through the insulating layer between the fourth conductive bridge CB4 and the sixth conductive plate CP6, and between the fourth conductive bridge CB4 and the seventh conductive plate CP7. The fifth conductive bridge CB5 is respectively connected to the eighth conductive plate CP8 and the ninth conductive plate CP9 respectively through vias respectively extending through the insulating layer between the fifth conductive bridge CB5 and the eighth conductive plate CP8, and between the fifth conductive bridge CB5 and the ninth conductive plate CP9.

Optionally, the first mesh block MB1, the second mesh block MB2, the third mesh block MB3, the fourth mesh block MB4, the fifth mesh block MB5, the sixth mesh block MB6, the seventh mesh block MB7, the eighth mesh block MB8, the ninth mesh block MB9, the first conductive plate CP1, the additional conductive plate CP1', the second conductive plate CP2, the third conductive plate CP3, the fourth conductive plate CP4, the fifth conductive plate CP5, the sixth conductive plate CP6, the seventh conductive plate CP7, the eighth conductive plate CP8, the ninth conductive plate CP9, the second conductive bridge CB2 and the third conductive bridge CB3, are in a same layer, and are in a layer different from the first conductive bridge CB1, the fourth conductive bridge CB4, and the fifth conductive bridge CB5. Optionally, the first conductive bridge CB1, the fourth conductive bridge CB4, and the fifth conductive bridge CB5 are in a same layer.

Optionally, the conductive plate (e.g., any of the first to ninth conductive plates, CP1 to CP9) has a plate width along a direction perpendicular to an interface between the conductive plate and the mesh block electrically connected to the conductive plate. Optionally, the plate width is greater than a line width of the mesh lines. Optionally, the plate width is in a range of 5 μm to 50 μm, e.g., 5 μm to 10 μm, 10 μm to 15 μm, 15 μm to 20 μm, 20 μm to 25 μm, 25 μm to 30 μm, 30 μm to 35 μm, 35 μm to 40 μm, 40 μm to 45 μm, or 45 μm to 50 μm. Optionally, the plate width is 20 μm. Optionally, the mesh lines have a line width in a range of 1 μm to 5 μm, e.g., 1 μm to 2 μm, 2 μm to 3 μm, 3 μm to 4 μm, or 4 μm to 5 μm. Optionally, the mesh lines have a line width of 3 μm. Optionally, a ratio between the plate width and the line width is in a range 1:1 to 50:1, e.g., 1:1 to 2:1, 2:1 to 3:1, 3:1 to 4:1, 4:1 to 5:1, 5:1 to 10:1, 10:1 to 20:1, 20:1 to 30:1, 30:1 to 40:1, or 40:1 to 50:1. In one example, the first conductive plate CP1 has a first plate width along a direction perpendicular to an interface between the first conductive plate CP1 and the first mesh block MB1; the first plate width is in a range of 5 μm to 50 μm; the second conductive plate CP2 has a second plate width along a direction perpendicular to an interface between the second conductive plate CP2 and the second mesh block MB2; the second plate width is in a range of 5 μm to 50 μm. In another example, a mesh line width of the multiple mesh lines of the first mesh block and the multiple mesh lines of the second mesh block is in a range of 1 μm to 5 μm. The first plate width and the second plate width are respectively greater than the mesh line width of the multiple mesh lines of the first mesh block and the multiple mesh lines of the second mesh block by at least 200%.

In another aspect, the present disclosure provides a display panel including the touch control structure described herein or fabricated by a method described herein, and a hole in the window region. The display panel is configured to display an image in at least a portion of the touch control region. In some embodiments, display elements of the display panel are absent in the window region.

Figure 41A:
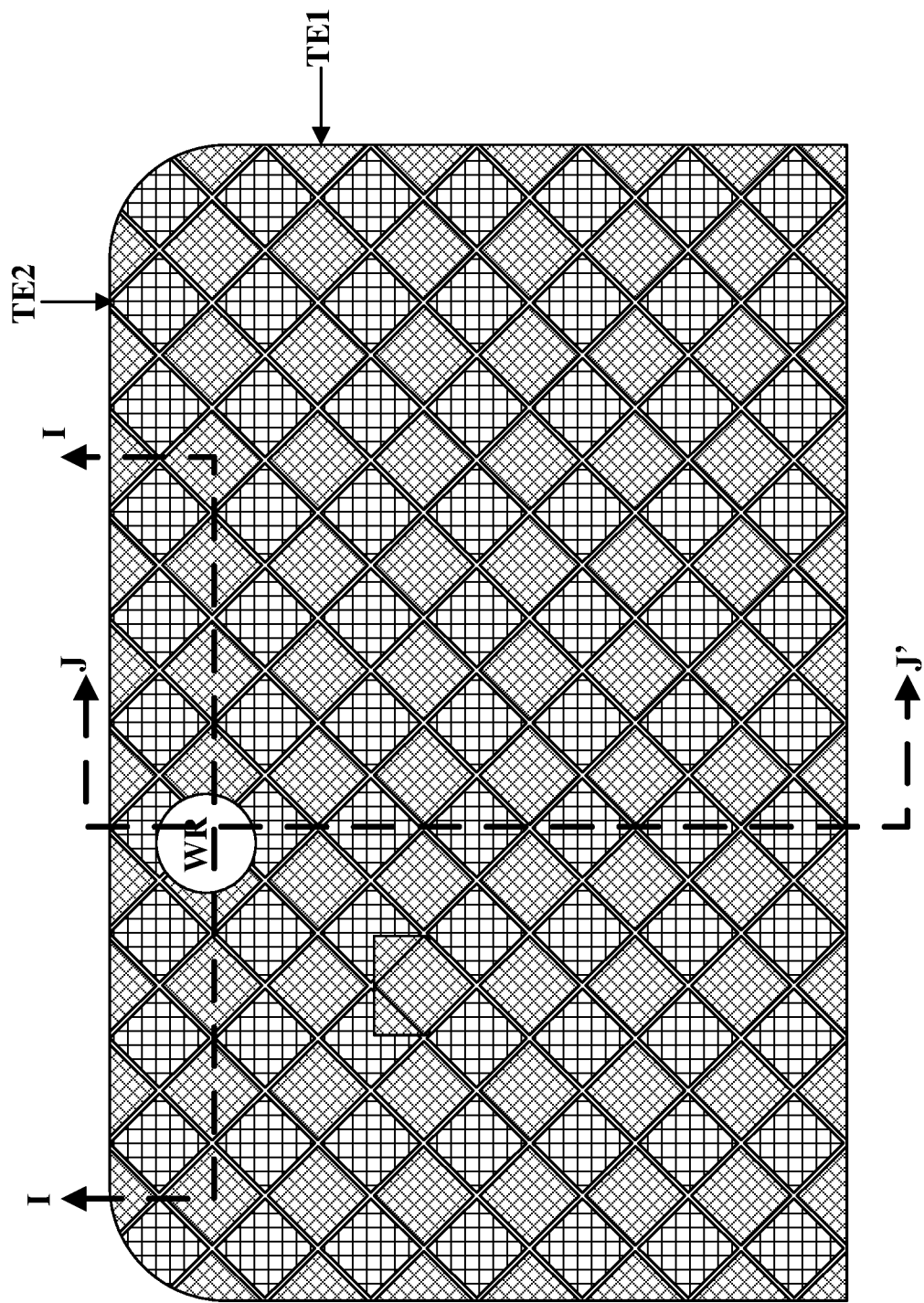
FIG. 41A is a plan view of a display panel in some embodiments according to the present disclosure.
Figure 41B:
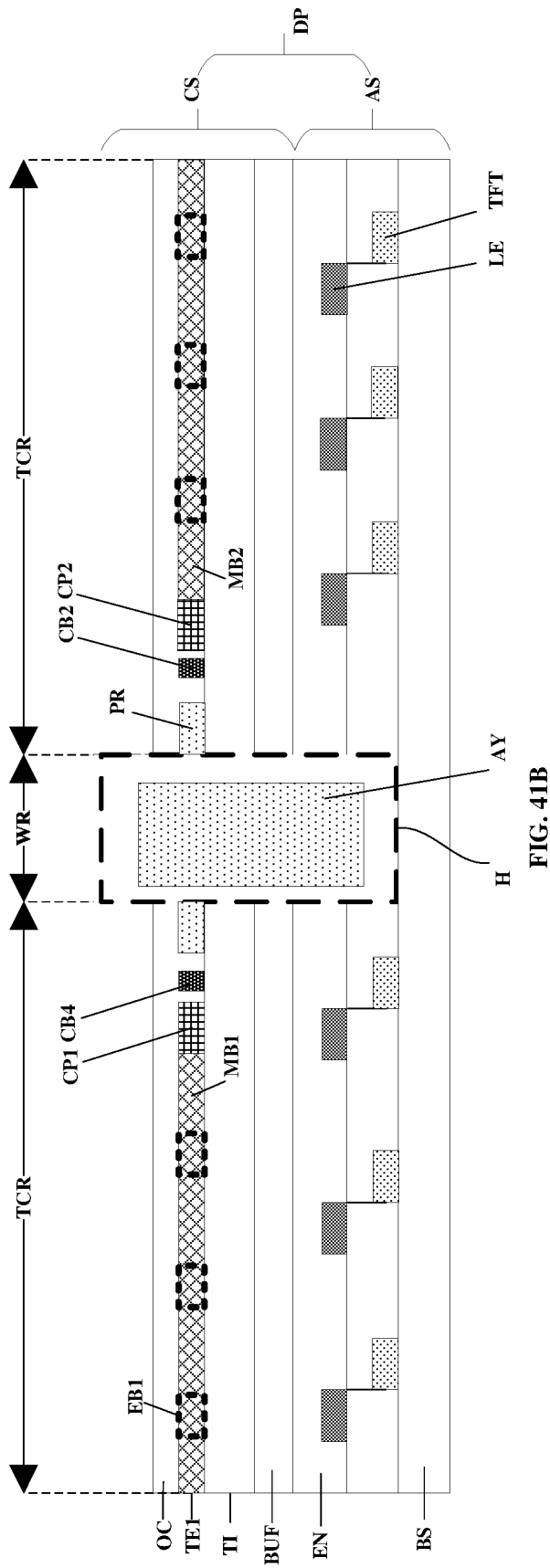
FIG. 41B is a cross-sectional view along an I-I' line in FIG. 41A.
Figure 41C:
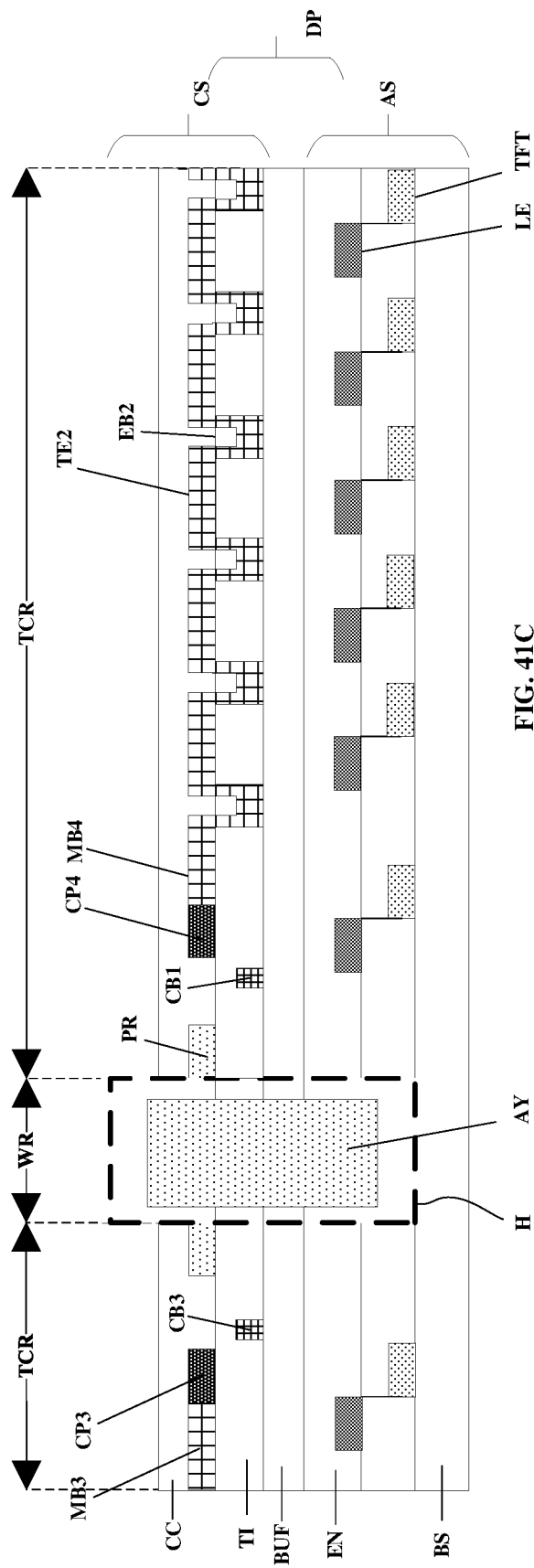
FIG. 41C is a cross-sectional view along a J-J' line in FIG. 41A.

FIG. 41A is a plan view of a display panel in some embodiments according to the present disclosure. FIG. 41B is a cross-sectional view along an I-I' line in FIG. 41A. FIG. 41C is a cross-sectional view along a J-J' line in FIG. 41A. Referring to FIGS. 41A to 41C, the display panel in some embodiments includes an array substrate AS and a counter substrate CS assembled together. The display panel has a touch control region TCR configured to detecting a touch, and a window region WR surrounded by the touch control region TCR. The touch control structure is limited in the touch control region TCR and absent in the window region WR. Optionally, the touch control region TCR substantially overlaps with a display region of the display panel. The display panel is configured to display an image in at least a portion of the touch control region TCR. In one example, in the window region WR, display elements of the display panel and the touch control structure are both absent; in the display region or at least a portion of the touch control region TCR, both display elements of the display panel and the touch control structure are present.

Referring to FIG. 41B and FIG. 41C, the display panel in some embodiments includes a hole H in the window region WR. Optionally, the hole H extends through the array substrate AS and the counter substrate CS. Referring to FIG. 41B and FIG. 41C, the display panel in some embodiments further includes an accessory AY in the hole H. Examples of accessories include a camera lens and a fingerprint sensor.

In some embodiments, the hole H is a blind hole that does not completely extends through at least one layer of the array substrate AS or the counter substrate CS. In some embodiments, the hole H is a through-hole that completely extends through the array substrate AS and the counter substrate CS.

In some embodiments, display elements and thin film transistors are absent in the window region WR. Optionally, the display elements includes a plurality of light emitting diodes, for example, in an organic light emitting diode display panel. Optionally, the display elements include a liquid crystal layer in a plurality of subpixels, for example, in a liquid crystal display panel. Referring to FIGS. 41B to 41C, in some embodiments, the array substrate AS includes a base substrate BS, a plurality of thin film transistors TFT on the base substrate BS, and a plurality of light emitting elements LE on the base substrate BS and respectively connected to the plurality of thin film transistors TFT. Optionally, the plurality of thin film transistors TFT are absent in the window region WR. Optionally, the plurality of light emitting elements LE are absent in the window region WR.

Referring to FIGS. 41B to 41C, in some embodiments, the array substrate AS further includes an encapsulating layer EN encapsulating the plurality of light emitting elements LE. Optionally, the encapsulating layer EN is present in the touch control region TCR (or the display region), and is absent in the window region WR. In some embodiments, the counter substrate CS includes a buffer layer BUF and a touch insulating layer TI on the buffer layer BUF. Optionally, the buffer layer BUF and the touch insulating layer TI is present in the touch control region TCR (or the display region), and is absent in the window region WR.

In another aspect, the present disclosure provides a display apparatus including a display panel described herein or fabricated by a method described herein, and one or more integrated circuits connected to the display panel. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a liquid crystal display apparatus.

In another aspect, the present disclosure provides a method of fabricating a touch control structure. In some embodiments, the method includes forming a plurality of first mesh electrodes and a plurality of second mesh electrodes. The touch control structure is formed to be limited in a touch control region and absent in a window region surrounded by the touch control region. Optionally, the step of forming the plurality of first mesh electrodes includes forming a window-crossing row. Optionally, the step of forming the window-crossing row includes forming a first mesh block and forming a second mesh block respectively on a first side and a second side of the window region; forming a first conductive plate directly connected to multiple mesh lines of the first mesh block; forming a second conductive plate directly connected to multiple mesh lines of the second mesh block; and forming a first conductive bridge connecting the first conductive plate and the second conductive plate. Optionally, the first conductive plate, the second conductive plate, and the first conductive bridge are formed to be respectively around a first portion, a second portion, and a third portion of a periphery of the window region. Optionally, the third portion is partially overlapping with the first portion, and partially overlapping with the second portion.

In some embodiments, the step of forming the window-crossing row further includes forming a plurality of first non-window mesh blocks. At least the first mesh block is formed to have an area smaller than each of the plurality of first non-window mesh blocks due to presence of the window region. Optionally, edges of the first mesh block are identical to edges of each of the plurality of first non-window mesh blocks, except for a first edge directly adjacent to the window region. Optionally, substantially all mesh lines along the first edge are connected to the first conductive plate. Optionally, the second mesh block is formed to have an area smaller than each of the plurality of first non-window mesh blocks due to presence of the window region. Optionally, edges of the second mesh block are identical to edges of each of the plurality of first non-window mesh blocks, except for a second edge directly adjacent to the window region. Optionally, substantially all mesh lines along the second edge are connected to the second conductive plate.

In some embodiments, the method further includes forming an insulating layer, the insulating layer being formed between the first conductive bridge and the first conductive plate, and between the first conductive bridge and the second conductive plate. Optionally, the method further includes forming a first via and a second via respectively extending through the insulating layer. Optionally, the first conductive bridge is formed to be respectively connected to the first conductive plate and the second conductive plate respectively through the first via and the second via. Optionally, the first mesh block, the second mesh block, the first conductive plate, and the second conductive plate are formed in a same layer and made of a same material.

In some embodiments, the step of forming a window-crossing column of the plurality of second mesh electrodes includes forming a third mesh block and a fourth mesh block respectively on a third side and a fourth side of the window region; forming a third conductive plate directly connected to multiple mesh lines of the third mesh block; forming a fourth conductive plate directly connected to multiple mesh lines of the fourth mesh block; and forming a second conductive bridge connecting the third conductive plate and the fourth conductive plate. Optionally, the third conductive plate, the fourth conductive plate, and the second conductive bridge are respectively around a fourth portion, a fifth portion, and a sixth portion of the periphery of the window region.

In some embodiments, the step of forming the window-crossing column further includes forming a plurality of second non-window mesh blocks. At least the third mesh block is formed to have an area smaller than each of the plurality of second non-window mesh blocks due to presence of the window region. Optionally, edges of the third mesh block are identical to edges of each of the plurality of second non-window mesh blocks, except for a third edge directly adjacent to the window region. Optionally, substantially all mesh lines along the third edge are connected to the third conductive plate. Optionally, the fourth mesh block is formed to have an area smaller than each of the plurality of second non-window mesh blocks due to presence of the window region. Optionally, edges of the fourth mesh block are identical to edges of each of the plurality of second non-window mesh blocks, except for a fourth edge directly adjacent to the window region. Optionally, substantially all mesh lines along the fourth edge are connected to the fourth conductive plate. Optionally, the sixth portion is partially overlapping with the fourth portion, and partially overlapping with the fifth portion.

In some embodiments, the method further includes forming an insulating layer, the insulating layer being formed between the first conductive bridge and the first conductive plate, and between the first conductive bridge and the second conductive plate. Optionally, the method further includes forming a first via and a second via respectively extending through the insulating layer. Optionally, the first conductive bridge is formed to be respectively connected to the first conductive plate and the second conductive plate respectively through the first via and the second via. Optionally, the first mesh block, the second mesh block, the third mesh block, the fourth mesh block, the first conductive plate, the second conductive plate, the third conductive plate, the fourth conductive plate and the second conductive bridge are formed in a same layer and made of a same material. Optionally, an orthographic projection of the first conductive bridge on the insulating layer partially overlaps with an orthographic projection of the second conductive bridge on the insulating layer.

In some embodiments, center lines of the window-crossing row and the window-crossing column crossing over each other, forming a window-region virtual intersection inside the window region. Optionally, outside the window region, center lines of rows of the plurality of first mesh electrodes and center lines of columns of the plurality of second mesh electrodes cross over each other, forming a plurality of virtual intersections in the touch control region. Optionally, the first conductive bridge and the second conductive bridge do not cross over the window-region virtual intersection. Optionally, the method further includes forming a first electrode bridge connecting adjacent first mesh electrodes in a respective one of the plurality of virtual intersections; and forming a second electrode bridge connecting adjacent second mesh electrodes in the respective one of the plurality of virtual intersections. Optionally, the first electrode bridge and the second electrode bridge respectively cross over the respective one of the plurality of virtual intersections.

In some embodiments, the method further includes forming a protective ring between the first mesh block and the second mesh block, the protective ring surrounding the window region.

In some embodiments, the method further includes forming a hole in the window region.

Figure 42A:
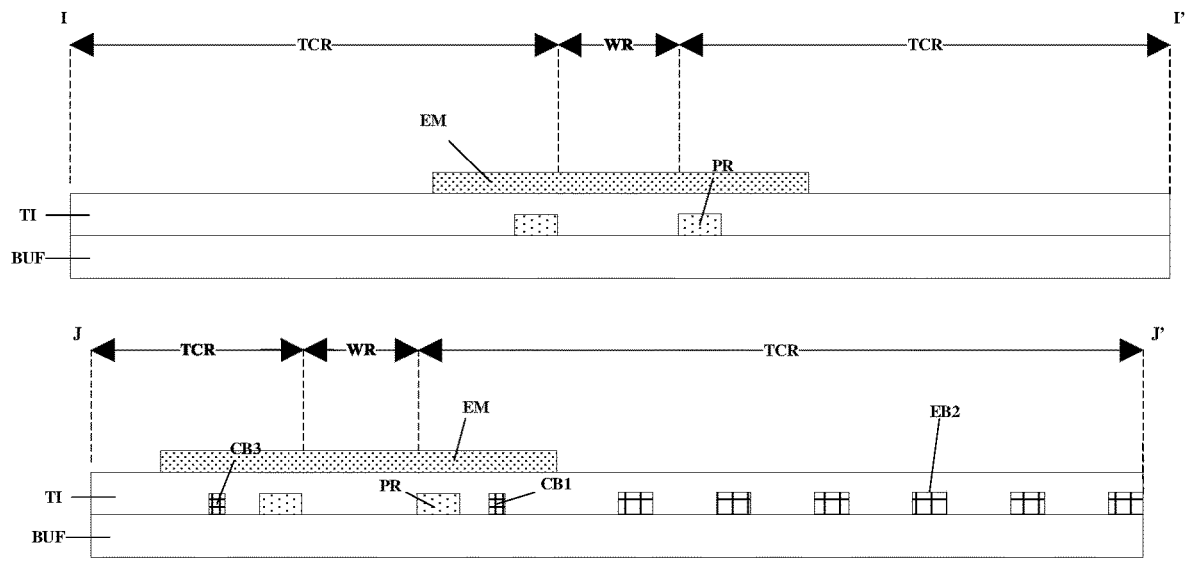
FIGS. 42A to 42F illustrate a method of fabricating a touch control structure in some embodiments according to the present disclosure.

FIGS. 42A to 42F illustrate a method of fabricating a touch control structure in some embodiments according to the present disclosure. The cross-sectional views in these figures corresponding to the I-I' line and the J-J' line in FIG. 41A. Referring to FIG. 42A, a second electrode bridge EB2, a first conductive bridge CB1, a third conductive bridge CB3, and a protective ring PR are formed on a buffer layer BUF, a touch insulating layer TI is formed on a side of the second electrode bridge EB2 away from the buffer layer BUF, and an electrode material layer EM is formed on a side of the touch insulating layer TI away from the buffer layer BUF. The protective ring PR is formed to surround the window region WR.

Figure 42B:
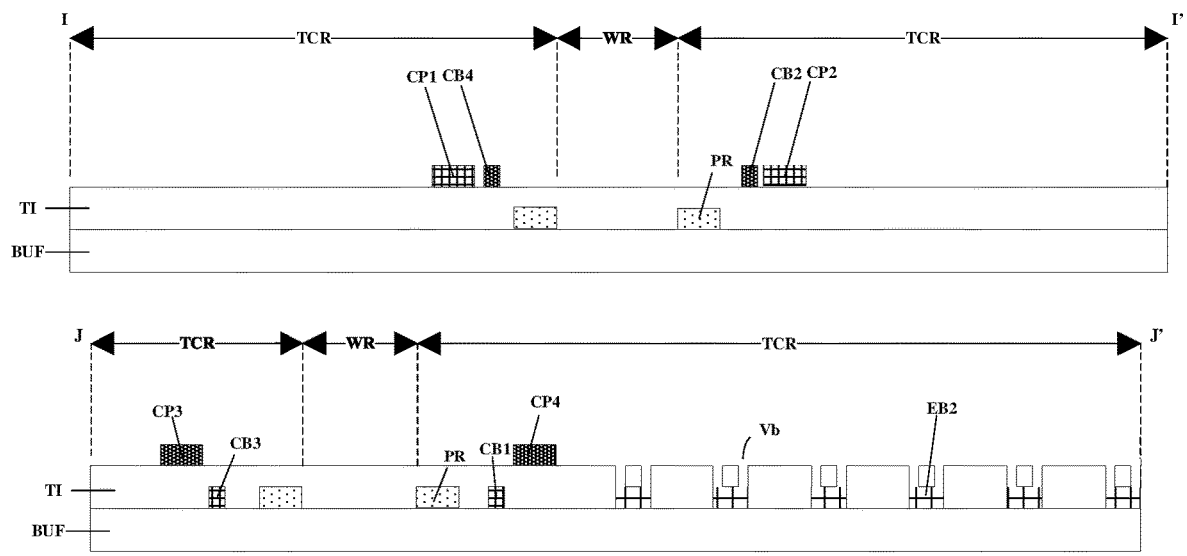

Referring to FIG. 42B, the electrode material layer EM is patterned to form a first conductive plate CP1, a second conductive plate CP2, a third conductive plate CP3, a fourth conductive plate CP4, a second conductive bridge CB2, and a fourth conductive bridge CB4, respectively surrounding the window region WR. A plurality of bridge vias Vb are formed to respectively extend through the touch insulating layer TI. A respective one of the plurality of bridge vias Vb is formed to expose the second electrode bridge EB2.

Figure 42C:
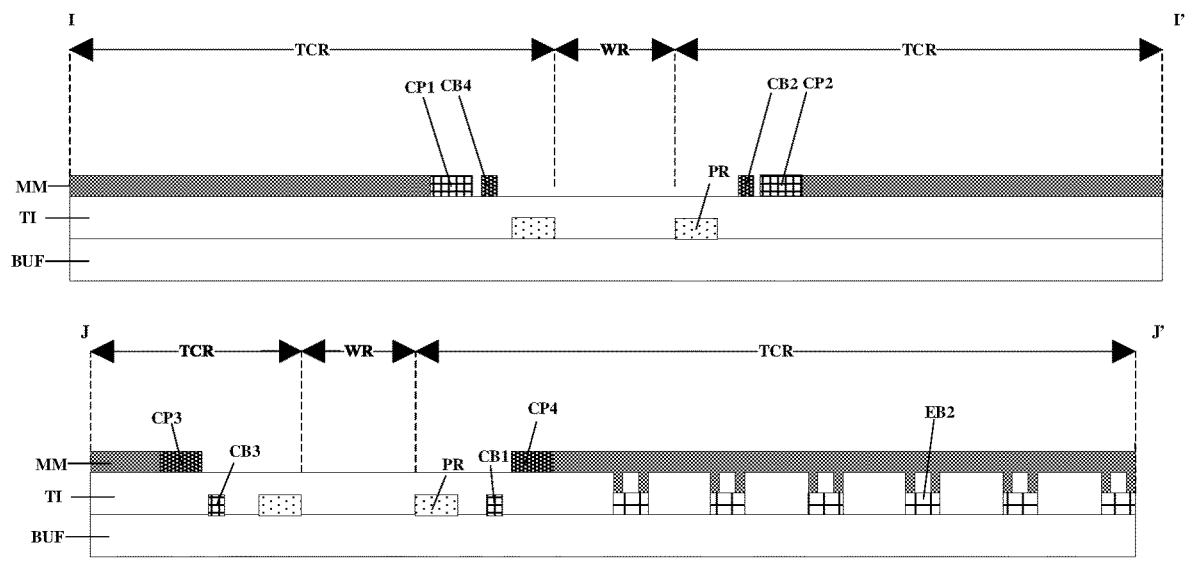

Referring to FIG. 42C, a mesh material layer MM is formed in a touch control region TCR surrounding the window region WR. The mesh material layer MM is formed in a same layer as the first conductive plate CP1, the second conductive plate CP2, the third conductive plate CP3, the fourth conductive plate CP4, the second conductive bridge CB2, and the fourth conductive bridge CB4. The mesh material layer MM is formed to be directly connected to the first conductive plate CP1, the second conductive plate CP2, the third conductive plate CP3, and the fourth conductive plate CP4, respectively. The mesh material layer MM is connected to the second bridge EB2 through the respective one of the plurality of bridge vias Vb.

Figure 42D:
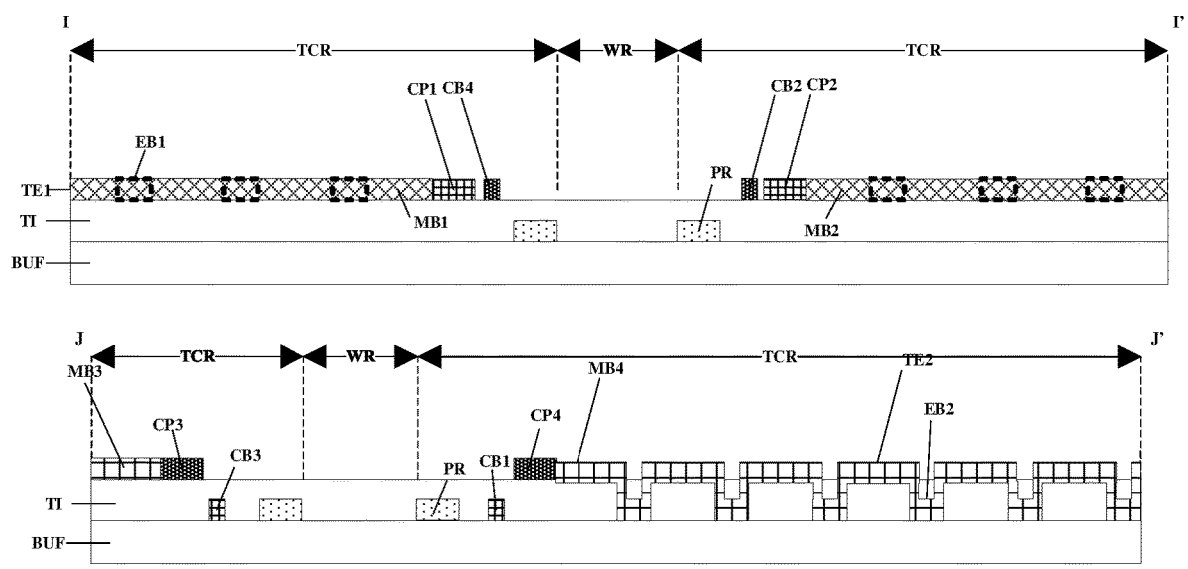

Referring to FIG. 42D, the mesh material layer MM is patterned to form a plurality of first mesh electrodes TE1 and a plurality of second mesh electrodes TE2. The cross-sectional view depicted in FIG. 42D represents cross-sectional views along a window-crossing row and a window-crossing column, respectively. As shown in FIG. 42D, patterning the mesh material layer MM to form the window-crossing row includes forming a first mesh block MB1 and forming a second mesh block MB2 respectively on a first side and a second side of the window region WR. The first conductive plate CP1 and multiple mesh lines of the first mesh block MB1 are formed to be directly connected. The second conductive plate CP2 and multiple mesh lines of the second mesh block MB2 are formed to be directly connected. The third conductive plate CP3 and multiple mesh lines of the third mesh block MB3 are formed to be directly connected. The fourth conductive plate CP4 and multiple mesh lines of the fourth mesh block MB4 are formed to be directly connected. Adjacent mesh blocks of a respective one of the plurality of first mesh electrodes TE1 are connected through a first electrode bridge EB1, as a result of patterning the mesh material layer MM. Adjacent mesh blocks of a respective one of the plurality of second mesh electrodes TE2 are connected through a second electrode bridge EB2, as a result of patterning the mesh material layer MM.

Figure 42E:
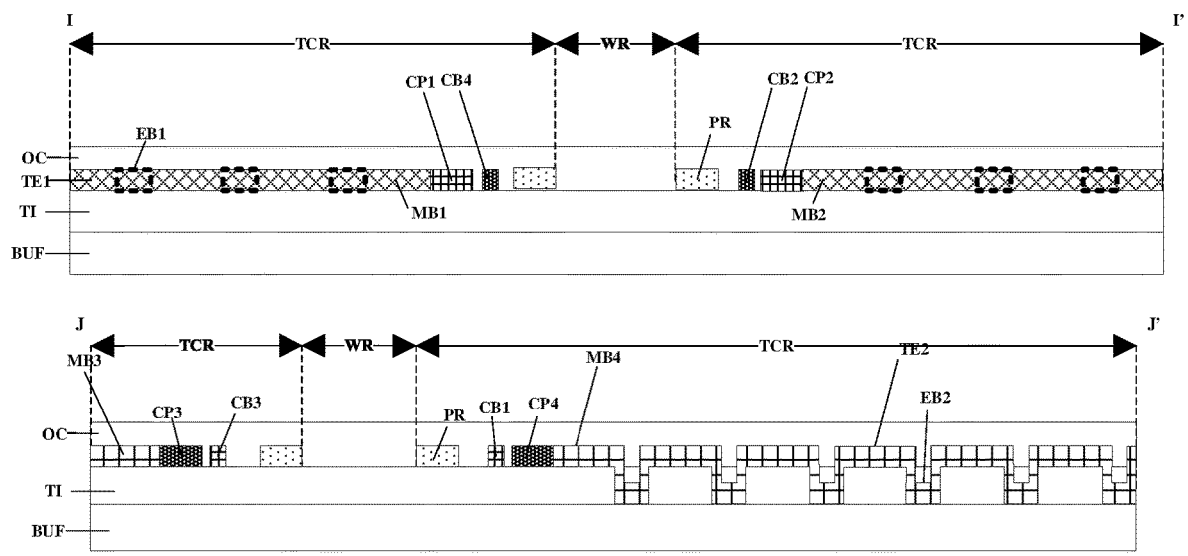

Referring to FIG. 42E, an overcoat layer OC is formed on a side of the plurality of first mesh electrodes TE1 and the plurality of second mesh electrodes TE2 away from the touch insulating layer TI.

Figure 42F:
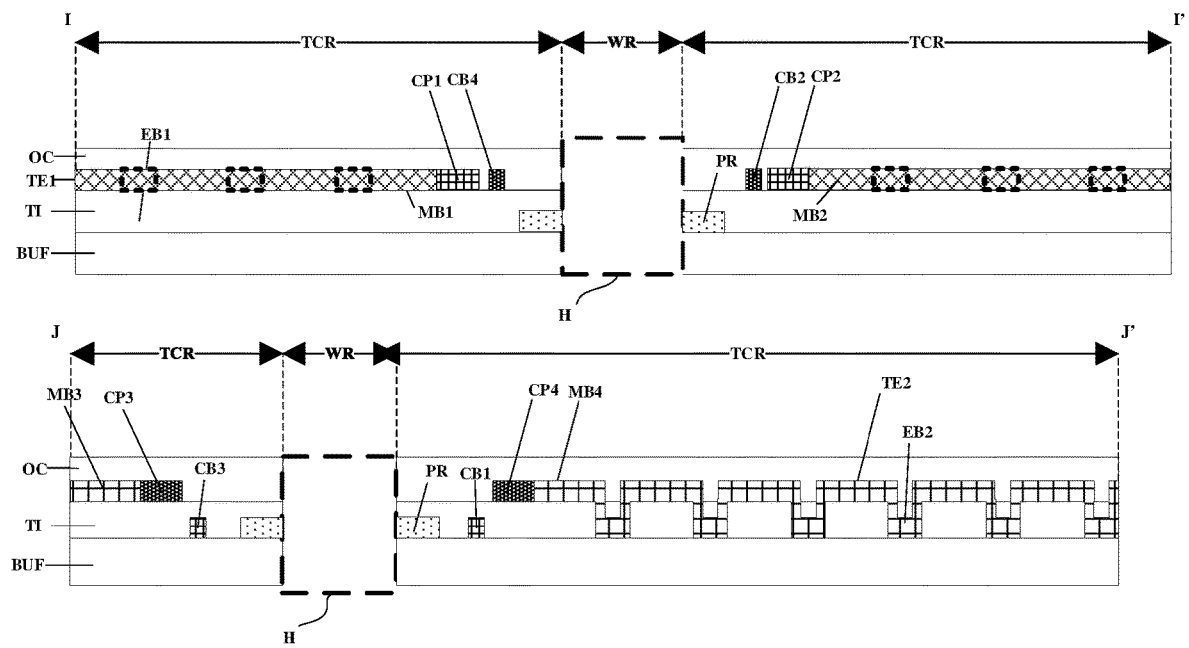

Referring to FIG. 42F, a hole H is formed in the window region WR, for example, by punching through the touch control structure.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control structure, comprising a plurality of first mesh electrodes along a row direction and a plurality of second mesh electrodes along a column direction;
   wherein the touch control structure is limited in a touch control region and absent in a window region surrounded by the touch control region;
   wherein a window-crossing row of the plurality of first mesh electrodes comprises:
   a first mesh block and a second mesh block respectively on a first side and a second side of the window region;
   a first conductive plate directly connected to multiple mesh lines of the first mesh block;
   a second conductive plate directly connected to multiple mesh lines of the second mesh block; and
   a first conductive bridge connecting the first conductive plate and the second conductive plate;
   wherein the first conductive plate, the second conductive plate, and the first conductive bridge are respectively around a first portion, a second portion, and a third portion of a periphery of the window region;
   wherein the touch control structure further comprises:
   a touch insulating layer between the first conductive bridge and the first conductive plate, and between the first conductive bridge and the second conductive plate; and
   a first via and a second via respectively extending through the touch insulating layer, the first conductive bridge being respectively connected to the first conductive plate and the second conductive plate respectively through the first via and the second via;
   wherein the first mesh block, the second mesh block, the first conductive plate, and the second conductive plate are in a same layer different from the first conductive bridge.

2. The touch control structure of claim 1, wherein the window-crossing row further comprises a plurality of first non-window mesh blocks;
   at least the first mesh block has an area smaller than each of the plurality of first non-window mesh blocks due to presence of the window region;
   edges of the first mesh block are identical to edges of at least one of the plurality of first non-window mesh blocks, except for a first edge directly adjacent to the window region;
   at least one mesh line along the first edge is connected to the first conductive plate;
   the second mesh block has an area smaller than each of the plurality of first non-window mesh blocks due to presence of the window region;
   edges of the second mesh block are identical to edges of each of a plurality of second non-window mesh blocks, except for a second edge directly adjacent to the window region; and
   substantially all mesh lines along the second edge are connected to the second conductive plate.

3. The touch control structure of claim 1, wherein the third portion is partially overlapping with the first portion, and partially overlapping with the second portion.

4. The touch control structure of claim 1, wherein a window-crossing column of the plurality of second mesh electrodes comprises:
   a third mesh block and a fourth mesh block respectively on a third side and a fourth side of the window region;
   a third conductive plate directly connected to multiple mesh lines of the third mesh block;
   a fourth conductive plate directly connected to multiple mesh lines of the fourth mesh block; and
   a second conductive bridge connecting the third conductive plate and the fourth conductive plate;
   wherein the third conductive plate, the fourth conductive plate, and the second conductive bridge are respectively around a fourth portion, a fifth portion, and a sixth portion of the periphery of the window region.

5. The touch control structure of claim 4, wherein the window-crossing column further comprises a plurality of second non-window mesh blocks;
   at least the third mesh block has an area smaller than each of the plurality of second non-window mesh blocks due to presence of the window region;
   edges of the third mesh block are identical to edges of each of the plurality of second non-window mesh blocks, except for a third edge directly adjacent to the window region;
   substantially all mesh lines along the third edge are connected to the third conductive plate;
   the fourth mesh block has an area smaller than each of the plurality of second non-window mesh blocks due to presence of the window region;
   edges of the fourth mesh block are identical to edges of each of the plurality of second non-window mesh blocks, except for a fourth edge directly adjacent to the window region; and
   substantially all mesh lines along the fourth edge are connected to the fourth conductive plate.

6. The touch control structure claim 4, wherein the sixth portion is partially overlapping with the fourth portion, and partially overlapping with the fifth portion.

7. The touch control structure of claim 4, further comprising:
   a touch insulating layer between the first conductive bridge and the first conductive plate and between the first conductive bridge and the second conductive plate; and
   a first via and a second via respectively extending through the touch insulating layer, the first conductive bridge being respectively connected to the first conductive plate and the second conductive plate respectively through the first via and the second via;
wherein the first mesh block, the second mesh block, the third mesh block, the fourth mesh block, the first conductive plate, the second conductive plate, the third conductive plate, the fourth conductive plate and the second conductive bridge are in a same layer different from the first conductive bridge.

8. The touch control structure of claim 7, wherein an orthographic projection of the first conductive bridge on the touch insulating layer partially overlaps with an orthographic projection of the second conductive bridge on the touch insulating layer.

9. The touch control structure of claim 4, wherein center lines of the window-crossing row and the window-crossing column crossing over each other, forming a window-region virtual intersection inside the window region;
outside the window region, center lines of rows of the plurality of first mesh electrodes and center lines of columns of the plurality of second mesh electrodes cross over each other, forming a plurality of virtual intersections in the touch control region;
wherein the first conductive bridge and the second conductive bridge do not cross over the window-region virtual intersection.

10. The touch control structure of claim 9, further comprising a first electrode bridge connecting adjacent first mesh electrodes in a respective one of the plurality of virtual intersections; and
a second electrode bridge connecting adjacent second mesh electrodes in the respective one of the plurality of virtual intersections;
wherein the first electrode bridge and the second electrode bridge respectively cross over the respective one of the plurality of virtual intersections.

11. The touch control structure of claim 4, wherein an additional window-crossing column of the plurality of second mesh electrodes comprises:
an additional third mesh block and an additional fourth mesh block respectively on a third side and a fourth side of the window region;
an additional third conductive plate directly connected to multiple mesh lines of the additional third mesh block;
an additional fourth conductive plate directly connected to multiple mesh lines of the additional fourth mesh block; and
an additional second conductive bridge connecting the additional third conductive plate and the additional fourth conductive plate;
wherein the additional third conductive plate, the additional fourth conductive plate, and the additional second conductive bridge are respectively around a ninth portion, a tenth portion, and an eleventh portion of the periphery of the window region.

12. The touch control structure of claim 11, further comprising an intermediate mesh blocks in a touch transmission path between the first mesh block and the second mesh block; and
an intermediate conductive plate directly connected to multiple mesh lines of the intermediate mesh block, and is connected to the first conductive bridge.

13. The touch control structure of claim 1, further comprising a second window region in which the touch control structure is absent;
the first mesh block is directly adjacent to the window region on one side and directly adjacent to the second window region on an opposite side.

14. The touch control structure of claim 13, wherein the window-crossing row of the plurality of first mesh electrodes further comprises a fifth mesh block;
the first mesh block and the second mesh block are respectively on a first side and a second side of the window region;
the fifth mesh block and the first mesh block are respectively on a first side and a second side of the second window region;
wherein the touch control structure further comprises:
an additional conductive plate directly connected to multiple mesh lines of the first mesh block;
a fifth conductive plate directly connected to multiple mesh lines of the fifth mesh block; and
a third conductive bridge connecting the fifth conductive plate and the additional conductive plate.

15. The touch control structure of claim 14, wherein a first window-crossing column of the plurality of second mesh electrodes comprises a third mesh block and a fourth mesh block respectively on a third side and a fourth side of the window region; a third conductive plate directly connected to multiple mesh lines of the third mesh block; a fourth conductive plate directly connected to multiple mesh lines of the fourth mesh block; and a second conductive bridge connecting the third conductive plate and the fourth conductive plate;
a second window-crossing column of the plurality of second mesh electrodes comprises a sixth mesh block and a seventh mesh block respectively on a third side and a fourth side of the second window region; a sixth conductive plate directly connected to multiple mesh lines of the sixth mesh block; a seventh conductive plate directly connected to multiple mesh lines of the seventh mesh block; and a fourth conductive bridge connecting the sixth conductive plate and the seventh conductive plate; and
a third window-crossing column of the plurality of second mesh electrodes comprises an eighth mesh block and a ninth mesh block respectively on the third side and the fourth side of the second window region; a eighth conductive plate directly connected to multiple mesh lines of the eighth mesh block; a ninth conductive plate directly connected to multiple mesh lines of the ninth mesh block; and a fifth conductive bridge connecting the eighth conductive plate and the ninth conductive plate.

16. The touch control structure of claim 15, wherein the first mesh block, the second mesh block, the third mesh block, the fourth mesh block, the fifth mesh block, the sixth mesh block, the seventh mesh block, the eighth mesh block, the ninth mesh block, the first conductive plate, the additional conductive plate, the second conductive plate, the third conductive plate, the fourth conductive plate, the fifth conductive plate, the sixth conductive plate, the seventh conductive plate, the eighth conductive plate, the ninth conductive plate, the second conductive bridge, the fourth conductive bridge, and the fifth conductive bridge, are in a same layer, and are in a layer different from the first conductive bridge and the third conductive bridge; and
the first conductive bridge and the third conductive bridge are in a same layer.

17. A touch control structure, comprising a plurality of first mesh electrodes along a row direction and a plurality of second mesh electrodes along a column direction;
wherein the touch control structure is limited in a touch control region and absent in a window region surrounded by the touch control region;

wherein a window-crossing row of the plurality of first mesh electrodes comprises:
a first mesh block and a second mesh block respectively on a first side and a second side of the window region;
a first conductive plate directly connected to multiple mesh lines of the first mesh block;
a second conductive plate directly connected to multiple mesh lines of the second mesh block; and
a first conductive bridge connecting the first conductive plate and the second conductive plate;
wherein the first conductive plate, the second conductive plate, and the first conductive bridge are respectively around a first portion, a second portion, and a third portion of a periphery of the window region;
wherein the touch control structure further comprises a protective ring between the first mesh block and the second mesh block, the protective ring surrounding the window region;
wherein the first conductive bridge and the protective ring are in a same layer;
a touch insulating layer is on a side of the first conductive bridge and the protective ring away from a base substrate; and
the first conductive plate, the second conductive plate, mesh blocks of the plurality of first mesh electrodes and the plurality of second mesh electrodes are in a same layer, and are on a side of the touch insulating layer away from the first conductive bridge and the protective ring.

18. A touch control structure, comprising a plurality of first mesh electrodes along a row direction and a plurality of second mesh electrodes along a column direction;
wherein the touch control structure is limited in a touch control region and absent in a window region surrounded by the touch control region;
wherein a window-crossing row of the plurality of first mesh electrodes comprises:
a first mesh block and a second mesh block respectively on a first side and a second side of the window region;
a first conductive plate directly connected to multiple mesh lines of the first mesh block;
a second conductive plate directly connected to multiple mesh lines of the second mesh block; and
a first conductive bridge connecting the first conductive plate and the second conductive plate;
wherein the first conductive plate, the second conductive plate, and the first conductive bridge are respectively around a first portion, a second portion, and a third portion of a periphery of the window region;
wherein the first conductive plate has a first plate width along a direction perpendicular to an interface between the first conductive plate and the first mesh block;
the second conductive plate has a second plate width along a direction perpendicular to an interface between the second conductive plate and the second mesh block; and
the first plate width and the second plate width are respectively greater than a mesh line width of the multiple mesh lines of the first mesh block and the multiple mesh lines of the second mesh block by at least 200%.

19. A display panel, comprising the touch control structure of claim 1, and a hole in the window region;
wherein display elements of the display panel are absent in the window region; and
the display panel is configured to display an image in at least a portion of the touch control region.

* * * * *